United States Patent
Jinnai et al.

(10) Patent No.: US 9,552,831 B2
(45) Date of Patent: Jan. 24, 2017

(54) METHOD FOR DETECTING ABNORMAL SOUND AND METHOD FOR JUDGING ABNORMALITY IN STRUCTURE BY USE OF DETECTED VALUE THEREOF, AND METHOD FOR DETECTING SIMILARITY BETWEEN OSCILLATION WAVES AND METHOD FOR RECOGNIZING VOICE BY USE OF DETECTED VALUE THEREOF

(71) Applicants: WEST NIPPON EXPRESSWAY ENGINEERING SHIKOKU COMPANY LIMITED, Takamatsu-shi, Kagawa (JP); Michihiro Jinnai, Nagoya-shi, Aichi (JP)

(72) Inventors: Michihiro Jinnai, Nagoya (JP); Yukio Akashi, Takamatsu (JP); Kazuaki Hashimoto, Takamatsu (JP); Shogo Hayashi, Takamatsu (JP)

(73) Assignees: WEST NIPPON EXPRESSWAY ENGINEERING SHIKOKU COMPANY LIMITED, Kawaga (JP); MICHIHIRO JINNAI, Nagoya-Shi (JP)

( * ) Notice: Subject to any disclaimer, the term of this patent is extended or adjusted under 35 U.S.C. 154(b) by 0 days.

(21) Appl. No.: 15/003,376

(22) Filed: Jan. 21, 2016

(65) Prior Publication Data
US 2016/0225389 A1 Aug. 4, 2016

(30) Foreign Application Priority Data
Feb. 2, 2015 (JP) ................................ 2015-018596

(51) Int. Cl.
*G10L 25/84* (2013.01)
*G10L 25/51* (2013.01)
(Continued)

(52) U.S. Cl.
CPC ............. *G10L 25/84* (2013.01); *G10L 15/10* (2013.01); *G10L 17/08* (2013.01);
(Continued)

(58) Field of Classification Search
CPC .................................. G01L 15/10; G01L 17/08
See application file for complete search history.

(56) References Cited

U.S. PATENT DOCUMENTS 5,210,820 A * 5/1993 Kenyon ............ G06K 9/00496
704/200
6,170,333 B1 1/2001 Jinnai et al.
(Continued)

FOREIGN PATENT DOCUMENTS

JP 3342864 B2 11/2002
JP 3422787 B1 6/2003
JP 3426905 B2 7/2003

*Primary Examiner* — Samuel G Neway
(74) *Attorney, Agent, or Firm* — Birch, Stewart, Kolasch & Birch, LLP

(57) ABSTRACT

The present invention provides a method for obtaining an accurate detected value of a similarity, such as an hitting sound. The method includes the steps of: creating original standard/input pattern vectors each having a feature quantity of an hitting sound; creating a skewness-weighting vector and a kurtosis-weighting vector based on a reference pattern vector of a reference shape; calculating a skewness-weighted standard pattern vector and a kurtosis-weighted standard pattern vector by product-sum operation using component values of the skewness-weighting vector and the kurtosis-weighting vector and a component value of the original standard pattern vector; creating a dual and weighted standard pattern vector based on these vectors and similarly creating a dual and weighted input pattern vector; creating dual and selected standard/input pattern vectors based on the dual and weighted standard/input pattern vectors; and setting an angle between the dual and selected
(Continued)

standard and input pattern vectors as a geometric distance value between the original standard and input pattern vectors.

2 Claims, 46 Drawing Sheets

(51) Int. Cl.
*G10L 25/87* (2013.01)
*G10L 25/18* (2013.01)
*G10L 21/0388* (2013.01)
*G10L 15/10* (2006.01)
*G10L 17/08* (2013.01)

(52) U.S. Cl.
CPC .......... *G10L 21/0388* (2013.01); *G10L 25/18* (2013.01); *G10L 25/51* (2013.01); *G10L 25/87* (2013.01)

(56) References Cited

U.S. PATENT DOCUMENTS

| | | |
|---|---|---|
| 2002/0055839 A1 | 5/2002 | Jinnai et al. |
| 2003/0185443 A1 | 10/2003 | Jinnai |
| 2008/0082323 A1* | 4/2008 | Bai .................. G06K 9/0051 704/214 |
| 2010/0332222 A1* | 12/2010 | Bai .................. G10L 17/04 704/214 |

* cited by examiner (a) Standard pattern (b) Input pattern (c) Positive reference pattern (d) Negative reference pattern

METHOD FOR DETECTING ABNORMAL SOUND AND METHOD FOR JUDGING ABNORMALITY IN STRUCTURE BY USE OF DETECTED VALUE THEREOF, AND METHOD FOR DETECTING SIMILARITY BETWEEN OSCILLATION WAVES AND METHOD FOR RECOGNIZING VOICE BY USE OF DETECTED VALUE THEREOF

TECHNICAL FIELD

The present invention relates to a method for detecting a similarity between standard information and input information and to a method for judging whether or not the input information is abnormal or for recognizing whether or not the input information is identical to the standard information by use of a detected value of the similarity. More specifically, the present invention relates to a method for detecting an abnormal sound with regard to a sound or an oscillation generated by hitting a concrete structure using a hammer, a method for judging abnormality in the concrete structure based on a detected value of the abnormal sound, a method for detecting a similarity between any standard and input oscillation waves, and a method for recognizing a voice by use of a detected value of the similarity.

BACKGROUND ART

In a concrete structure, damage such as a cavity occurs inside a concrete structure owing to wind, rain and temperature variation over many years. Such a structure, for detecting abnormality with the structure such as a cavity, is equipped with means for detecting an abnormal sound with regard to a sound or an oscillation generated by hitting a concrete structure using a hammer, and for monitoring whether there is abnormality with the structure based on the detected value of the abnormal sound.

As a technology of detecting a similarity between a standard sound and an input sound as a geometric distance, the gazette of Japanese Patent No. 3426905 (Japanese Patent Application No. Hei 9(1997)-61007, Title of the Invention: Method for detecting an abnormal sound and method for judging abnormality in machine by use of detected value thereof, and method for detecting similarity between oscillation waves and method for recognizing voice by use of detected value thereof) is known.

As an improved technology of detecting a similarity between standard information and input information as a geometric distance, the gazette of Japanese Patent No. 3342864 (Japanese Patent Application No. 2000-277749, Title of the Invention: Method for detecting similarity between voices and method for recognizing voice by use of detected value thereof, method for detecting similarity between oscillation waves and method for judging abnormality in machine by use of detected value thereof, method for detecting similarity between images and method for recognizing image by use of detected value thereof, method for detecting similarity between solids and method for recognizing solid by use of detected value thereof, and method for detecting similarity between moving images and method for recognizing moving image by use of detected value thereof) is known.

As a further improved technology of detecting a similarity between standard information and input information as a geometric distance, the gazette of Japanese Patent No. 3422787 (Japanese Patent Application No. 2002-68231, Title of the Invention: Method for detecting similarity between images and method for recognizing image by use of detected value thereof, method for detecting similarity between voices and method for recognizing voice by use of detected value thereof, method for detecting similarity between oscillation waves and method for judging abnormality in machine by use of detected value thereof, method for detecting similarity between moving images and method for recognizing moving image by use of detected value thereof, and method for detecting similarity between solids and method for recognizing solid by use of detected value thereof) is known.

The method for detecting a similarity between standard information and input information in the above three prior arts includes the steps of: registering in advance a standard pattern vector having, as a component, a feature quantity such as a power spectrum of a standard sound; creating an input pattern vector having a feature quantity of an input sound as a component; and calculating the degree of similarity between the standard pattern vector and the input pattern vector as a geometric distance. Moreover, the method for detecting an abnormal sound in the above three prior arts includes the step of: comparing a calculated value of the geometric distance with an arbitrarily set allowed value.

Incidentally, in statistical analysis, a normal distribution is usually used as a model of a phenomenon. Then, a "kurtosis" and a "skewness" are used to verify whether the phenomenon obeys the normal distribution or not. Here, the kurtosis and the skewness are statistics. If a probability distribution of the phenomenon follows the normal distribution, then a value of the kurtosis is equal to 3. If it has peakedness relative to the normal distribution, then a value of the kurtosis is greater than 3. Conversely, if it has flatness relative to the normal distribution, then a value of the kurtosis is less than 3. Also, if a probability distribution of the phenomenon is symmetrical about the center axis, then a value of the skewness is equal to 0. If the tail on the right side of the probability distribution is longer than the left side, then a value of the skewness is greater than 0. Conversely, if the tail on the left side of the probability distribution is longer than the right side, then a value of the skewness is less than 0.

In the prior arts, the degree of similarity between the standard pattern vector and the input pattern vector is calculated as a geometric distance by using only a "kurtosis". In the present invention, the degree of similarity between the standard pattern vector and the input pattern vector is calculated as a new geometric distance by using both "kurtosis" and "skewness". Therefore, in order to distinguish "kurtosis" from "skewness" and describe them clearly, we change names from a "weighting vector" and a "weighting curve" in the prior art (the gazette of Japanese Patent No. 3422787) into a "kurtosis-weighting vector" and a "kurtosis-weighting curve" in the present invention, respectively. Also, we change names from an "original and weighted standard pattern vector" and an "original and weighted input pattern vector" in the prior art (the gazette of Japanese Patent No. 3422787) into a "kurtosis-weighted standard pattern vector" and a "kurtosis-weighted input pattern vector" in the present invention, respectively. Further, we change a name from a "geometric distance" in the prior arts (the gazette of Japanese Patent No. 3426905, No. 3342864 and No. 3422787) into a "kurtosis geometric distance" in the present invention.

In the method of calculating the kurtosis geometric distance of the prior arts, a difference in shapes between standard and input patterns is replaced by a shape change in a reference shape (a reference pattern) such as a normal distribution, and the magnitude of this shape change is numerically evaluated as a variable of the kurtosis. Then, the variable of the kurtosis is calculated while moving the center axis of the reference pattern to a position of each component of the standard and input patterns, and the kurtosis geometric distance is calculated by using these variables of the kurtosis. Note that, in the prior art (the gazette of Japanese Patent No. 3422787), the approximate value of the variable of the kurtosis is calculated, instead of calculating the variable of the kurtosis directly.

In general, an equation for calculating the kurtosis of a vector cannot be defined if the component value of the vector is negative. Therefore, in the prior arts, positive and negative reference pattern vectors that have a normal distribution as their initial shapes are created, and a difference in shapes between standard and input patterns is replaced by the shape changes of the positive and negative reference pattern vectors so that the component value of the vector may not become negative. However, in the case where the difference in shapes between standard and input patterns is small, the component value of the vector does not become negative even if we use a method where the difference in shapes between standard and input patterns is replaced by the shape change in a single reference pattern vector. If we explain a principle of the prior arts by using the latter method instead of the former method, it is easier to understand. Therefore, in the following, we explain the principle of the prior arts by using a single reference pattern vector (a single shape of reference pattern). Namely, we explain the prior arts by using the method where the component value of a single reference pattern changes by a difference obtained by subtracting the component value of the standard pattern from the component value of the input pattern, and the magnitude of this shape change is numerically evaluated as a variable of the kurtosis.

The upper and middle diagrams of FIGS. 53(a) to 53(e) show a typical example of the shapes of the standard and input pattern vectors, respectively. FIGS. 53(a) to 53(d) each show the standard and input patterns having a single peak. FIG. 53(e) typically shows the standard pattern having a flat shape and the input pattern where a "wobble" occurs in the flat shape. Also, the bottom diagrams of FIGS. 53(a) to 53(e) show an example where a difference in shapes between the standard and input patterns is replaced by the shape change in the reference pattern having the normal distribution as its initial shape. Note that the peaks of the standard and input patterns shown in FIGS. 53(a) to 53(d) are assumed to have the same height, and the area of each standard pattern and each input pattern shown in FIGS. 53(a) to 53(e) is equal to 1.

FIG. 53(a) gives an example of the case where standard pattern and input pattern have the same shape. Since the reference pattern does not change in its shape from the normal distribution during this time, the kurtosis becomes A=3.

FIGS. 53(b), 53(c) and 53(d) each show an example exhibiting a small, medium, and large "difference" of peaks between the standard and input patterns. During this time, the component value of the reference pattern decreases by the absolute value of the difference between the component value of the standard pattern and the component value of the input pattern at peak position of each standard pattern. At the same time, the component value of the reference pattern increases by the absolute value of the difference between the component value of the standard pattern and the component value of the input pattern at peak position of each input pattern.

In FIG. 53(b), the position of the decreased component value of the reference pattern and that of the increased component value of the reference pattern are close. Since the effect of a decrease and an increase is cancelled out, the kurtosis becomes A≈3.

In FIG. 53(d), since the shape of the reference pattern has flatness relative to the normal distribution, the kurtosis becomes A<<3.

In FIG. 53(c), since the shape of the reference pattern is an intermediate state between FIG. 53(b) and FIG. 53(d), the kurtosis becomes A<3.

Therefore, from FIGS. 53(a) to 53(d), we can understand that the value of the kurtosis decreases monotonically as the "difference" increases between peaks of the standard and input patterns.

In FIG. 53(e), the reference pattern has a small shape change from the normal distribution, because the shape of the reference pattern increases and decreases alternately by the absolute value of the difference between the component value of the standard pattern and the component value of the input pattern. The kurtosis becomes A≈3. Also, if the shape of the reference pattern increases and decreases randomly, the kurtosis becomes A≈3.

In the method for calculating the kurtosis geometric distance of the prior arts, the variable of the kurtosis is obtained by subtracting 3 from the value of the kurtosis. Then, the variable of the kurtosis is calculated while moving the center axis of the reference pattern to a position of each component of the standard and input patterns, and the kurtosis geometric distance is obtained by calculating a square root of a sum of each variable of kurtosis squared. Thus, when a "difference" occurs between peaks of the standard and input patterns with "wobble" due to noise or the like, the "wobble" is absorbed and the kurtosis geometric distance increases monotonically as the "difference" increases.

CITATION LIST

Patent Literatures

{Patent Literature 1} The gazette of Japanese Patent No. 3426905 (Japanese Patent Application No. Hei 9(1997)-61007, Title of the Invention: Method for detecting an abnormal sound and method for judging abnormality in machine by use of detected value thereof, and method for detecting similarity between oscillation waves and method for recognizing voice by use of detected value thereof)

{Patent Literature 2} The gazette of Japanese Patent No. 3342864 (Japanese Patent Application No. 2000-277749, Title of the Invention: Method for detecting similarity between voices and method for recognizing voice by use of detected value thereof, method for detecting similarity between oscillation waves and method for judging abnormality in machine by use of detected value thereof, method for detecting similarity between images and method for recognizing image by use of detected value thereof, method for detecting similarity between solids and method for recognizing solid by use of detected value thereof, and method for detecting similarity between moving images and method for recognizing moving image by use of detected value thereof)

{Patent Literature 3} The gazette of Japanese Patent No. 3422787 (Japanese Patent Application No. 2002-68231, Title of the Invention: Method for detecting similarity between images and method for recognizing image by use of detected value thereof, method for detecting similarity between voices and method for recognizing voice by use of detected value thereof, method for detecting similarity between oscillation waves and method for judging abnormality in machine by use of detected value thereof, method for detecting similarity between moving images and method for recognizing moving image by use of detected value thereof, and method for detecting similarity between solids and method for recognizing solid by use of detected value thereof)

SUMMARY OF INVENTION

Technical Problem

However, in case of using the kurtosis for detecting a similarity between the standard and input patterns, it may happen that the value of the kurtosis does not change monotonically according to the increase of the "difference" between peaks of the standard and input patterns. In such a case, it is impossible to precisely detect the "difference" between peaks of the power spectrum of the standard sound and the power spectrum of the input sound, thus it is impossible to precisely detect an abnormal sound. The following is a detailed description.

The upper and middle diagrams of FIGS. 54(a) to 54(d) show a typical example where peak positions of the standard and input patterns shown in FIGS. 53(a) to 53(d) are moved to the left. Also, the bottom diagrams of FIGS. 54(a) to 54(d) show an example where a difference in shapes between the standard and input patterns is replaced by the shape change in the reference pattern having the normal distribution as its initial shape. Note that the peaks of the standard and input patterns shown in FIGS. 54(a) to 54(d) are assumed to have the same height, and the area of each standard pattern and each input pattern shown in FIGS. 54(a) to 54(e) is equal to 1.

FIG. 54(a) gives an example of the case where standard pattern and input pattern have the same shape. Because the reference pattern does not change in its shape from the normal distribution during this time, the kurtosis becomes A=3.

FIGS. 54(b), 54(c) and 54(d) respectively show an example exhibiting a small, medium, and large "difference" of peaks between the standard and input patterns. During this time, the component value of the reference pattern decreases by the absolute value of the difference between the component value of the standard pattern and the component value of the input pattern at peak position of each standard pattern. At the same time, the component value of the reference pattern increases by the absolute value of the difference between the component value of the standard pattern and the component value of the input pattern at peak position of each input pattern.

In FIG. 54(b), the position of the decreased component value of the reference pattern and that of the increased component value of the reference pattern are close. Because the effect of a decrease and an increase is cancelled out, the kurtosis becomes A≈3.

In FIG. 54(c), because the shape of the reference pattern has peakedness relative to the normal distribution, the kurtosis becomes A>>3.

In FIG. 54(d), the position of the decreased component value of the reference pattern and that of the increased component value of the reference pattern are symmetrical about the center axis of the reference pattern. Because the effects of a decrease and an increase are cancelled out, the kurtosis becomes A=3.

Therefore, from FIGS. 54(a) to 54(d), we can understand that it happens that the value of the kurtosis does not change monotonically as the "difference" between peaks of the standard and input patterns increases.

FIG. 53 shows a case where the value of the kurtosis A decreases monotonically as the "difference" between peaks of the standard and input patterns increases. On the other hand, FIG. 54 shows a case where the value of the kurtosis A does not change monotonically when the "difference" between peaks of the standard and input patterns increases. From FIGS. 53 and 54, we can understand that such a difference is caused by a relative positional relationship between the reference pattern and the standard and input patterns. In the prior arts, the variable of the kurtosis is calculated while moving the center of the reference pattern to every component position of the standard and input patterns, and the kurtosis geometric distance value is calculated by using all the variables calculated. Thus, during the moving of the center of the reference pattern, a phenomenon occurs that the relative positional relationship between the reference pattern and the standard and input patterns becomes the same as that shown in FIG. 54, thus it is impossible to precisely detect an abnormal sound.

Here, with regard to the typical example shown in FIG. 53, we consider that the difference in shapes between the standard and input patterns is replaced by the shape change in the reference pattern having the normal distribution as its initial shape, and the magnitude of this shape change is numerically evaluated as a variable of the "skewness".

FIG. 53(a) gives an example of the case where standard pattern and input pattern have the same shape. During this time, because the reference pattern does not change in its shape from the normal distribution (the reference pattern is symmetrical about the center axis of the reference pattern), the skewness becomes B=0.

In FIG. 53(b), because the position of the decreased component value of the reference pattern is located at the center axis and the position of the increased component value of the reference pattern is close to the center, the skewness becomes B≈0.

In FIG. 53(d), because the tail on the right side of the shape of the reference pattern is longer than the left side, the skewness becomes B>>0.

In FIG. 53(c), because the shape of the reference pattern is an intermediate state between FIG. 53(b) and FIG. 53(d), the skewness becomes B>0.

Therefore, from FIGS. 53(a) to 53(d), we can understand that the value of the skewness increases monotonically as the "difference" between peaks of the standard and input patterns increases.

In FIG. 53(e), the reference pattern has a small shape change from the normal distribution (the reference pattern is almost symmetrical about the center axis of the reference pattern), because the component values of the reference pattern increase and decrease alternately by the absolute value of the difference between the component value of the standard pattern and the component value of the input pattern. The skewness becomes B≈0. Also, if the component values of the reference pattern increase and decrease randomly, the skewness becomes B≈0.

From the above description, it is discovered that we can detect the degree of similarity between the standard and input patterns as a skewness geometric distance by numerically evaluating the magnitude of the shape change in the reference pattern as a variable of the "skewness", instead of numerically evaluating the magnitude of the shape change in the reference pattern as a variable of the "kurtosis". Similarly to the "kurtosis" in the prior arts, we can use the "skewness".

Moreover, with regard to the typical example shown in FIG. 54, we consider that the difference in shapes between the standard and input patterns is replaced by the shape change in the reference pattern having the normal distribution as its initial shape, and the magnitude of this shape change is numerically evaluated as a variable of the "skewness".

FIG. 54(a) gives an example of the case where standard pattern and input pattern have the same shape. During this time, because the reference pattern does not change in its shape from the normal distribution (the reference pattern is symmetrical about the center axis of the reference pattern), the skewness becomes B=0.

In FIG. 54(b), the position of the decreased component value of the reference pattern and that of the increased component value of the reference pattern are close. Because the effects of a decrease and an increase are cancelled out, the skewness becomes B≈0.

In FIG. 54(d), because the tail on the right side of the shape of the reference pattern is longer than the left side, the skewness becomes B>>0.

In FIG. 54(c), because the shape of the reference pattern is an intermediate state between FIG. 54(b) and FIG. 54(d), the skewness becomes B>0.

Therefore, from FIGS. 54(a) to 54(d), we can understand that the value of the skewness increases monotonically as the "difference" between peaks of the standard and input patterns increases.

From the above description, with regard to the typical example shown in FIG. 54, similarly to FIG. 53, it is discovered that we can detect the degree of similarity between the standard and input patterns as a skewness geometric distance by numerically evaluating the magnitude of the shape change in the reference pattern as a variable of the "skewness", instead of numerically evaluating the magnitude of the shape change in the reference pattern as a variable of the "kurtosis". Similarly to the "kurtosis" in the prior arts, we can use the "skewness".

Further, with regard to the typical example shown in FIG. 55, we consider that the difference in shapes between the standard and input patterns is replaced by the shape change in the reference pattern having the normal distribution as its initial shape, and the magnitude of this shape change is numerically evaluated as a variable of the "kurtosis" and a variable of the "skewness". The upper and middle diagrams of FIGS. 55(a) to 55(e) show a typical example of the shapes of the standard and input pattern vectors. FIG. 55(a) shows the standard and input patterns having a single peak at the center. FIGS. 55(b), 55(c) and 55(d) show the standard patterns having a single peak at the center and the input patterns having two peaks at symmetrical positions about the center axis. Also, the bottom diagrams of FIGS. 55(a) to 55(d) show an example where a difference in shapes between the standard and input patterns is replaced by the shape change in the reference pattern having the normal distribution as its initial shape. Note that the peaks of the standard and input patterns shown in FIG. 55(a) are assumed to have the same height, and the area of each standard pattern and each input pattern shown in FIGS. 55(a) to 55(e) is equal to 1.

FIG. 55(a) gives an example of the case where standard pattern and input pattern have the same shape. Because the reference pattern does not change in its shape from the normal distribution during this time, the kurtosis becomes A=3.

Also, because the reference pattern is symmetrical about the center axis of the reference pattern, the skewness becomes B=0.

FIGS. 55(b), 55(c) and 55(d) respectively show an example exhibiting standard patterns having a single peak at the center and input patterns having a small, medium, and large "difference" of two peaks. During this time, the component value of the reference pattern decreases by the absolute value of the difference between the component value of the standard pattern and the component value of the input pattern at peak position of each standard pattern. At the same time, the component value of the reference pattern increases by the absolute value of the difference between the component value of the standard pattern and the component value of the input pattern at peak position of each input pattern.

In FIG. 55(b), the position of the decreased component value of the reference pattern and that of the increased component value of the reference pattern are close. Because the effects of a decrease and an increase are cancelled out, the kurtosis becomes A≈3.

In FIG. 55(d), because the shape of the reference pattern has flatness relative to the normal distribution, the kurtosis becomes A<<3.

In FIG. 55(c), because the shape of the reference pattern is an intermediate state between FIG. 55(b) and FIG. 55(d), the kurtosis becomes A<3.

In FIGS. 55(b), 55(c) and 55(d), because each reference pattern is symmetrical about the center axis of the reference pattern, skewness becomes B=0.

Therefore, from FIGS. 55(a) to 55(d), we can understand that the value of the kurtosis decreases monotonically as the "difference" between peaks of the standard and input patterns increases. On the other hand, we can understand that the value of the skewness does not change at all.

TABLE 1

|  | Kurtosis | Skewness |
|---|---|---|
| Instance of FIG. 53 | ○ | ○ |
| Instance of FIG. 54 | X | ○ |
| Instance of FIG. 55 | ○ | X |

TABLE 1 shows the results of FIGS. 53 to 55. Specifically, TABLE 1 is a table showing the results of the cases of FIGS. 53, 54 and 55. In TABLE 1, o indicates the case where the value of the kurtosis or skewness changes monotonically as the "difference" between peaks of the standard and input patterns increases, while x indicates the case where the value of the kurtosis or skewness does not change monotonically when the "difference" between peaks of the standard and input patterns increases. As shown in TABLE 1, when the values of "kurtosis" and "skewness" are used for detecting a similarity between the standard and input patterns, in the case shown in FIG. 53, the values of the kurtosis and skewness both change monotonically as the "difference" between peaks of the standard and input patterns increases. Meanwhile, in the case shown in FIG. 54, the value of skewness changes monotonically while a phenomenon occurs that the value of kurtosis does not change monotonically when the "difference" between peaks of the standard and input patterns increases. On the other hand, in the case shown in FIG. 55, a phenomenon occurs that the value of skewness does not change monotonically while the value of kurtosis changes monotonically when the "difference" between peaks of the standard and input patterns increases.

Namely, first, in the methods of the prior arts (the gazette of Japanese Patent No. 3426905, the gazette of Japanese Patent No. 3342864 and the gazette of Japanese Patent No. 3422787), a difference in shapes between standard and input patterns is replaced by the shape change in a reference shape (reference pattern) such as a normal distribution, and the magnitude of this shape change is numerically evaluated by using "only a variable of the kurtosis", thus it is impossible to precisely detect an abnormal sound.

Specifically, in the prior art (the gazette of Japanese Patent No. 3422787), any reference shape such as a normal distribution and a rectangle is created, and a reference pattern vector having component values representing the reference shape is created, and a kurtosis-weighting vector (a kurtosis-weighting curve) having a value of a change rate of a kurtosis of the above reference pattern vector as a component is created. Then, the kurtosis-weighting curve is multiplied by positive values of weight to change the kurtosis-weighting curve, and the optimum kurtosis-weighting curve is calculated. In this case, consideration will be made for the following limited case. Specifically, the functional value of the changed kurtosis-weighting curve when u=0 becomes positive. Further, the changed kurtosis-weighting curve intersects the u-axis on two points and becomes symmetric with respect to u=0. Namely, first, in the prior arts, a kurtosis-weighted standard pattern vector and a kurtosis-weighted input pattern vector are created by using a kurtosis-weighting curve that is symmetrical about the center axis, and the degree of similarity between the standard pattern vector and the input pattern vector is calculated as a kurtosis geometric distance value, thus it is impossible to precisely detect an abnormal sound.

The Description of the Gazette of Japanese Patent No. 3422787

In the above, as shown in FIG. 46B, for the case of expanding and contracting the weighting curve in the direction parallel to the u-axis, the state has been examined, where the geometric distance values between the standard images are changed. Next, consideration will be made that the weighting curve is changed also in a direction perpendicular to the u-axis. However, in this embodiment, consideration will be made limitedly for the following case. Specifically, when the weighting curve is expanded and contracted in the direction parallel to the u-axis, and simultaneously changed in the direction perpendicular to the u-axis, similarly to the curve shown in FIG. 46B, the functional value of the changed weighting curve when u=0 becomes positive. Further, the changed weighting curve intersects the u-axis on two points and becomes symmetric with respect to u=0.

FIG. 56 is a flowchart showing a processing procedure for calculating the optimal weighting curve and the optimal value of the variable Cg according to the optimal weighting curve with regard to the case of using the geometric distance dE as a similarity scale between the respective standard images. In FIG. 56, in the first Step Sc1, a weighting curve is created based on the change rate of the kurtosis of the normal curve having a value of variance of 1, and defined as a first (count=1) weighting curve. In Step Sc2, the first weighting curve is multiplied by positive values of weight to create (rated number—1) pieces of weighting curves with weight, which are then defined as count-th (count=2 to the rated number) weighting curves. As described above, one weighting curve shown in FIGS. 52A to 52C can create the plurality of weighting curves shown in FIG. 46B by expanding and contracting the u-axis. Moreover, another weighting curve shown in FIGS. 53A to 53C can create the plurality of weighting curves shown in FIG. 49 by expanding and contracting the u-axis. Therefore, in Step Sc1 and Step Sc2, it is sufficient if one representative weighting curve may be created. In Step Sc3, initial setting is made as: count=1. In the next Step Sc4 to Step Sc8, the processing enters a loop for calculating the optimal weighting curve and the optimal value of the variable Cg according to the optimal weighting curve by increasing the count one by one to: count=rated number. Note that, for the rated number, a sufficiently large value should be used in a range allowed by a processing time of a computer.

The Description of Sc2 in FIG. 56 and Sd2 in FIG. 58

Multiply first weighting curve by positive values of weight to create (rated number—1) pieces of weighting curve with weight Further, secondly, in the methods of the prior arts (the gazette of Japanese Patent No. 3426905, the gazette of Japanese Patent No. 3342864 and the gazette of Japanese Patent No. 3422787), the variable of the kurtosis is calculated while moving the center axis of the reference pattern to "every component position" of the standard and input patterns, thus it is impossible to precisely detect an abnormal sound. Specifically, in the prior art (the gazette of Japanese Patent No. 3422787), the product-sum of a component value of a kurtosis-weighting vector (kurtosis-weighting curve) and component values of standard and input pattern vectors is calculated while moving the center axis of the kurtosis-weighting vector to "every component position" of the standard and input patterns. Namely, during the moving of the center axis of the kurtosis-weighting curve, the product-sum is calculated in the same manner at every component position without any consideration given to the relative positional relationship between the kurtosis-weighting curve and the standard and input patterns, and the degree of similarity between the standard and input patterns is calculated as a kurtosis geometric distance value.

In short, first, in the prior arts, a variable of "kurtosis" and a variable of "skewness" are both not used in a complementary manner to numerically evaluate the magnitude of the shape change in the reference pattern, thus it is impossible to precisely detect an abnormal sound. Moreover, secondly, with regard to the relative positional relationship between the reference pattern and the standard/input patterns during the moving of the center axis of the reference pattern, the component positions of the standard and input patterns that improve similarity detection accuracy are not distinguished from those that lower the similarity detection accuracy, thus it is impossible to precisely detect an abnormal sound.

Thus, the similarity detection methods of the prior arts (the gazette of Japanese Patent No. 3426905, the gazette of Japanese Patent No. 3342864 and the gazette of Japanese Patent No. 3422787) have a problem that the similarity cannot be precisely detected and sufficiently satisfactory accuracy for detection of an abnormal sound cannot be obtained.

The present invention was made to solve the above problems and it is a first object of the present invention to provide a method for detecting an abnormal sound, capable of calculating an accurate geometric distance value between an original standard pattern vector and an original input pattern vector from the two vectors. Also, it is a second object of the present invention to provide a method for judging abnormality in a structure with high accuracy based on a detected value of the abnormal sound.

Moreover, it is a third object of the present invention to provide a method for detecting a similarity between oscillation waves, capable of calculating an accurate geometric distance value between an original standard pattern vector and an original input pattern vector from the two vectors with regard to a voice or any other oscillation waves. Further, it is a fourth object of the present invention to provide a method for recognizing a voice with high accuracy by use of a detected value of the similarity between the oscillation waves.

Note that the present invention provides an improved method for calculating a geometric distance between the original standard pattern vector (one dimension) and the original input pattern vector (one dimension) described in the prior arts (the gazette of Japanese Patent No. 3426905, the gazette of Japanese Patent No. 3342864 and the gazette of Japanese Patent No. 3422787).

Solution to Problem

In order to solve the above problems, a first aspect of the preset invention provides a method for detecting an abnormal sound, including the steps of:

(a) creating an original standard pattern vector having a feature quantity of a standard sound as a component and an original input pattern vector having a feature quantity of an input sound as a component;

(b) creating any reference shape having a variance that varies from one specified component to another of the original pattern vector, creating a reference pattern vector having component values representing the reference shape, and creating a skewness-weighting vector having a rate of change in a skewness of the reference pattern vector as a component;

(c) obtaining a length between a specified component of the original standard pattern vector and each of components thereof, calculating a component number of the skewness-weighting vector closest to a position away from the center of the skewness-weighting vector by the length, obtaining a product of a component value of the component number of the skewness-weighting vector and a component value of each component of the original standard pattern vector, and calculating a product-sum by summing each product with respect to a component number of the original standard pattern vector;

(d) obtaining, in the calculation of the product-sum, the product-sum while moving the specified component of the original standard pattern vector to a position of each component, and creating a skewness-weighted standard pattern vector having the product-sum as a component value of the specified component;

(e) obtaining a length between a specified component of the original input pattern vector and each of components thereof, calculating a component number of the skewness-weighting vector closest to a position away from the center of the skewness-weighting vector by the length, obtaining a product of a component value of the component number of the skewness-weighting vector and a component value of each component of the original input pattern vector, and calculating a product-sum by summing each product with respect to a component number of the original input pattern vector;

(f) obtaining, in the calculation of the product-sum, the product-sum while moving the specified component of the original input pattern vector to a position of each component, and creating a skewness-weighted input pattern vector having the product-sum as a component value of the specified component;

(g) setting an angle between the skewness-weighted standard pattern vector and the skewness-weighted input pattern vector as a skewness geometric distance between the original standard pattern vector and the original input pattern vector;

(h) creating a skewness-weighting vector while changing the variance of the reference shape, obtaining a difference in mean by subtracting a skewness geometric distance mean between standard sounds of the same category from a skewness geometric distance mean between standard sounds of different categories, obtaining a square root of a sum of values, one of which is obtained by dividing a sample variance of the skewness geometric distance between the standard sounds of the same category by a sample size thereof, and the other of which is obtained by dividing a sample variance of the skewness geometric distance between the standard sounds of the different categories by a sample size thereof, calculating a Welch's test statistic as an objective function by dividing the difference in mean by the square root, and creating an optimum skewness-weighting vector that maximizes the objective function;

(i) creating a skewness-weighted standard pattern vector and a skewness-weighted input pattern vector by use of the optimum skewness-weighting vector;

(j) creating any reference shape having a variance that varies from one specified component to another of the original pattern vector, creating a reference pattern vector having component values representing the reference shape, and creating a kurtosis-weighting vector having a rate of change in a kurtosis of the reference pattern vector as a component;

(k) obtaining a length between a specified component of the original standard pattern vector and each of the components thereof, calculating a component number of the kurtosis-weighting vector closest to a position away from the center of the kurtosis-weighting vector by the length, obtaining a product of a component value of the component number of the kurtosis-weighting vector and a component value of each component of the original standard pattern vector, and calculating a product-sum by summing each product with respect to a component number of the original standard pattern vector;

(l) obtaining, in the calculation of the product-sum, the product-sum while moving the specified component of the original standard pattern vector to a position of each component, and creating a kurtosis-weighted standard pattern vector having the product-sum as a component value of the specified component;

(m) obtaining a length between a specified component of the original input pattern vector and each of the components thereof, calculating a component number of the kurtosis-weighting vector closest to a position away from the center of the kurtosis-weighting vector by the length, obtaining a product of a component value of the component number of the kurtosis-weighting vector and a component value of each component of the original input pattern vector, and calculating a product-sum by summing each product with respect to a component number of the original input pattern vector;

(n) obtaining, in the calculation of the product-sum, the product-sum while moving the specified component of the original input pattern vector to a position of each component, and creating a kurtosis-weighted input pattern vector having the product-sum as a component value of the specified component;

(o) setting an angle between the kurtosis-weighted standard pattern vector and the kurtosis-weighted input pattern vector as a kurtosis geometric distance between the original standard pattern vector and the original input pattern vector;

(p) creating a kurtosis-weighting vector while changing the variance of the reference shape, obtaining a difference in mean by subtracting a kurtosis geometric distance mean between standard sounds of the same category from a kurtosis geometric distance mean between standard sounds of different categories, obtaining a square root of a sum of values, one of which is obtained by dividing a sample variance of the kurtosis geometric distance between the standard sounds of the same category by a sample size thereof, and the other of which is obtained by dividing a sample variance of the kurtosis geometric distance between the standard sounds of the different categories by a sample size thereof, calculating a Welch' s test statistic as an objective function by dividing the difference in mean by the square root, and creating an optimum kurtosis-weighting vector that maximizes the objective function;

(q) creating a kurtosis-weighted standard pattern vector and a kurtosis-weighted input pattern vector by use of the optimum kurtosis-weighting vector;

(r) normalizing magnitudes of the skewness-weighted standard pattern vector and the kurtosis-weighted standard pattern vector to 1, and combining the normalized skewness-weighted standard pattern vector and the normalized kurtosis-weighted standard pattern vector to create a dual and weighted standard pattern vector;

(s) normalizing magnitudes of the skewness-weighted input pattern vector and the kurtosis-weighted input pattern vector to 1, and combining the normalized skewness-weighted input pattern vector and the normalized kurtosis-weighted input pattern vector to create a dual and weighted input pattern vector;

(t) creating a selecting vector having the same number of components as those of the dual and weighted standard pattern vector and dual and weighted input pattern vector and having 0 or 1 as a component, obtaining a product of a component value of each component of the dual and weighted standard pattern vector and a component value of the corresponding component of the selecting vector, the components having the same component number, and obtaining a product of a component value of each component of the dual and weighted input pattern vector and a component value of the corresponding component of the selecting vector, the components having the same component number, thereby creating a dual and selected standard pattern vector and a dual and selected input pattern vector having the corresponding products as component values;

(u) setting an angle between the dual and selected standard pattern vector and the dual and selected input pattern vector as a geometric distance between the original standard pattern vector and the original input pattern vector;

(v) obtaining a difference in mean by subtracting a geometric distance mean between standard sounds of the same category from a geometric distance mean between standard sounds of different categories while changing a value of each component of the selecting vector to 0 or 1, obtaining a square root of a sum of values, one of which is obtained by dividing a sample variance of the geometric distance between the standard sounds of the same category by a sample size thereof, and the other of which is obtained by dividing a sample variance of the geometric distance between the standard sounds of the different categories by a sample size thereof, calculating a Welch's test statistic as an objective function by dividing the difference in mean by the square root, and creating an optimum selecting vector that maximizes the objective function;

(w) setting an angle between the dual and selected standard pattern vector and the dual and selected input pattern vector, which are created by use of the optimum selecting vector, as the geometric distance between the original standard pattern vector and the original input pattern vector.

A second aspect of the present invention provides a method for judging abnormality in a structure, including the steps of:

obtaining, by using the method for detecting an abnormal sound according to the first aspect, a first geometric distance between an original standard pattern vector having a feature quantity of a normal standard sound as a component and an original input pattern vector having a feature quantity of an unknown input sound as a component and also obtaining a second geometric distance between an original standard pattern vector having a feature quantity of an abnormal standard sound as a component and the original input pattern vector;

comparing the first geometric distance and the second geometric distance; and judging the input sound as normal when the first geometric distance is not more than the second geometric distance and judging the input sound as abnormal when the first geometric distance is greater than the second geometric distance.

Next, a third aspect of the present invention provides a method for detecting a similarity between oscillation waves, including the steps of:

(a) creating an original standard pattern vector having a feature quantity of a standard oscillation wave as a component and an original input pattern vector having a feature quantity of an input oscillation wave as a component;

(b) creating any reference shape having a variance that varies from one specified component to another of the original pattern vector, creating a reference pattern vector having component values representing the reference shape, and creating a skewness-weighting vector having a rate of change in a skewness of the reference pattern vector as a component;

(c) obtaining a length between a specified component of the original standard pattern vector and each of components thereof, calculating a component number of the skewness-weighting vector closest to a position away from the center of the skewness-weighting vector by the length, obtaining a product of a component value of the component number of the skewness-weighting vector and a component value of each component of the original standard pattern vector, and calculating a product-sum by summing each product with respect to a component number of the original standard pattern vector;

(d) obtaining, in the calculation of the product-sum, the product-sum while moving the specified component of the original standard pattern vector to a position of each component, and creating a skewness-weighted standard pattern vector having the product-sum as a component value of the specified component;

(e) obtaining a length between a specified component of the original input pattern vector and each of components thereof, calculating a component number of the skewness-weighting vector closest to a position away from the center of the skewness-weighting vector by the length, obtaining a product of a component value of the component number of the skewness-weighting vector and a component value of each component of the original input pattern vector, and calculating a product-sum by summing each product with respect to a component number of the original input pattern vector;

(f) obtaining, in the calculation of the product-sum, the product-sum while moving the specified component of the original input pattern vector to a position of each component, and creating a skewness-weighted input pattern vector having the product-sum as a component value of the specified component;

(g) setting an angle between the skewness-weighted standard pattern vector and the skewness-weighted input pattern vector as a skewness geometric distance between the original standard pattern vector and the original input pattern vector;

(h) creating a skewness-weighting vector while changing the variance of the reference shape, obtaining a difference in mean by subtracting a skewness geometric distance mean between standard oscillation waves of the same category from a skewness geometric distance mean between standard oscillation waves of different categories, obtaining a square root of a sum of values, one of which is obtained by dividing a sample variance of the skewness geometric distance between the standard oscillation waves of the same category by a sample size thereof, and the other of which is obtained by dividing a sample variance of the skewness geometric distance between the standard oscillation waves of the different categories by a sample size thereof, calculating a Welch's test statistic as an objective function by dividing the difference in mean by the square root, and creating an optimum skewness-weighting vector that maximizes the objective function;

(i) creating a skewness-weighted standard pattern vector and a skewness-weighted input pattern vector by use of the optimum skewness-weighting vector;

(j) creating any reference shape having a variance that varies from one specified component to another of the original pattern vector, creating a reference pattern vector having component values representing the reference shape, and creating a kurtosis-weighting vector having a rate of change in a kurtosis of the reference pattern vector as a component;

(k) obtaining a length between a specified component of the original standard pattern vector and each of the components thereof, calculating a component number of the kurtosis-weighting vector closest to a position away from the center of the kurtosis-weighting vector by the length, obtaining a product of a component value of the component number of the kurtosis-weighting vector and a component value of each component of the original standard pattern vector, and calculating product-sum by summing each product with respect to a component number of the original standard pattern vector;

(l) obtaining, in the calculation of the product-sum, the product-sum while moving the specified component of the original standard pattern vector to a position of each component, and creating a kurtosis-weighted standard pattern vector having the product-sum as a component value of the specified component;

(m) obtaining a length between a specified component of the original input pattern vector and each of the components thereof, calculating a component number of the kurtosis-weighting vector closest to a position away from the center of the kurtosis-weighting vector by the length, obtaining a product of a component value of the component number of the kurtosis-weighting vector and a component value of each component of the original input pattern vector, and calculating a product-sum by summing each product with respect to a component number of the original input pattern vector;

(n) obtaining, in the calculation of the product-sum, the product-sum while moving the specified component of the original input pattern vector to a position of each component, and creating a kurtosis-weighted input pattern vector having the product-sum as a component value of the specified component;

(o) setting an angle between the kurtosis-weighted standard pattern vector and the kurtosis-weighted input pattern vector as a kurtosis geometric distance between the original standard pattern vector and the original input pattern vector;

(p) creating a kurtosis-weighting vector while changing the variance of the reference shape, obtaining a difference in mean by subtracting a kurtosis geometric distance mean between standard oscillation waves of the same category from a kurtosis geometric distance mean between standard oscillation waves of different categories, obtaining a square root of a sum of values, one of which is obtained by dividing a sample variance of the kurtosis geometric distance between the standard oscillation waves of the same category by a sample size thereof, and the other of which is obtained by dividing a sample variance of the kurtosis geometric distance between the standard oscillation waves of the different categories by a sample size thereof, calculating a Welch's test statistic as an objective function by dividing the difference in mean by the square root, and creating an optimum kurtosis-weighting vector that maximizes the objective function;

(q) creating a kurtosis-weighted standard pattern vector and a kurtosis-weighted input pattern vector by use of the optimum kurtosis-weighting vector;

(r) normalizing magnitudes of the skewness-weighted standard pattern vector and the kurtosis-weighted standard pattern vector to 1, and combining the normalized skewness-weighted standard pattern vector and the normalized kurtosis-weighted standard pattern vector to create a dual and weighted standard pattern vector;

(s) normalizing magnitudes of the skewness-weighted input pattern vector and the kurtosis-weighted input pattern vector to 1, and combining the normalized skewness-weighted input pattern vector and the normalized kurtosis-weighted input pattern vector to create a dual and weighted input pattern vector;

(t) creating a selecting vector having the same number of components as those of the dual and weighted standard pattern vector and dual and weighted input pattern vector and having 0 or 1 as a component, obtaining a product of a component value of each component of the dual and weighted standard pattern vector and a component value of the corresponding component of the selecting vector, the components having the same component number, and obtaining a product of a component value of each component of the dual and weighted input pattern vector and a component value of the corresponding component of the selecting vector, the components having the same component number, thereby creating a dual and selected standard pattern vector and a dual and selected input pattern vector having the corresponding products as component values;

(u) setting an angle between the dual and selected standard pattern vector and the dual and selected input pattern vector as a geometric distance between the original standard pattern vector and the original input pattern vector;

(v) obtaining a difference in mean by subtracting a geometric distance mean between standard sounds of the same category from a geometric distance mean between standard sounds of different categories while changing a value of each component of the selecting vector to 0 or 1, obtaining a square root of a sum of values, one of which is obtained by dividing a sample variance of the geometric distance between the standard sounds of the same category by a sample size thereof, and the other of which is obtained by dividing a sample variance of the geometric distance between the standard sounds of the different categories by a sample size thereof, calculating a Welch's test statistic as an objective function by dividing the difference in mean by the square root, and creating an optimum selecting vector that maximizes the objective function;

(w) setting an angle between the dual and selected standard pattern vector and the dual and selected input pattern vector, which are created by use of the optimum selecting vector, as the geometric distance between the original standard pattern vector and the original input pattern vector.

A fourth aspect of the present invention provides a method for recognizing a voice, including the steps of:

obtaining, by using the method for detecting a similarity between oscillation waves according to the third aspect, a first geometric distance between an original standard pattern vector having a feature quantity of a standard voice of category 1 as a component and an original input pattern vector having a feature quantity of an unknown input voice as a component and also obtaining a second geometric distance between an original standard pattern vector having a feature quantity of a standard voice of category 2 as a component and the original input pattern vector;

comparing the first geometric distance and the second geometric distance; and judging that the input voice belongs to category 1 when the first geometric distance is not more than the second geometric distance and judging that the input voice belongs to category 2 when the first geometric distance is greater than the second geometric distance.

Advantageous Effects of Invention

In the method for detecting an abnormal sound according to the present invention, the skewness-weighted standard pattern vector, skewness-weighted input pattern vector, kurtosis-weighted standard pattern vector and kurtosis-weighted input pattern vector are created by using the optimized skewness-weighting vector and kurtosis-weighting vector. Next, the magnitudes of the skewness-weighted standard pattern vector and the kurtosis-weighted standard pattern vector are normalized to 1, and the skewness-weighted standard pattern vector and the kurtosis-weighted standard pattern vector, which are obtained by the normalization, are combined to create a dual and weighted standard pattern vector. Similarly, the magnitudes of the skewness-weighted input pattern vector and the kurtosis-weighted input pattern vector are normalized to 1, and the skewness-weighted input pattern vector and the kurtosis-weighted input pattern vector, which are obtained by the normalization, are combined to create a dual and weighted input pattern vector. Further, the dual and selected standard pattern vector and the dual and selected input pattern vector are created by selecting the component values that improve the similarity detection accuracy and excluding the component values that lower the similarity detection accuracy (setting the component values to 0) in the above dual and weighted standard pattern vector and dual and weighted input pattern vector. Then, the angle between the dual and selected standard pattern vector and the dual and selected input pattern vector is numerically evaluated as a geometric distance value between the original standard pattern vector and the original input pattern vector. Thus, an accurate detected value of the similarity between sounds generated by hitting a concrete structure using a hammer can be obtained.

Moreover, the method for judging abnormality in the structure according to the present invention has an advantage that judgment criteria become reliable since it is judged if there is abnormality, based on an accurate detected value of the abnormal sound, and the accuracy of detecting abnormality in the structure can be significantly improved.

Further, in the method for detecting a similarity between oscillation waves according to the present invention, the skewness-weighted standard pattern vector, skewness-weighted input pattern vector, kurtosis-weighted standard pattern vector and kurtosis-weighted input pattern vector are created by using the optimized skewness-weighting vector and kurtosis-weighting vector. Next, the magnitudes of the skewness-weighted standard pattern vector and the kurtosis-weighted standard pattern vector are normalized to 1, and the skewness-weighted standard pattern vector and the kurtosis-weighted standard pattern vector, which are obtained by the normalization, are combined to create a dual and weighted standard pattern vector. Similarly, the magnitudes of the skewness-weighted input pattern vector and the kurtosis-weighted input pattern vector are normalized to 1, and the skewness-weighted input pattern vector and the kurtosis-weighted input pattern vector, which are obtained by the normalization, are combined to create a dual and weighted input pattern vector. Further, the dual and selected standard pattern vector and the dual and selected input pattern vector are created by selecting the component values that improve the similarity detection accuracy and excluding the component values that lower the similarity detection accuracy (setting the component values to 0) in the above dual and weighted standard pattern vector and dual and weighted input pattern vector. Then, the angle between the dual and selected standard pattern vector and the dual and selected input pattern vector is numerically evaluated as a geometric distance value between the original standard pattern vector and the original input pattern vector. Thus, an accurate detected value of the similarity can be obtained.

Moreover, the method for recognizing a voice according to the present invention has an advantage that judgment criteria become reliable since voice recognition is performed based on an accurate detected value of the similarity, and the accuracy of the voice recognition can be significantly improved.

BRIEF DESCRIPTION OF DRAWINGS

FIG. 7(*b*) is a set of graphs showing an example of a shape of a standard pattern, shapes of input patterns where a "wobble" occurs in the shape of the standard pattern and a shape of an input pattern having a single peak.

FIG. 8(*b*) is a graph showing an experimental result of skewness geometric distance in Experiment Example 1 with respect to the standard and input patterns shown in FIG. 7(*b*).

FIG. 9(*b*) is a graph showing an experimental result of kurtosis geometric distance in Experiment Example 2 with respect to the standard and input patterns shown in FIG. 7(*b*).

FIG. 20(*b*) is a graph showing an experimental result of skewness geometric distance in Experiment Example 5 with respect to the standard and input patterns shown in FIG. 7(*b*).

FIG. 25(*b*) is a block diagram showing a flowchart for calculating an approximate value of a skewness geometric distance during the input pattern recognition process.

FIG. 26(*b*) is a graph showing an experimental result of skewness geometric distance in Experiment Example 6 with respect to the standard and input patterns shown in FIG. 7(*b*).

FIG. 31(*b*) is a block diagram showing a flowchart for calculating an approximate value of a kurtosis geometric distance during the input pattern recognition process.

FIG. 32(*b*) is a graph showing an experimental result of kurtosis geometric distance in Experiment Example 7 with respect to the standard and input patterns shown in FIG. 7(*b*).

FIG. 51 is a diagram showing combinations of categories 1 to 4.

DESCRIPTION OF EMBODIMENTS

Figure 1:
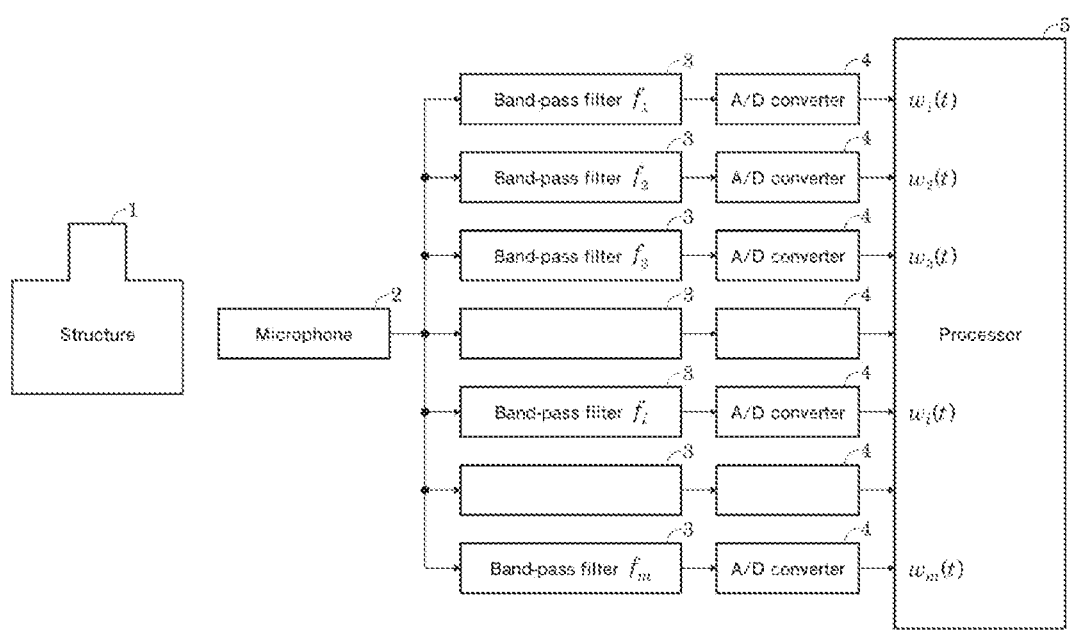
FIG. 1 is a block diagram showing a configuration of a measurement apparatus for an abnormal sound in one embodiment of the present invention.

Hereinafter, embodiments of the present invention will be described.

{Description of Principles}

As for a method for calculating a new geometric distance value between an original standard pattern vector (one dimension) and an original input pattern vector (one dimension) by use of a normal distribution as a reference shape, the principles of the present invention will be described.

In the prior arts, first, a difference in shapes between standard and input patterns is replaced by a shape change in the reference shape (reference pattern) such as the normal distribution, and the magnitude of this shape change is numerically evaluated as a variable of "kurtosis". Then, the variable of "kurtosis" is obtained while moving the center axis of the reference pattern to each component position of the standard and input patterns, and the degree of similarity between the standard pattern and the input pattern is detected as a distance value by using these variables.

In the present invention, first, a difference in shapes between standard and input patterns is replaced by a shape change in the reference shape (reference pattern) such as the normal distribution, and the magnitude of this shape change is numerically evaluated as a variable of "skewness". Then, the variable of "skewness" is obtained while moving the center axis of the reference pattern to each component position of the standard and input patterns, and the degree of similarity between the standard pattern and the input pattern is detected as a distance value by using these variables.

Namely, this embodiment shows that, even when the magnitude of the shape change in the reference pattern is numerically evaluated as the variable of "skewness" instead of the method of the prior art wherein the magnitude of the shape change in the reference pattern is numerically evaluated as the variable of "kurtosis", the degree of similarity between the standard pattern and the input pattern can be detected as the distance value as in the case of the prior arts.

In the prior arts, secondly, a reference pattern vector whose component values are normally distributed is created, and a kurtosis-weighting vector having a value of a change rate of "kurtosis" of the above reference pattern vector as a component is created in advance. Then, as for an original standard pattern vector created without normalizing a power spectrum pattern of a sound, the product-sum of a component value of the kurtosis-weighting vector and a component value of the original standard pattern vector is calculated. In this case, a kurtosis-weighted standard pattern vector is created by obtaining the product-sum while moving the center axis of the kurtosis-weighting vector to each component position of the original standard pattern vector. Similarly, as for an original input pattern vector created without normalizing a power spectrum pattern of a sound, the product-sum of a component value of the kurtosis-weighting vector and a component value of the original input pattern vector is calculated. In this case, a kurtosis-weighted input pattern vector is created by obtaining the product-sum while moving the center axis of the kurtosis-weighting vector to each component position of the original input pattern vector. Then, an angle between the above kurtosis-weighted standard pattern vector and the kurtosis-weighted input pattern vector is set as a kurtosis geometric distance value between the original standard pattern vector and the original input pattern vector.

In the present invention, secondly, a reference pattern vector whose component values are normally distributed is created, and a skewness-weighting vector having a value of a change rate of "skewness" of the above reference pattern vector as a component is created in advance. Then, as for an original standard pattern vector created without normalizing a power spectrum pattern of a sound, the product-sum of a component value of the skewness-weighting vector and a component value of the original standard pattern vector is calculated. In this case, a skewness-weighted standard pattern vector is created by obtaining the product-sum while moving the center axis of the skewness-weighting vector to each component position of the original standard pattern vector. Similarly, as for an original input pattern vector created without normalizing a power spectrum pattern of a sound, the product-sum of a component value of the skewness-weighting vector and a component value of the original input pattern vector is calculated. In this case, a skewness-weighted input pattern vector is created by obtaining the product-sum while moving the center axis of the skewness-weighting vector to each component position of the original input pattern vector. Then, an angle between the above skewness-weighted standard pattern vector and the skewness-weighted input pattern vector is set as a skewness geometric distance value between the original standard pattern vector and the original input pattern vector.

Namely, this embodiment shows that, even when the skewness-weighting vector having a value of a change rate of "skewness" of the reference pattern vector as a component is used instead of the method of the prior art using the kurtosis-weighting vector having a value of a change rate of "kurtosis" of the reference pattern vector as a component, the degree of similarity between the original standard pattern vector and the original input pattern vector can be detected as a skewness geometric distance value as in the case of the prior arts.

After showing the above first and second methods, in the present invention, a skewness-weighted standard pattern vector, a skewness-weighted input pattern vector, a kurtosis-weighted standard pattern vector and a kurtosis-weighted input pattern vector are created by using the skewness-weighting vector and kurtosis-weighting vector. Next, the skewness-weighted standard pattern vector and the kurtosis-weighted standard pattern vector are combined to create a dual and weighted standard pattern vector. Similarly, the skewness-weighted input pattern vector and the kurtosis-weighted input pattern vector are combined to create a dual and weighted input pattern vector. Further, a dual and selected standard pattern vector and a dual and selected input pattern vector are created by selecting a component value that improves the similarity detection accuracy and excluding a component value that lowers the similarity detection accuracy (setting the component value to 0) in the above dual and weighted standard pattern vector and dual and weighted input pattern vector. Then, an angle between the dual and selected standard pattern vector and the dual and selected input pattern vector is set as a geometric distance value between the original standard pattern vector and the original input pattern vector.

Figure 53:
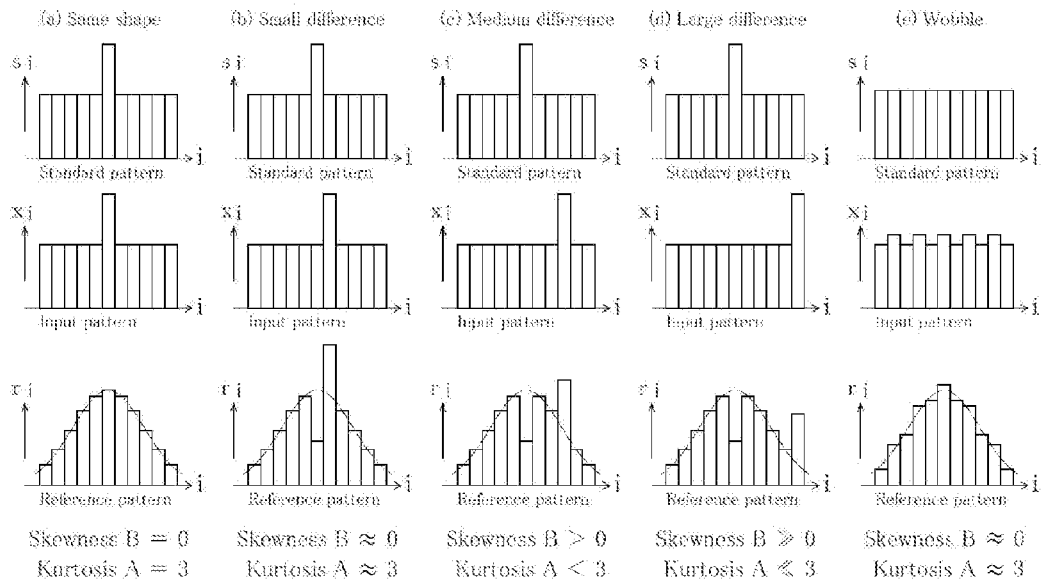
FIG. 53 is a set of graphs showing, with regard to the prior arts, typical examples of a standard pattern shape and an input pattern shape as well as shape changes in a reference pattern vector in those typical examples.
Figure 54:
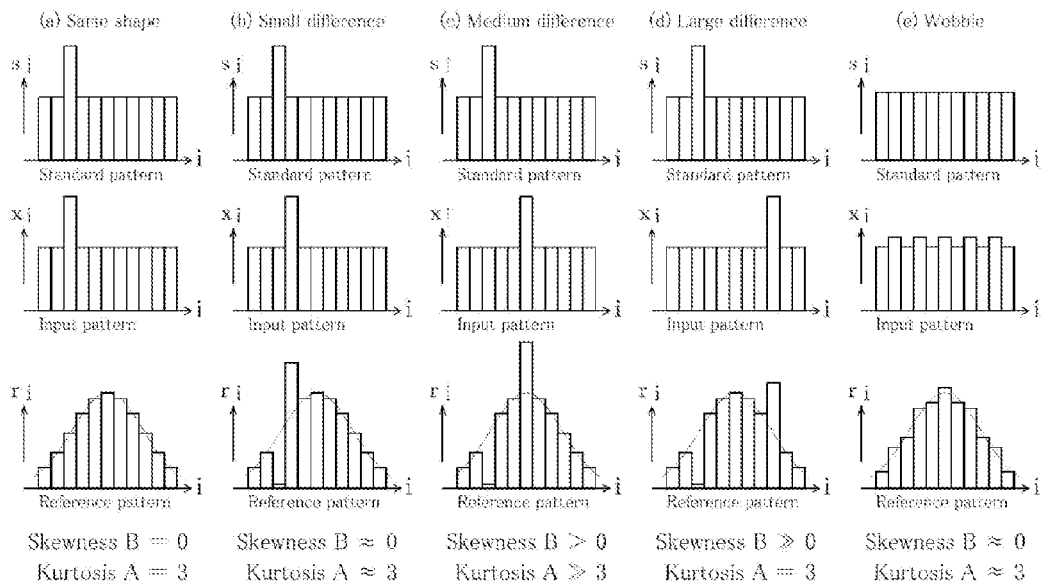
FIG. 54 is a set of graphs showing, with regard to the prior arts, typical examples where the positions of peaks of the standard pattern shape and input pattern shape in FIG. 53 are shifted to the left, as well as shape changes in a reference pattern vector in those typical examples.
Figure 55:
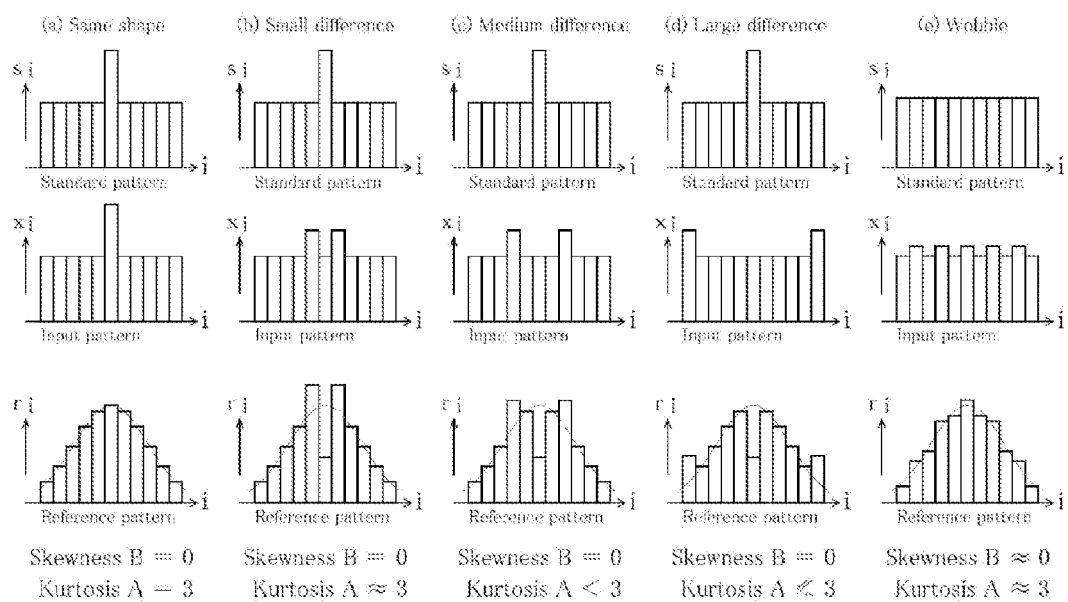
FIG. 55 is a set of graphs showing, with regard to the prior arts, other typical examples of a standard pattern shape and an input pattern shape as well as shape changes of a reference pattern vector in those typical examples.

Namely, a method for detecting an abnormal sound is provided, capable of obtaining an accurate geometric distance value between the original standard pattern vector and the original input pattern vector by selecting the component value that improves the similarity detection accuracy and excluding the component value that lowers the similarity detection accuracy (setting the component value to 0) in the dual and weighted standard/input pattern vectors, in order to distinguish the component positions of the standard and input patterns that improve the similarity detection accuracy from those that lower the similarity detection accuracy with regard to the relative positional relationship between the reference pattern and the standard and input patterns as shown in the examples of FIGS. 53 to 55 while increasing an information amount by use of "skewness" and "kurtosis" in a complementary manner.

To be more specific, an angle between the skewness-weighted standard pattern vector and the skewness-weighted input pattern vector is set as a skewness geometric distance value between the original standard pattern vector and the original input pattern vector. Next, a skewness-weighting vector is created while changing the value of variance of the normal distribution, and a value of a difference in mean is obtained by subtracting a skewness geometric distance mean between standard sounds of the same category from a skewness geometric distance mean between standard sounds of the different categories. Then, we obtain the square root of the sum of a value obtained by dividing a sample variance of the skewness geometric distance between the standard sounds of the different categories by the sample size and a value obtained by dividing a sample variance of the skew-ness geometric distance between the standard sounds of the same category by the sample size. Thereafter, a Welch's test statistic is calculated as a value of an objective function by dividing the above value of the difference in mean by the square root, and an optimum skewness-weighting vector that maximizes the value of the objective function is created. Then, a skewness-weighted standard pattern vector and a skewness-weighted input pattern vector are created by use of the above optimum skewness-weighting vector.

Similarly, an angle between the kurtosis-weighted standard pattern vector and the kurtosis-weighted input pattern vector are set as a kurtosis geometric distance value between the original standard pattern vector and the original input pattern vector. Next, a kurtosis-weighting vector is created while changing the value of variance of the normal distribution, and a value of a difference in mean is obtained by subtracting a kurtosis geometric distance mean between standard sounds of the same category from a kurtosis geometric distance mean between standard sounds of the different categories. Then, we obtain the square root of the sum of a value obtained by dividing a sample variance of the kurtosis geometric distance between the standard sounds of the different categories by the sample size and a value obtained by dividing a sample variance of the kurtosis geometric distance between the standard sounds of the same category by the sample size. Thereafter, a Welch's test statistic is calculated as a value of an objective function by dividing the above value of the difference in mean by the square root, and an optimum kurtosis-weighting vector that maximizes the value of the objective function is created. Then, a kurtosis-weighted standard pattern vector and a kurtosis-weighted input pattern vector are created by use of the above optimum kurtosis-weighting vector.

Further, the magnitudes of the above skewness-weighted standard pattern vector and the above kurtosis-weighted standard pattern vector are each normalized to 1, and the normalized skewness-weighted standard pattern vector and the normalized kurtosis-weighted standard pattern vector are combined to create a dual and weighted standard pattern vector.

Similarly, the magnitudes of the above skewness-weighted input pattern vector and the above kurtosis-weighted input pattern vector are each normalized to 1, and the normalized skewness-weighted input pattern vector and the normalized kurtosis-weighted input pattern vector are combined to create a dual and weighted input pattern vector.

Next, a selecting vector is created, having the same number of components as those of the above dual and weighted standard pattern vector and dual and weighted input pattern vector and having 0 or 1 as a component, and we obtain a value of the product of component values, one of which is taken from the dual and weighted standard pattern vector or the dual and weighted input pattern vector, and the other of which is from the above selecting vector, both component values having the same component number. Then, a dual and selected standard pattern vector and a dual and selected input pattern vector having the above value of the product as a component value are created. Thereafter, an angle between the above dual and selected standard pattern vector and the above dual and selected input pattern vector is set as a geometric distance value between the original standard pattern vector and the original input pattern vector.

Further, a value of a difference in mean is obtained by subtracting a geometric distance mean between standard sounds of the same category from a geometric distance mean between standard sounds of the different categories while changing the value of each component of the selecting vector to 0 or 1. Then, we obtain the square root of the sum of a value obtained by dividing a sample variance of the geometric distance between the standard sounds of the different categories by the sample size and a value obtained by dividing a sample variance of the geometric distance between the standard sounds of the same category by the sample size. Thereafter, a Welch' s test statistic is calculated as a value of an objective function by dividing the above value of the difference in mean by the square root, and an optimum selecting vector that maximizes the value of the objective function is created.

Lastly, an angle between the dual and selected standard pattern vector and the dual and selected input pattern vector, which are created by use of the above optimum selecting vector, is detected as a geometric distance value between the original standard pattern vector and the original input pattern vector.

Such a geometric distance value accurately detects a vector shape change between a standard sound (or a standard oscillation wave in the structure) and an input sound (or an input oscillation wave in the structure), and also accurately detects a similarity between any standard oscillation wave such as a standard voice and any input oscillation wave such as an input voice.

Therefore, a shape change between the original standard pattern vector and the original input pattern vector can be accurately detected by judging if there is abnormality in the structure by use of the geometric distance value thus obtained. Accordingly, the accuracy of detecting abnormality in the structure can be significantly improved. Moreover, the shape change between the original standard pattern vector and the original input pattern vector can be accurately detected by performing voice recognition using such a geometric distance value. Thus, the accuracy of voice recognition can be significantly improved.

Note that the above description holds true even when the objective functions for obtaining the optimum skewness-weighting vector, optimum kurtosis-weighting vector and optimum selecting vector are statistics other than Welch's test statistic or an abnormal sound recognition rate, a voice recognition rate or the like.

[Embodiment]

Now, referring to the drawings, an embodiment will be described. In the embodiment, for distinguishing an abnormal sound generated by hitting a concrete structure using a hammer from a normal sound, standard and input pattern vectors are created using frequency distributions of standard and input sounds, respectively. Further, a difference in shapes between these vectors is replaced by a shape change in a reference pattern vector whose component values are normally distributed, and the magnitude of this shape change is numerically evaluated as a variable of the "skewness" and a variable of the "kurtosis". Then, the abnormal sound is detected based on these variables, and abnormality in the structure is judged by use of the detected value.

Therefore, in this embodiment, first of all, we show that we can detect the degree of similarity between the standard and input patterns as a distance by numerically evaluating the magnitude of the shape change in the reference pattern as a variable of the "skewness", instead of numerically evaluating the magnitude of the shape change in the reference pattern as a variable of the "kurtosis". Similarly to the "kurtosis" in the prior arts, we can use the "skewness".

FIG. 1 shows a configuration of a measurement apparatus for detecting an abnormal sound. In FIG. 1, 1 denotes a target structure to be inspected, and 2 denotes a microphone. The microphone 2 is set at a predetermined position near the structure 1. The microphone 2 measures a sound wave generated by hitting the structure 1 using a hammer and outputs its signal. The signal from the microphone 2 is input to m band-pass filters 3 having different passbands fl to fm. Then each sound wave signal, having a frequency component corresponding to each band-pass filter 3, is extracted and given to each analog to digital converter (A/D converter) 4. These signals are converted at same time and periodically to digital signals, respectively, and given to a processor 5 such as a computer. The processor 5 is constructed to detect an abnormal sound based on the output signal from the microphone 2 as mentioned below. The i-th (i=1, 2, . . . , m) band-pass filter 3 is set at a central frequency fi and the output signal of the i-th band-pass filter 3 is input to an i-th A/D converter 4.

Figure 2:
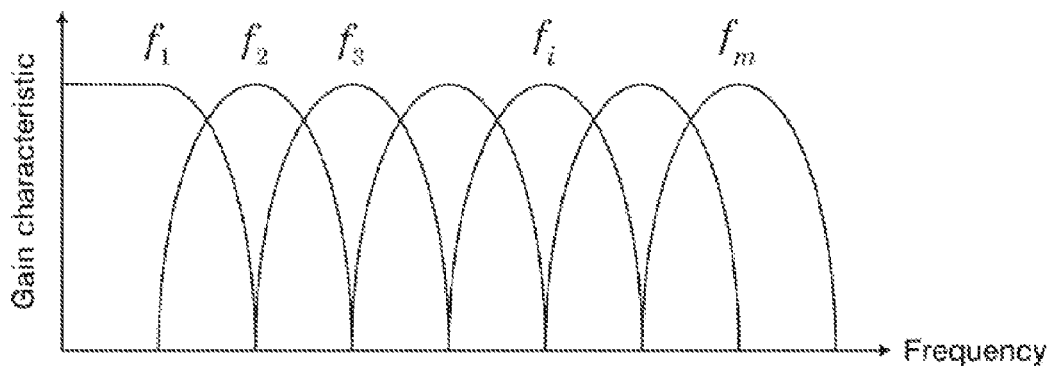
FIG. 2 is a graph showing one example of a frequency gain characteristic of a group of band-pass filters.

Next, processing procedures for detecting the abnormal sound by using the measuring apparatus shown in FIG. 1 are described. While many kinds of methods for extracting a power spectrum of a sound wave have been developed, in this embodiment, a method using a group of analog band-pass filters is employed because the method has been used for a long time and a performance of the method is stable. FIG. 2 shows an example of a frequency gain characteristic of the group of band-pass filters 3. In FIG. 2, a frequency component having a band, the center frequency of which is fi, is extracted by inputting the sound wave signal into the i-th band-pass filter. Then, by setting each band-pass filter in this manner, it is possible to extract a feature of a frequency distribution of the sound wave.

As shown in FIG. 1, assuming that the output signal from the i-th A/D converter 4 is wi(t) (i=1, 2, . . . m) as a function of time t, the function wi(t) is a frequency component of the sound wave extracted by the i-th band-pass filter 3. Therefore, a power spectrum Pi of the i-th frequency band is calculated by the following equation 1, wherein any time length T for calculating a sum of the function wi(t)'s squared is set so that a change with time in a feature of the sound wave may significantly appear.

$$P_i = \sum_{t=0}^{T} \{w_i(t)\}^2 \quad \text{\{Equation 1\}}$$

$$(i = 1, 2, 3, \ldots, m)$$

Figure 3:
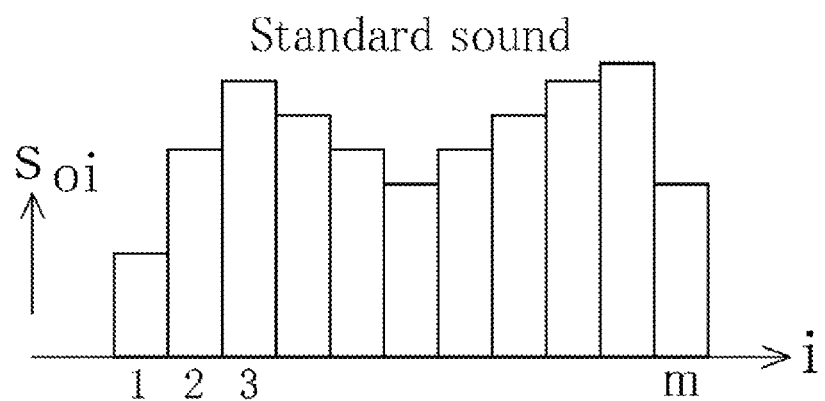
FIG. 3 is a set of graphs showing one example of power spectra of standard and input sounds.
Figure 3:
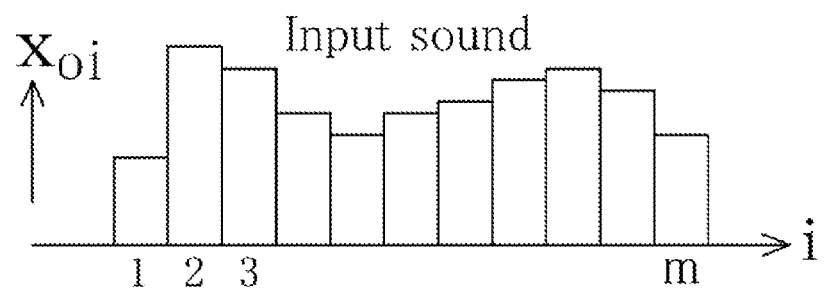

FIG. 3 gives an example of the power spectra of standard and input sounds. Here, we create an original standard pattern vector so having the power spectrum value Pi (i=1, 2, . . . , m) of the standard sound as a component value soi (i=1, 2, . . . , m) and an original input pattern vector xo having the power spectrum value Pi (i=1, 2, . . . , m) of the input sound as a component value xoi (i=1, 2, . . . , m). We represent them as the following equation 2.

$$s_o = (s_{o1}, s_{o2}, \ldots, s_{oi}, \ldots, s_{om})$$

$$x_o = (x_{o1}, x_{o2}, \ldots x_{oi}, \ldots, x_{om}) \quad \text{\{Equation 2\}}$$

Next, the component values soi and xoi are divided by the summation of soi and the summation of xoi respectively in equation 2, and normalized power spectra si and xi have been calculated. Then, we create a standard pattern vector s having si as its components, and an input pattern vector x having xi as its components, and represent them as the following equation 3.

$$s=(s_1, s_2, \ldots, s_i, \ldots, s_m)$$

$$x=(x_1, x_2, \ldots, x_i, \ldots, x_m) \quad \{\text{Equation 3}\}$$

If we assign constants cs and cx to the summation of soi and the summation of xoi respectively in equation 2, we can show the relationship between component values of equations 2 and 3 as the following equation 4.

$$s_i = s_{oi}/c_s$$

$$x_i = x_{oi}/c_x \quad \{\text{Equation 4}\}$$

$$(i=1, 2, 3, \ldots, m)$$

Also, the component values soi and xoi are divided by the maximum value of soi and the maximum value of xoi respectively in equation 2, and normalized power spectra s'i and x'i have been calculated. Then, we create a standard pattern vector s' having s'i as its components, and an input pattern vector x' having x'i as its components, and represent them as the following equation 5.

$$s'=(s'_1, s'_2, \ldots, s'_i, \ldots, s'_m)$$

$$x'=(x'_1, x'_2, \ldots, x'_i, \ldots, x'_m) \quad \{\text{Equation 5}\}$$

If we assign constants c's and c'x to the maximum value of soi and the maximum value of xoi respectively in equation 2, we can show the relationship between component values of equations 2 and 5 as the following equation 6.

$$s'_i = s_{oi}/c'_s$$

$$x'_i = x_{oi}/c'_x \quad \{\text{Equation 6}\}$$

$$(i=1, 2, 3, \ldots, m)$$

Equations 2, 3 and 5 express the shapes of the power spectra of the standard sound and input sound by the m pieces of component values of the pattern vector. Note that in this embodiment the width of each bar graph is 1/m for power spectrum shown in FIG. 3. The area and the maximum values usually differ between so and xo shown in equations 2 and FIG. 3. Meanwhile, the areas of s and x shown in equations 3 are the same and the maximum values of s' and x' shown in equations 5 are the same.

The following equation 7 is a probability density function of the normal distribution. Where $\mu$ is mean, and $\sigma^2$ is variance.

$$f(u) = \frac{1}{\sigma\sqrt{2\pi}} \exp\left\{-\frac{1}{2}\left(\frac{u-\mu}{\sigma}\right)^2\right\} \quad \{\text{Equation 7}\}$$

FIGS. 4(a) and 4(b) give an example of the shapes of the standard pattern vector s and the input pattern vector x shown in equation 3. Next, the difference in shapes between standard and input patterns is replaced by the shape change in the normal distribution, and the magnitude of this shape change is numerically evaluated as a variable of the "skewness". However, in general, an equation for calculating the skewness of the vector cannot be defined if the component value of the vector is negative. Therefore, we create a pair of reference patterns that have a normal distribution as their initial shapes so that the change in the component value of the vector may not decrease. FIGS. 4(c) and 4(d) show the bar graphs (reference patterns), each having the same height as function values $r^{(+)}i$ and $r^{(-)}i$ of their normal distribution. Here, we create a positive reference pattern vector $r^{(+)}$ having $r^{(+)}i$ as its components, and a negative reference pattern vector $r^{(-)}$ having $r^{(-)}i$ as its components, and represent them as the following equation 8.

$$r^{(+)}=(r_1^{(+)}, r_2^{(+)}, \ldots, r_i^{(+)}, \ldots, r_m^{(+)})$$

$$r^{(-)}=(r_1^{(-)}, r_2^{(-)}, \ldots, r_i^{(-)}, \ldots, r_m^{(-)}) \quad \{\text{Equation 8}\}$$

It is recognized from FIGS. 4(c) and 4(d) that a pair of the reference pattern vectors $r^{(-)}$ and $r^{(-)}$ are equivalent vectors. Equation 8 expresses the shape of a normal distribution by the m pieces of component values of pattern vector. Note that the number of components of equation 8 is supposed to be equal to m, which is the number of components of equation 3, and all bar graphs of FIGS. 4(a) to 4(d) have the same width. Further, while in this embodiment the number m is an odd number, the same discussion holds in case of m being an even number. Also, as shown in FIGS. 4(c) and 4(d), the center axis of a normal distribution is assumed to locate at the center of standard and input patterns. It is possible to set the variance value $\sigma^2$ of the normal distribution in any ranges which enable to express a feature of the shape of the normal distribution by m components of the vector. Note that, from the experiments, we found that we can obtain the effective results when we create the reference pattern vectors using the range of $-2.1\sigma$ to $+2.1\sigma$ of the normal distribution. Therefore, in this embodiment, we use the range of $-2.1\sigma$ to $+2.1\sigma$ of the normal distribution.

Next, a difference in shapes between standard pattern vector s and input pattern vector x shown in equation 3 is replaced by the shape changes in positive reference pattern vector $r^{(+)}$ and negative reference pattern vector $r^{(-)}$ using the following equation 9. Note that, in equation 9, $r^{(+)}i$ and $r^{(-)}i$ on the right side show the component values of positive and negative reference pattern vectors having the shape of the normal distribution, and those on the left side show the components after the shape has changed. In equation 9, if component value xi of the input pattern vector is greater than component value si of the standard pattern vector, component value $r^{(+)}i$ of the positive reference pattern vector increases by |xi−si| from the normal distribution value. Also, if xi is smaller than si, component value $r^{(-)}i$ of the negative reference pattern vector increases by |xi−si| from the normal distribution value. Thus, the values $r^{(+)}i$ and $r^{(-)}i$ do not decrease in equation 9.

For i=1, 2, 3, . . . , m;

if $x_i > s_i$, then $r_i^{(+)} \leftarrow r_i^{(+)} + |x_i - s_i|$ if $x_i > s_i$, then $r_i^{(-)} \leftarrow r_i^{(-)} + |x_i - s_i|$ {Equation 9}

Figure 5:
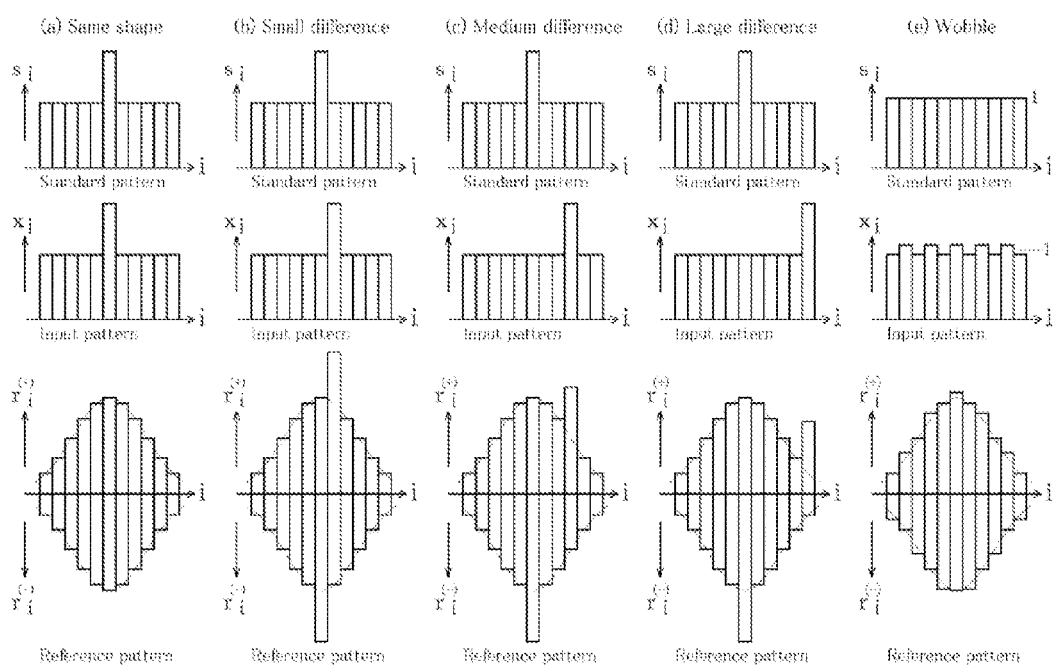
FIG. 5 is a set of graphs showing a typical example of shapes of standard and input patterns, and shape changes in positive and negative reference pattern vectors.

Next, we explain equation 9 using a typical example shown in FIG. 5. FIG. 5 represents the components of the vector as a shape of the vector by the graph. The upper and middle diagrams of FIGS. 5(a) to 5(e) show a typical example of the shapes of the standard and input pattern vectors. FIGS. 5(a) to 5(d) show the standard and input patterns having a single peak. FIG. 5(e) schematically shows the standard pattern having a flat shape and the input pattern where a "wobble" occurs in the flat shape. Also, the bottom diagrams of FIGS. 5(a) to 5(e) show an example where a difference in shapes between the standard and input patterns is replaced by the shape changes in a pair of reference patterns having the normal distribution as their initial shapes. Note that the peaks of the standard and input patterns shown in FIGS. 5(a) to 5(d) are assumed to have the same height, and the area of each standard pattern and each input pattern shown in FIGS. 5(a) to 5(e) is equal to 1. Also, note that the shape of the negative reference pattern vector is shown upsidedown in order to compare it with the shape of the positive reference pattern vector.

FIG. 5(a) gives an example of the case where standard pattern and input patterns have the same shape. Because values $r^{(+)}i$ and $r^{(-)}i$ of equation 9 do not change during this time, a pair of the reference patterns shown in FIG. 5(a) do not change in their shapes from the normal distribution.

FIGS. 5(b), 5(c) and 5(d) respectively show an example exhibiting a small, medium, and large "difference" in peaks between the standard and input patterns. If equation 9 is represented by the shapes, as shown in FIGS. 5(b), 5(c) and 5(d), value $r^{(-)}i$ increases by the absolute value of the difference between the component value of the standard pattern and the component value of the input pattern at peak position of each standard pattern. At the same time, value $r^{(+)}i$ increases by the absolute value of the difference between the component value of the standard pattern and the component value of the input pattern at peak position of each input pattern.

In FIG. 5(e), a pair of reference patterns shown in FIG. 5(e) have small shape changes from the normal distribution, because values $r^{(+)}i$ and $r^{(-)}i$ increase alternately by the absolute value of the difference between the component value of the standard pattern and the component value of the input pattern in equation 9.

While FIG. 5 shows a typical example exhibiting shapes of the standard pattern vector and the input pattern vector, in general, almost all parts of the input pattern vector are changed from the shape of the standard pattern vector, and equation 9 is used to calculate every shape change in all changed parts. Equation 9 is adaptive to any standard pattern vector and any input pattern vector because equation 9 deals with a relative shape change instead of an absolute shape change.

Next, for a pair of the reference patterns (the positive reference pattern vector $r^{(+)}$ and the negative reference pattern vector $r^{(-)}$ whose shapes have been changed by equation 9, the magnitude of shape change is numerically evaluated as the variable of "skewness".

The skewness $B^{(+)}$ of the positive reference pattern vector $r^{(+)}$ and the skewness $B^{(-)}$ of the negative reference pattern vector $r^{(-)}$ can be calculated using the following equation 10, where, Li (i=1, 2, ..., m) in equation 10 is a deviation from the center axis of the normal distribution as shown in FIGS. 4(c) and 4(d), and the deviation Li is set in any range which enable to express a feature of the shape of the normal distribution.

$$B^{(+)} = \frac{\left\{\sqrt{\sum_{i=1}^{m} r_i^{(+)}}\right\} \cdot \left\{\sum_{i=1}^{m} (L_i)^3 \cdot r_i^{(+)}\right\}}{\left\{\sum_{i=1}^{m} (L_i)^2 \cdot r_i^{(+)}\right\}^{\frac{3}{2}}}$$

$$B^{(-)} = \frac{\left\{\sqrt{\sum_{i=1}^{m} r_i^{(-)}}\right\} \cdot \left\{\sum_{i=1}^{m} (L_i)^3 \cdot r_i^{(-)}\right\}}{\left\{\sum_{i=1}^{m} (L_i)^2 \cdot r_i^{(-)}\right\}^{\frac{3}{2}}}$$

{Equation 10}

The skewness $B^{(+)}$ and the skewness $B^{(-)}$ are ratios of a cubic moment around the center axis of the normal distribution to a square root of a cube of a quadratic moment around the center axis of the normal distribution. It is possible to calculate a skewness value of the normal distribution and any reference shape using equation 10.

As described above, generally, it is impossible to determine a negative component of a vector in an equation for calculating the skewness of the vector. Namely, it is necessary that each component of the reference vector is not a negative value in any relation of great and small sizes between the standard pattern vector and the input pattern vector. For satisfying the above condition, the positive reference pattern vector $r^{(+)}$ and the negative reference pattern vector $r^{(-)}$ are created, wherein an initial value of the positive vector $r^{(+)}$ is equal to an initial value of the negative vector $r^{(-)}$. Equation 9 changes some components of those vectors $r^{(+)}$ and $r^{(-)}$ but does not decrease any component value of those vectors $r^{(+)}$ and $r^{(-)}$. In equation 10, the skewness $B^{(+)}$ and the skewness $B^{(-)}$ of those vectors $r^{(+)}$ and $r^{(-)}$ are calculated.

Next, from a change in the skewness $B^{(+)}$ of the positive reference pattern vector $r^{(+)}$ and a change in the skewness $B^{(-)}$ of the negative reference pattern vector $r^{(-)}$, a skewness shape variation D is calculated by using a difference ($B^{(-)}$ – $B^{(-)}$) between the skewness $B^{(+)}$ and the skewness $B^{(-)}$, wherein the skewness shape variation D expresses the degree of similarity between the standard pattern vector and the input pattern vector.

For example, a value of the skewness $B^{(+)}$ of the positive reference pattern vector $r^{(+)}$ initially created by equation 8, is equal to 0 and a value of the skewness $B^{(-)}$ of the negative reference pattern vector $r^{(-)}$ initially created by equation 8, is equal to 0. Therefore, a change in the skewness of the positive reference pattern vector $r^{(+)}$ changed by equation 9 is equal to $\{B^{(+)}-0\}$ and a change in the skewness of the negative reference pattern vector $r^{(-)}$ changed by equation 9 is equal to $\{B^{(-)}-0\}$. Namely, a change in a positive direction is $\{B^{(+)}-0\}$ and a change in a negative direction is $\{B^{(-)}-0\}$. Then overall change is a difference $\{B^{(+)}-0\}-\{B^{(-)}-0\}$. By the following equation 11, the skewness shape variation D indicating the overall shape change is calculated.

$$D = B^{(+)} - B^{(-)}$$ {Equation 11}

TABLE 2

| | FIG. 5 | | | | |
|---|---|---|---|---|---|
| | (a) | (b) | (c) | (d) | (e) |
| Increase of $r_i^{(+)}$ | $B^{(+)} = 0$ | $B^{(+)} \approx 0$ | $B^{(+)} > 0$ | $B^{(+)} \gg 0$ | $B^{(+)} \approx 0$ |
| Increase of $r_i^{(-)}$ | $B^{(-)} = 0$ | $B^{(-)} = 0$ | $B^{(-)} = 0$ | $B^{(-)} = 0$ | $B^{(-)} \approx 0$ |
| $B^{(+)} - B^{(-)}$ | $D = 0$ | $D \approx 0$ | $D > 0$ | $D \gg 0$ | $D \approx 0$ |

Next, with regard to the typical example of the shapes of the standard pattern vector and the input pattern vector shown in FIGS. 5(a) to 5(e), we explain the value of the skewness shape variation D calculated by equation 11. TABLE 2 shows how D varies with $r^{(+)}i$, $r^{(-)}i$, $B^{(+)}$ and $B^{(-)}$. Namely, TABLE 2 shows the changes in $B^{(+)}$, $B^{(-)}$ and D when the shape of the input pattern is changed from the shape of the standard pattern as shown in FIG. 5. From FIG. 5 and TABLE 2, we can understand the following.

In FIG. 5(a), values $r^{(+)}i$ and $r^{(-)}i$ do not change. The skewness shape variation becomes D=0 as $B^{(+)}=0$ and $B^{(-)}=0$.

In FIGS. 5(b), 5(c) and 5(d), because peak position i of the standard pattern is located in the center of the negative reference pattern vector and the shape of the negative reference pattern vector is symmetrical about the center axis of the negative reference pattern vector, the skewness becomes $B^{(-)}=0$ when value $r^{(-)}i$ increases.

In FIG. 5(b), because peak position i of the input pattern is located in the area around the center of the positive reference pattern vector, the skewness becomes $B^{(+)} \approx 0$ when value $r^{(+)}i$ increases. The entire skewness shape variation becomes $D \approx 0$.

In FIG. 5(d), because peak position i of the input pattern is located in the edge part of the positive reference pattern vector and the tail on the right side of the shape of the positive reference pattern vector is longer than the left side, the skewness becomes $B^{(+)} \gg 0$ when value $r^{(+)}i$ increases. The entire skewness shape variation becomes $D \gg 0$.

In FIG. 5(c), because the shape of the positive reference pattern vector is an intermediate state between FIG. 5(b) and FIG. 5(d), the skewness becomes $B^{(+)} > 0$. The entire skewness shape variation becomes $D > 0$.

In FIG. 5(e), a pair of reference patterns have small shape changes from the normal distribution, and the skewness shape variation becomes $D \approx 0$ as $B^{(+)} \approx 0$ and $B^{(-)} \approx 0$. Also, if values $r^{(+)}i$ and $r^{(-)}i$ increase randomly, the skewness shape variation becomes $D \approx 0$.

From FIGS. 5(a) to 5(d), we can understand that value |D| increases monotonically as the "difference" between peaks of the standard and input patterns increases. Also, from FIG. 5(e), it is clear that $D \approx 0$ for the "wobble".

Figure 4:
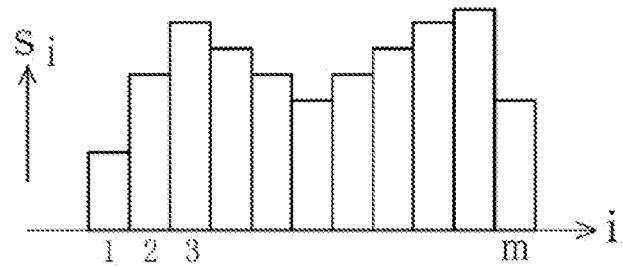
FIG. 4 is a set of graphs showing one example of shapes of standard and input pattern vectors, and normal curves and shapes of positive and negative reference pattern vectors whose component values obey the distribution of the normal curve.
Figure 4:
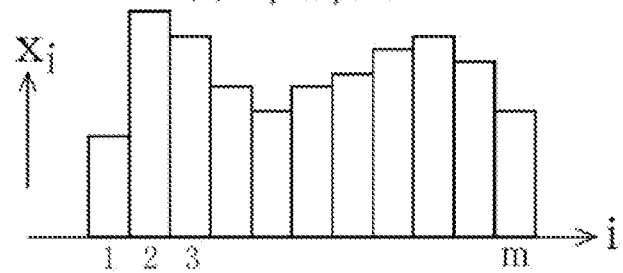
Figure 4:
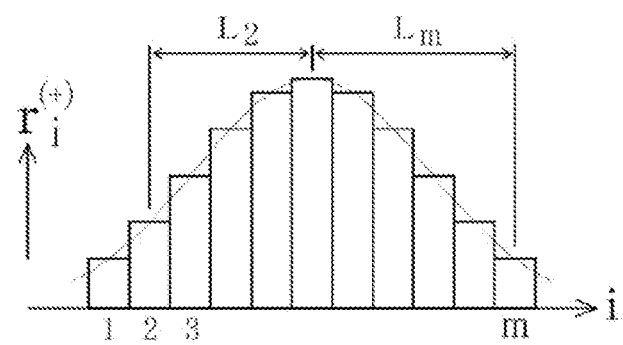
Figure 4:
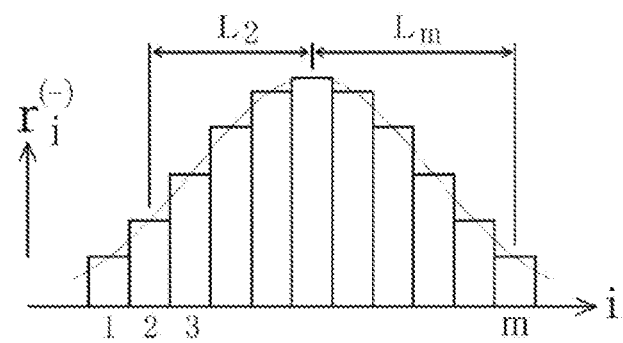

In the previous description, we have determined the skewness shape variation D by assuming that the center axis of the normal distribution is located at the center of standard and input patterns as shown in FIGS. 4 and 5. Next, however, we determine the skewness shape variation Dj for each j in the case where the center axis of the normal distribution moves to any component position j (j=1, 2, ..., m) of the standard and input patterns. FIGS. 6(a) and 6(b) give an example of standard and input patterns. Also, FIGS. 6(c) to 6(f) show the positive and negative reference patterns when the center axis of the normal distribution moves to positions 1, 3, j and m, respectively. Note that all bar graphs of FIGS. 6(a) to 6(f) have the same width. As shown in FIG. 6(e), the positive and negative reference patterns do not necessarily cover the entire standard and input patterns.

Then, we process the ends so that the sensitivity to the "wobble" in the positive and negative reference patterns may be equated regardless of the movement position of the normal distribution. In the positive and negative reference patterns shown in FIGS. 6(c) to 6(f), the "white" bars correspond to the component numbers i of the input pattern and, therefore, their heights change according to the "wobble" of the input pattern. However, the "gray" bars do not correspond to the component numbers i, and their heights do not change. Therefore, we set value nj so that the number of white bars may be equated in all the positive and negative reference patterns. In FIGS. 6(c) to 6(f), for an example, each of the positive and negative reference patterns consists of 9 white bars. By this means, the sensitivity to the "wobble" in the positive and negative reference patterns is equated. We can expand equation 8 as described above to create positive and negative reference pattern vectors $r_j^{(+)}$ and $r_j^{(-)}$ which have different variance values of the normal distribution for each movement position j, and represent them as the following equation 12.

$$r_j^{(+)} = (r_{j1}^{(+)}, r_{j2}^{(+)}, \ldots, r_{jk}^{(+)}, \ldots, r_{jn_j}^{(+)})$$

$$r_j^{(-)} = (r_{j1}^{(-)}, r_{j2}^{(-)}, \ldots, r_{jk}^{(-)}, \ldots, r_{jn_j}^{(-)}) \quad \{\text{Equation 12}\}$$

(j=1, 2, 3, ..., m)

Then, we replace the difference in shapes between standard pattern vector s and input pattern vector x by the shape changes in the vectors $r_j^{(+)}$ and $r_j^{(-)}$ by using the following equation 13 instead of equation 9.

For i=1, 2, 3, ..., m;

when $k=i-j+(1+n_j)/2$ (where, $1 \leq k \leq n_j$);

if $x_i > s_i$, then $r_{jk}^{(+)} \leftarrow r_{jk}^{(+)} + |x_i - s_i|$ if $x_i > s_i$, then $r_{jk}^{(-)} \leftarrow r_{jk}^{(-)} + |x_i - s_i|$ \quad \{Equation 13\}

(j=1,2,3, ..., m)

Figure 6:
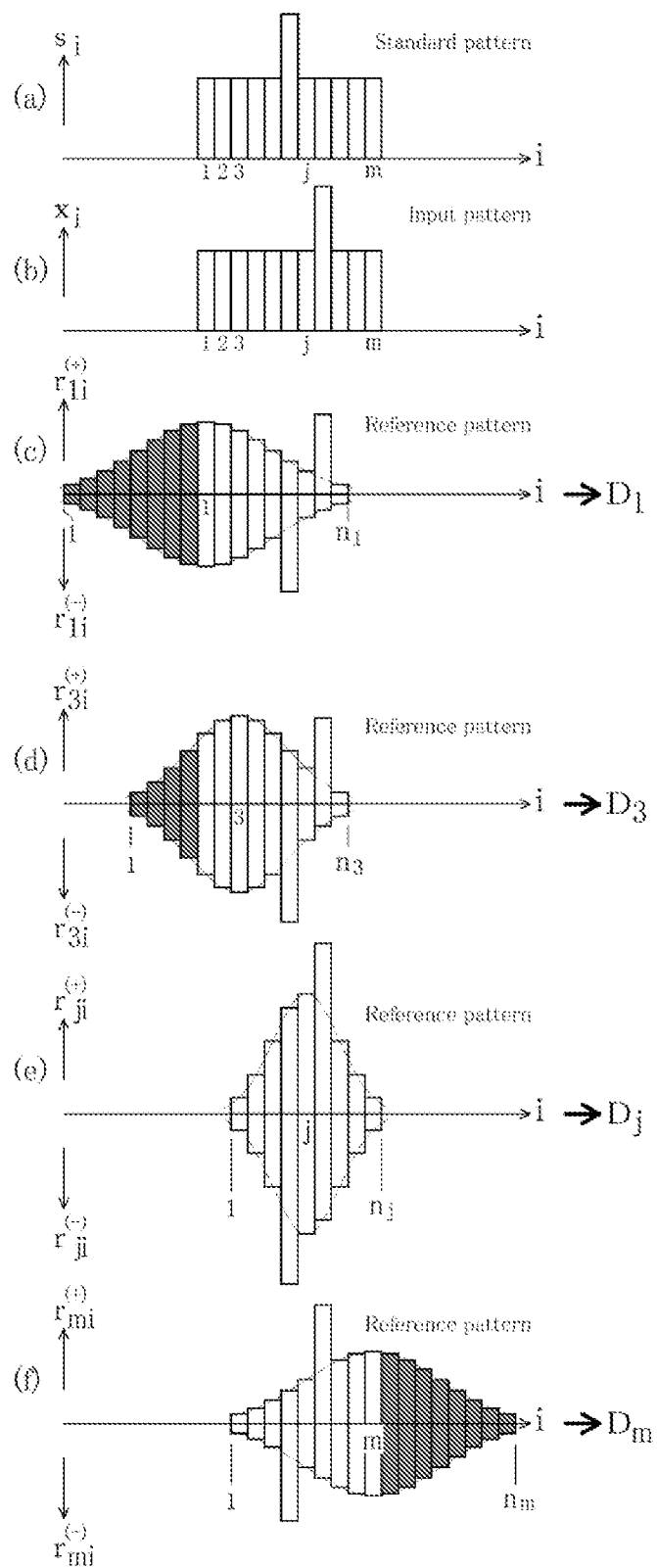
FIG. 6 is a set of graphs showing an example of shape changes in positive and negative reference pattern vectors according to a movement of a center axis of a normal distribution.

Note that $(1+nj)/2$ is the center component number of $r_j^{(+)}$ and $r_j^{(-)}$, and i-j is a deviation from the center component number. Also, if value k does not satisfy $1 \leq k \leq nj$, we assume that values $r^{(+)}jk$ and $r^{(-)}jk$ do not change. FIG. 6 represents equation 13 in terms of shape, and it shows how the values $r^{(+)}jk$ and $r^{(-)}jk$ increase. Then, the magnitude of the shape change in $r_j^{(+)}$ and $r_j^{(-)}$ is numerically evaluated as the variable of skewness. The skewness of $r_j^{(+)}$ and $r_j^{(-)}$ can be calculated by using the following equation 14 instead of equation 10.

$$B_j^{(+)} = \frac{\left\{\sqrt{\sum_{k=1}^{n_j} r_{jk}^{(+)}}\right\} \cdot \left\{\sum_{k=1}^{n_j} (L_{jk})^3 \cdot r_{jk}^{(+)}\right\}}{\left\{\sum_{k=1}^{n_j} (L_{jk})^2 \cdot r_{jk}^{(+)}\right\}^{\frac{3}{2}}}$$

$$B_j^{(-)} = \frac{\left\{\sqrt{\sum_{k=1}^{n_j} r_{jk}^{(-)}}\right\} \cdot \left\{\sum_{k=1}^{n_j} (L_{jk})^3 \cdot r_{jk}^{(-)}\right\}}{\left\{\sum_{k=1}^{n_j} (L_{jk})^2 \cdot r_{jk}^{(-)}\right\}^{\frac{3}{2}}}$$

\{Equation 14\}

(j = 1, 2, 3, ..., m)

Note that value Ljk is a deviation from the center axis of the normal distribution that corresponds to position j. At this time, the skewness shape variation Dj can be calculated by using the following equation 15 instead of equation 11.

$$D_j = B_j^{(+)} - B_j^{(-)} \quad \{\text{Equation 15}\}$$

(j=1, 2, 3, ..., m)

As shown in FIGS. 6(c) to 6(f), the value Dj is calculated from the positive and negative reference patterns for each position j. Using the m pieces of the skewness shape variation Dj that we have obtained in equation 15, we can calculate the difference in shapes between standard and input patterns by the following equation 16 and we define it as the "skewness geometric distance d".

$$d = \sqrt{\sum_{j=1}^{m} (D_j)^2} \quad \{\text{Equation 16}\}$$

EXPERIMENT EXAMPLE 1

In the above description, we have explained the method for calculating the skewness geometric distance d by using the variable of skewness. Next, we have performed numerical experiments to calculate the conventional Euclidean distances, the conventional cosine similarities and the skewness geometric distances of the standard and input patterns shown in FIGS. 7(a) and 7(b).

Figure 7:
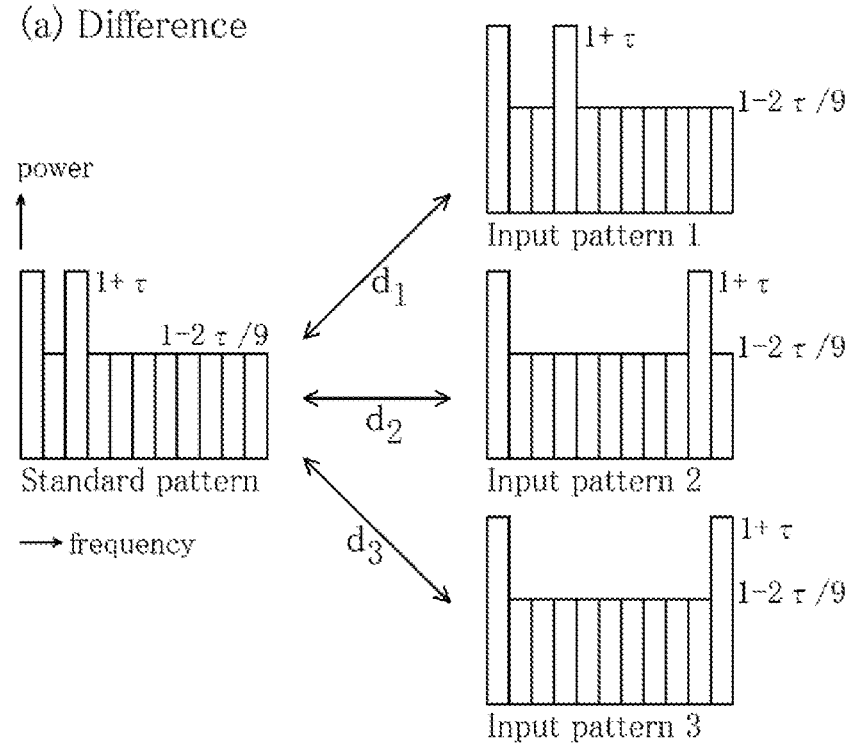
FIG. 7(*a*) is a set of graphs showing an example of a shape of a standard pattern and shapes of input patterns having different peaks from the standard pattern.
Figure 7:
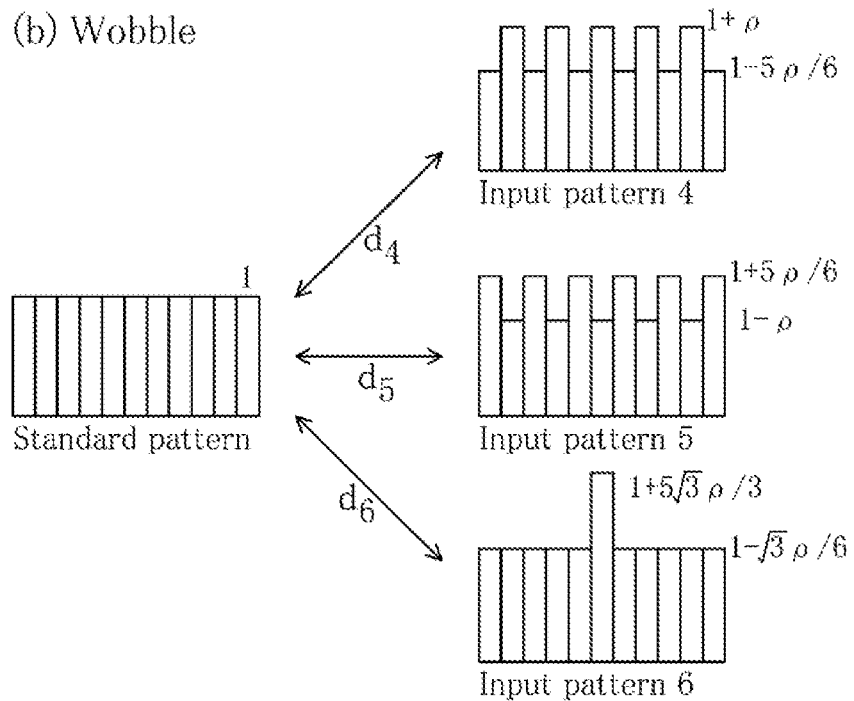

FIG. 7(a) gives an example of the "difference" where the standard pattern has two peaks in the power spectrum, and input patterns 1, 2 and 3 have a different position on the second peak. However, each pattern is assumed to have variable τ in the relationship shown in FIG. 7(a). Therefore, the standard pattern and the input patterns always have the same area. In this case, the Euclidean distance and cosine similarity d1, d2 and d3 have the relationship of d1=d2=d3 between the standard pattern and each of input patterns 1, 2 and 3. Therefore, input patterns 1, 2 and 3 cannot be distinguished.

Figure 8:
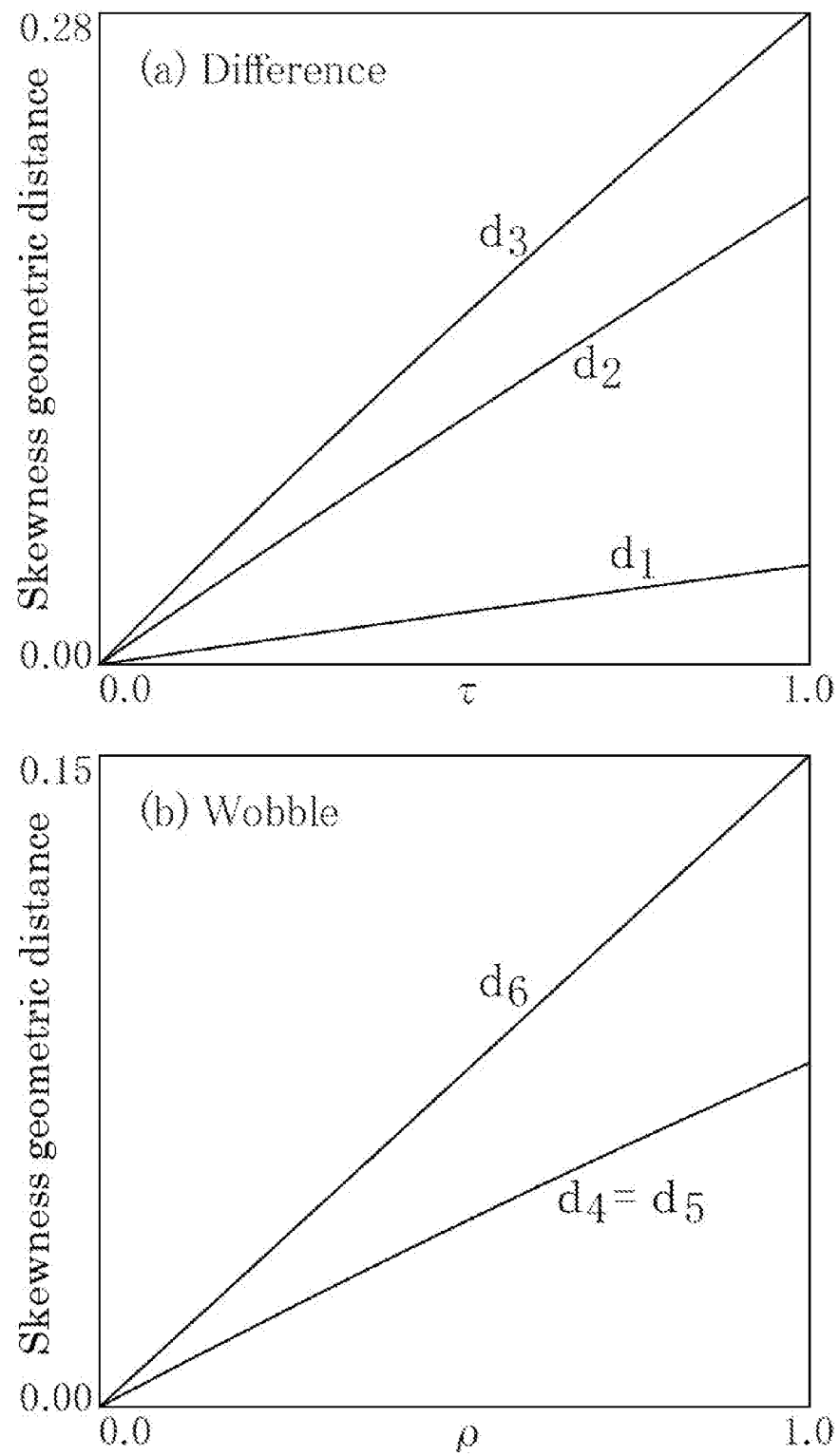
FIG. 8(*a*) is a graph showing an experimental result of skewness geometric distance in Experiment Example 1 with respect to the standard and input patterns shown in FIG. 7(*a*).

Moreover, in FIG. 7(a), we assume that the skewness geometric distances between the standard pattern and each of input patterns 1, 2 and 3 are d1, d2 and d3, respectively. However, we have developed equation 12 by using values nj=27 and σj=0.58 that are fixed regardless of movement position value j in FIG. 6. During this time, the number of white bars of positive and negative reference patterns is 11 for all j values. FIG. 8(a) shows the calculation result of skewness geometric distances d1, d2 and d3 by increasing value τ from 0.0 to 1.0 in FIG. 7(a). From FIG. 8(a), if value τ is fixed, it turns out that the skewness geometric distance increases monotonically as the "difference" of the input pattern peak increases. Therefore, input patterns 1, 2 and 3 can be distinguished in all τ values.

FIG. 7(b) gives an example of the "wobble" where the standard pattern has a flat power spectrum, input patterns 4 and 5 have the "wobble" on the flat power spectrum, and input pattern 6 has a single peak. However, each pattern is assumed to have variable ρ in the relationship shown in FIG. 7(b). Therefore, the standard pattern and the input patterns always have the same area. In this case, the Euclidean distance and cosine similarity d4, d5 and d6 have the relationship of d4=d5=d6 between the standard pattern and each of input patterns 4, 5 and 6. Therefore, input patterns 4, 5 and 6 cannot be distinguished.

Moreover, in FIG. 7(b), we assume that the skewness geometric distances between the standard pattern and each of input patterns 4, 5 and 6 are d4, d5 and d6, respectively. However, we have developed equation 12 by using values nj=27 and σj=0.58 that are fixed regardless of movement position value j in FIG. 6. During this time, the number of white bars of positive and negative reference patterns is 11 for all j values. FIG. 8(b) shows the calculation result of skewness geometric distances d4, d5 and d6 by increasing value from 0.0 to 1.0 in FIG. 7(b). In FIG. 8(b), if value ρ is fixed, values d4 and d5 are smaller than value d6. That is, if input patterns 4, 5 and 6 have the same area, input patterns 4 and 5 have the energy that is distributed to multiple peaks as the "wobble" when compared with input pattern 6 that has the energy concentrated on a single peak. Thus, the skewness geometric distance of input patterns 4 and 5 is smaller than that of input pattern 6. As a result, it is discovered that the change in skewness geometric distance to the "wobble" is small. Therefore, input patterns 4 and 5 can be distinguished from input pattern 6 in all ρ values.

EXPERIMENT EXAMPLE 2

On the other hand, the method for calculating a kurtosis geometric distance by using a variable of "kurtosis" was disclosed in the prior arts (the gazette of Japanese Patent No. 3426905 and the gazette of Japanese Patent No. 3342864).

Next, we have performed numerical experiments to calculate the kurtosis geometric distances d of the standard and input patterns shown in FIGS. 7(a) and 7(b). Namely, we have performed these numerical experiments to calculate the kurtosis geometric distances d by using the following equations 17 and 18 instead of equations 14 and 15 respectively. Note that we used the same nj and σj values as the Experiment Example 1.

$$A_j^{(+)} = \frac{\left\{\sum_{k=1}^{n_j} r_{jk}^{(+)}\right\} \cdot \left\{\sum_{k=1}^{n_j} (L_{jk})^4 \cdot r_{jk}^{(+)}\right\}}{\left\{\sum_{k=1}^{n_j} (L_{jk})^2 \cdot r_{jk}^{(+)}\right\}^2} \quad \{\text{Equation 17}\}$$

$$A_j^{(-)} = \frac{\left\{\sum_{k=1}^{n_j} r_{jk}^{(-)}\right\} \cdot \left\{\sum_{k=1}^{n_j} (L_{jk})^4 \cdot r_{jk}^{(-)}\right\}}{\left\{\sum_{k=1}^{n_j} (L_{jk})^2 \cdot r_{jk}^{(-)}\right\}^2}$$

$$(j = 1, 2, 3, \ldots, m)$$

$$D_j = A_j^{(+)} - A_j^{(-)} \quad (j = 1, 2, 3, \ldots, m) \quad \{\text{Equation 18}\}$$

Figure 9:
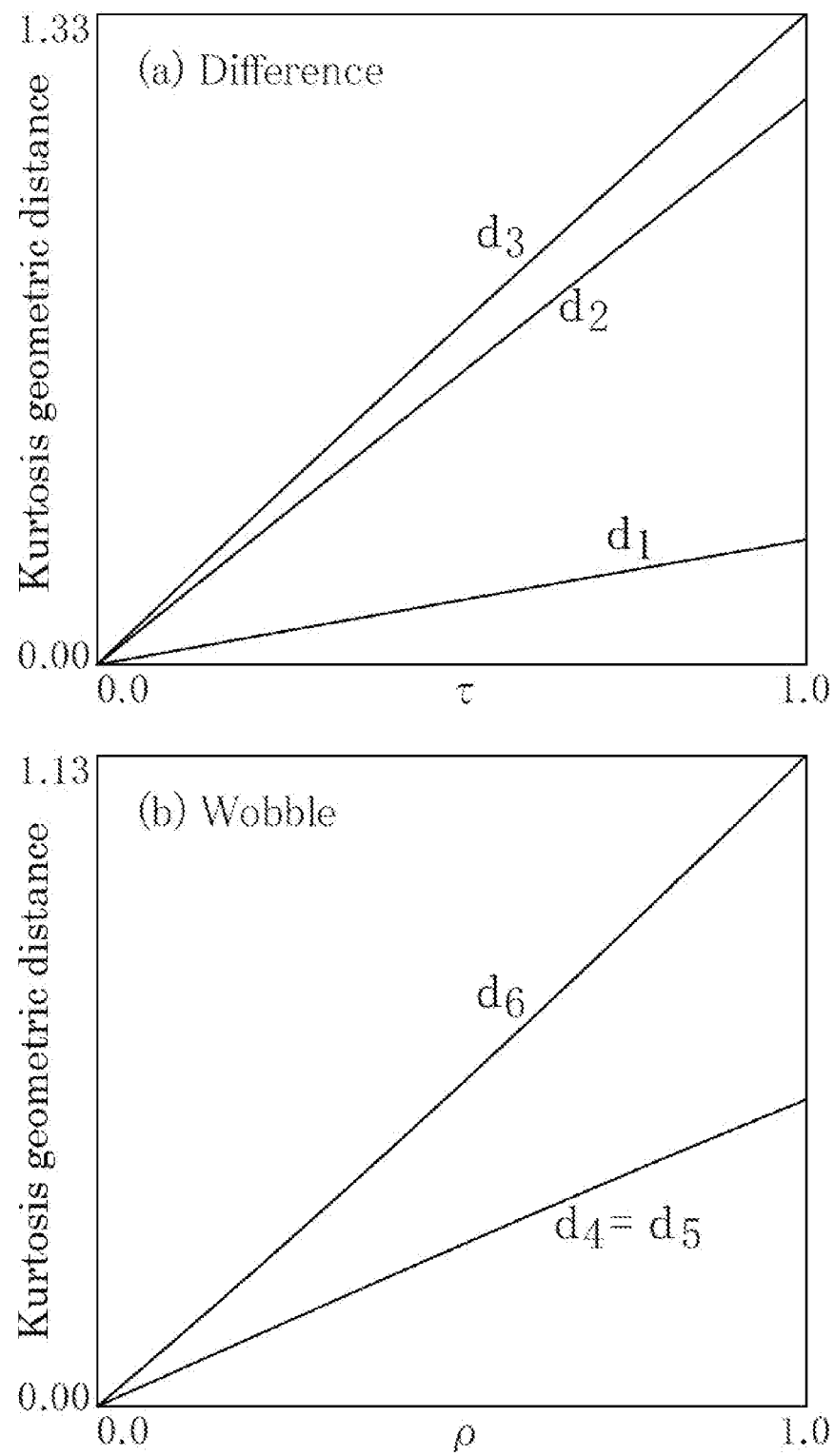
FIG. 9(*a*) is a graph showing an experimental result of kurtosis geometric distance in Experiment Example 2 with respect to the standard and input patterns shown in FIG. 7(*a*).

FIG. 9(a) shows the calculation result of kurtosis geometric distances d1, d2 and d3 by increasing value τ from 0.0 to 1.0 in FIG. 7(a). From FIG. 9(a), if value τ is fixed, it turns out that the kurtosis geometric distance increases monotonically as the "difference" of the input pattern peak increases. Therefore, input patterns 1, 2 and 3 can be distinguished in all τ values.

FIG. 9(b) shows the calculation result of kurtosis geometric distances d4, d5 and d6 by increasing value ρ from 0.0 to 1.0 in FIG. 7(b). In FIG. 9(b), if value ρ is fixed, values d4 and d5 are smaller than value d6. That is, if input patterns 4, 5 and 6 have the same area, input patterns 4 and 5 have the energy that is distributed to multiple peaks as the "wobble" when compared with input pattern 6 that has the energy concentrated on a single peak. Thus, the kurtosis geometric distance of input patterns 4 and 5 is smaller than that of input pattern 6. As a result, it is discovered that the change in kurtosis geometric distance to the "wobble" is small. Therefore, input patterns 4 and 5 can be distinguished from input pattern 6 in all ρ values.

From FIGS. 8(a), 8(b), 9(a) and 9(b), we can find that the results of experiment for detecting a similarity by using the skewness geometric distance and the results of experiment for detecting a similarity by using the kurtosis geometric distance of the prior arts are almost identical.

EXPERIMENT EXAMPLE 3

Figure 10:
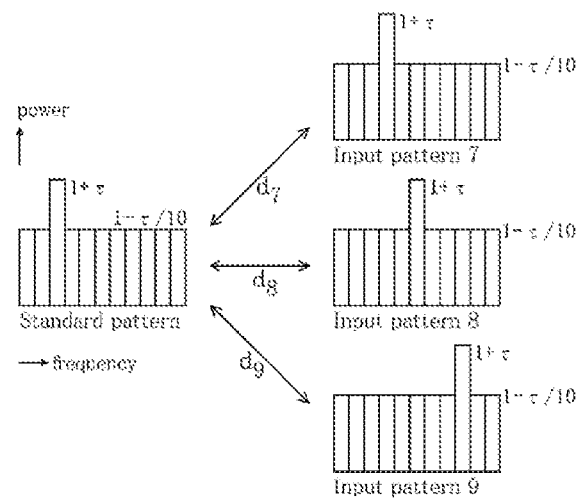
FIG. 10 is a set of graphs showing a shape of a standard pattern and shapes of input patterns for Experiment Example 3.

Next, we have performed numerical experiments to calculate the skewness geometric distances d and the kurtosis geometric distances d of the standard and input patterns shown in FIG. 10. Note that we used the same nj and σj values as the Experiment Example 1.

FIG. 10 gives an example where the standard pattern has a single peak in the power spectrum, and input patterns 7, 8 and 9 have a different peak position. However, each pattern is assumed to have variable τ in the relationship shown in FIG. 10. Therefore, the standard pattern and the input patterns always have the same area. Moreover, in FIG. 10, we assume that the skewness geometric distances and the kurtosis geometric distances between the standard pattern and each of input patterns 7, 8 and 9 are d7, d8 and d9, respectively. Note that the standard pattern shown in FIG. 10 has the same shape as the standard patterns shown in FIGS. 54(b), 54(c) and 54(d), and the input patterns 7, 8 and 9 shown in FIG. 10 have the same shapes as the input patterns shown in FIGS. 54(b), 54(c) and 54(d), respectively.

Figure 11:
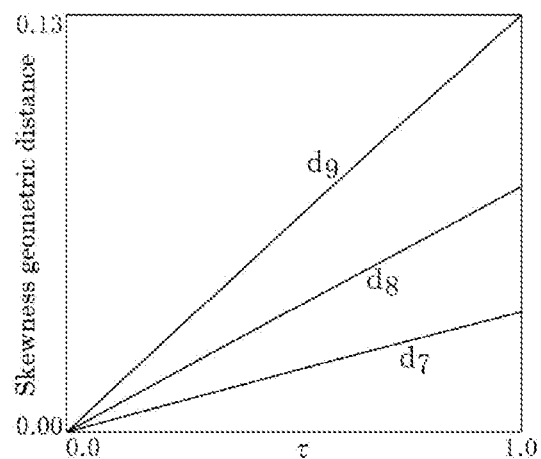
FIG. 11 is a graph showing an experimental result of skewness geometric distance in Experiment Example 3 with respect to the standard and input patterns shown in FIG. 10.
Figure 12:
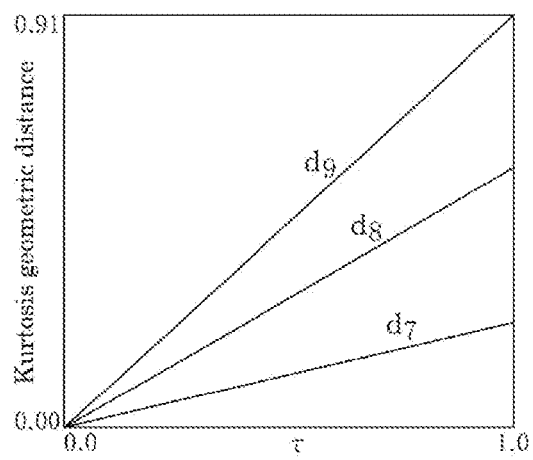
FIG. 12 is a graph showing an experimental result of kurtosis geometric distance in Experiment Example 3 with respect to the standard and input patterns shown in FIG. 10.

FIG. 11 shows the calculation result of skewness geometric distances d7, d8 and d9 by increasing value $\tau$ from 0.0 to 1.0 in FIG. 10. From FIG. 11, if value $\tau$ is fixed, it turns out that the skewness geometric distance increases monotonically as the "difference" of the input pattern peak increases. Therefore, input patterns 7, 8 and 9 can be distinguished in all $\tau$ values. Also, FIG. 12 shows the calculation result of kurtosis geometric distances d7, d8 and d9 by increasing value $\tau$ from 0.0 to 1.0 in FIG. 10. From FIGS. 11 and 12, we can find that the results of experiment for detecting similarity by using the skewness geometric distance and the results of experiment for detecting similarity by using the kurtosis geometric distance of the prior arts are almost identical.

EXPERIMENT EXAMPLE 4

Figure 13:
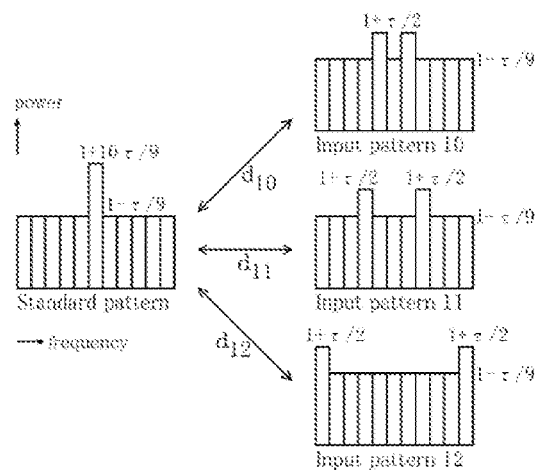
FIG. 13 is a set of graphs showing a shape of a standard pattern and shapes of input patterns for Experiment Example 4.

Further, we have performed numerical experiments to calculate the skewness geometric distances d and the kurtosis geometric distances d of the standard and input patterns shown in FIG. 13. Note that we used the same nj and σj values as the Experiment Example 1.

FIG. 13 gives an example where the standard pattern has a single peak at the center of the power spectrum, and input patterns 10, 11 and 12 have different two peaks at symmetrical position with respect to the center of the power spectrum. However, each pattern is assumed to have variable $\tau$ in the relationship shown in FIG. 13. Therefore, the standard pattern and the input patterns always have the same area. Moreover, in FIG. 13, we assume that the skewness geometric distances and the kurtosis geometric distances between the standard pattern and each of input patterns 10, 11 and 12 are d10, d11 and d12, respectively. Note that the standard pattern shown in FIG. 13 has the same shape as the standard patterns shown in FIGS. 55(b), 55(c) and 55(d), and the input patterns 10, 11 and 12 shown in FIG. 13 have the same shapes as the input patterns shown in FIGS. 55(b), 55(c) and 55(d), respectively.

Figure 14:
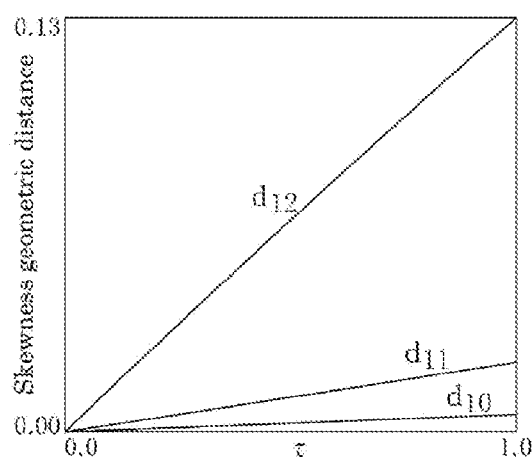
FIG. 14 is a graph showing an experimental result of skewness geometric distance in Experiment Example 4 with respect to the standard and input patterns shown in FIG. 13.
Figure 15:
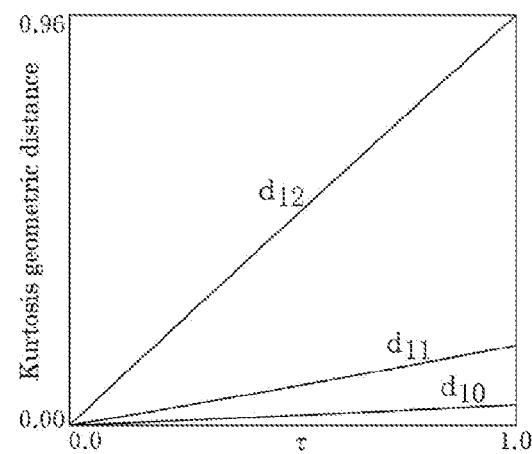
FIG. 15 is a graph showing an experimental result of kurtosis geometric distance in Experiment Example 4 with respect to the standard and input patterns shown in FIG. 13.

FIG. 14 shows the calculation result of skewness geometric distances d10, d11 and d12 by increasing value $\tau$ from 0.0 to 1.0 in FIG. 13. From FIG. 14, if value $\tau$ is fixed, it turns out that the skewness geometric distance increases monotonically as the "difference" of the input pattern peak increases. Therefore, input patterns 10, 11 and 12 can be distinguished in all $\tau$ values. Also, FIG. 15 shows the calculation result of kurtosis geometric distances d10, d11 and d12 by increasing value $\tau$ from 0.0 to 1.0 in FIG. 13. From FIGS. 14 and 15, we can find that the results of experiment for detecting similarity by using the skewness geometric distance and the results of experiment for detecting similarity by using the kurtosis geometric distance of the prior arts are almost identical.

The skewness geometric distance d shown in equation 16 is obtained by numerically evaluating the magnitude of the shape change in the reference pattern vector as a variable of the "skewness" instead of the method of the prior art wherein the magnitude of the shape change in the reference pattern vector is numerically evaluated as a variable of the "kurtosis". From the above examples 1 to 4 of numerical experiment, we can find that the results of experiment for detecting similarity by using the skewness geometric distance shown in equation 16 and the results of experiment for detecting similarity by using the kurtosis geometric distance of the prior arts are almost identical. Therefore, we can understand that the degree of similarity between the standard pattern and the input pattern can be detected as a distance value by using any one of the skewness geometric distance and the kurtosis geometric distance or by simultaneously using both.

Here, discussion will be made for the experimental results in examples 3 and 4 of experiment. FIGS. 54(b) to 54(d) show that a phenomenon occurs that the value of kurtosis does not change monotonically even if the "difference" increases between peaks of the standard and input patterns. On the other hand, FIGS. 55(b) to 55(d) show that a phenomenon occurs that the value of skewness does not change at all even if the "difference" increases between the peaks of the standard and input patterns. Meanwhile, in examples 3 and 4 of experiment, as a result of numerical experiments using the standard and input patterns having the same shapes as those of FIGS. 54(b) to 54(d) and FIGS. 55(b) to 55(d) as shown in FIGS. 10 and 13, it is confirmed that the skewness geometric distance and kurtosis geometric distance increase monotonically as the "difference" increases between peaks of the standard and input patterns as shown in FIGS. 11, 12, 14 and 15. This shows that the result is obtained that the skewness geometric distance value and kurtosis geometric distance value increase monotonically as the "difference" increases between peaks of the standard and input patterns by obtaining the variable of skewness or the variable of kurtosis while moving the center axis of the reference pattern to each component position of the standard and input patterns and calculating the square root of the sum of the squares thereof using equation 16. Namely, equation 16 is for averaging the variable of kurtosis or the variable of skewness at each component position of the standard and input patterns. Thus, even if a phenomenon occurs that the value of kurtosis or the value of skewness does not change monotonically with the increase in the "difference" between peaks of the standard and input patterns, it turns out that the result is obtained that the skewness geometric distance value and kurtosis geometric distance value increase monotonically as the "difference" increases between peaks of the standard and input patterns. However, averaging means cancelling out the phenomenon that the value of skewness or the value of kurtosis does not change monotonically by the phenomenon that the value of skewness or the value of kurtosis changes monotonically, leading to a decrease in the similarity detection accuracy. Thus, essential improvements are required. Therefore, a method for making essential improvements will be described in the latter part of this embodiment.

In this embodiment, next, a reference pattern vector whose component values obey a normal distribution is created, and a skewness-weighting vector (skewness-weighting curve) having a value of a change rate of "skewness" of the above reference pattern vector as a component is created in advance. Then, the product-sum of a component value of the skewness-weighting vector and a component value of the original standard pattern vector is calculated. In this case, a skewness-weighted standard pattern vector is created by obtaining the product-sum while moving the center axis of the skewness-weighting curve to each component position of the original standard pattern vector. Similarly, the product-sum of a component value of the skewness-weighting vector and a component value of the original input pattern vector is calculated. In this case, a skewness-weighted input pattern vector is created by obtaining the product-sum while moving the center axis of the skewness-weighting curve to each component position of the original input pattern vector. Then, by obtaining an angle between the above skewness-weighted standard pattern vector and the skewness-weighted input pattern vector, the degree of similarity between the original standard pattern vector and the original input pattern vector can be detected as a skewness geometric distance value.

Namely, this embodiment shows that, even when the skewness-weighting vector having a value of a change rate of "skewness" of the reference pattern vector as a component is used instead of the method of the prior art using the kurtosis-weighting vector having a value of a change rate of "kurtosis" of the reference pattern vector as a component, the degree of similarity between the original standard pattern vector and the original input pattern vector can be detected as a skewness geometric distance value.

If variable ui is a discrete value, skewness B of function f(ui) can be calculated using the following equation 19.

$$B = \frac{\left\{\sqrt{\sum_i f(u_i)}\right\} \cdot \left\{\sum_i (u_i)^3 \cdot f(u_i)\right\}}{\left\{\sum_i (u_i)^2 \cdot f(u_i)\right\}^{\frac{3}{2}}} \quad \{\text{Equation 19}\}$$

Figure 16:
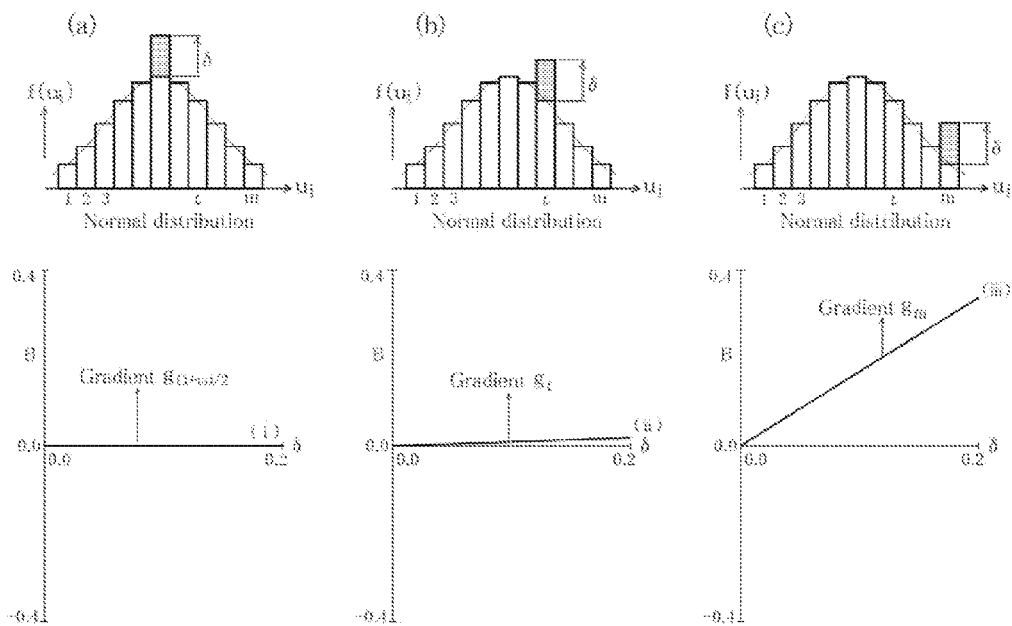
FIG. 16 is a set of graphs showing a change in a skewness when only a single bar increases in height by value δ.
Figure 17:
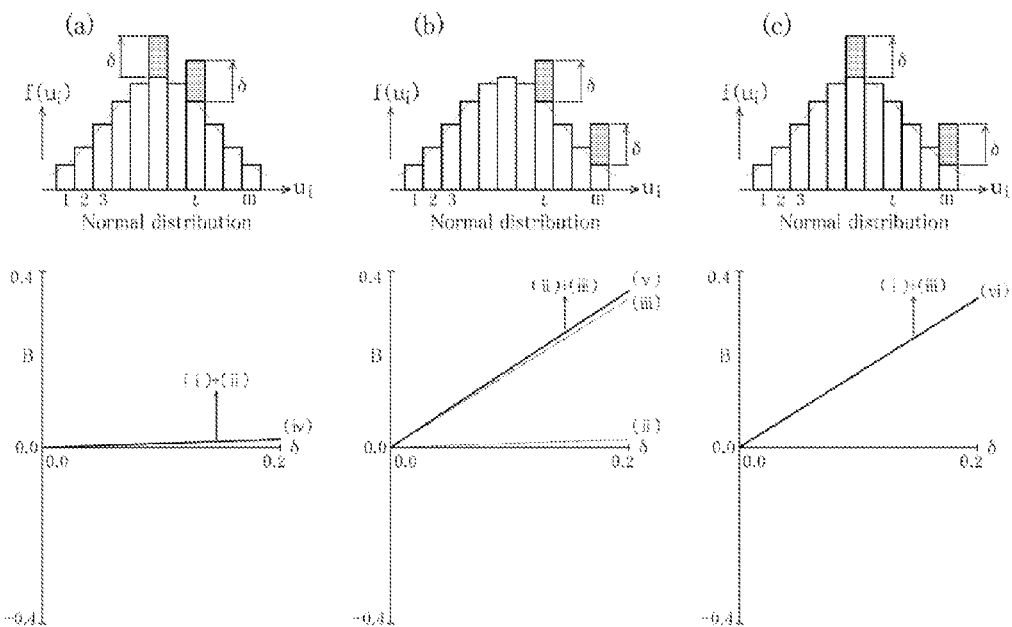
FIG. 17 is a set of graphs showing a change in a skewness when two bars increase in height by the same value δ simultaneously.
Figure 18:
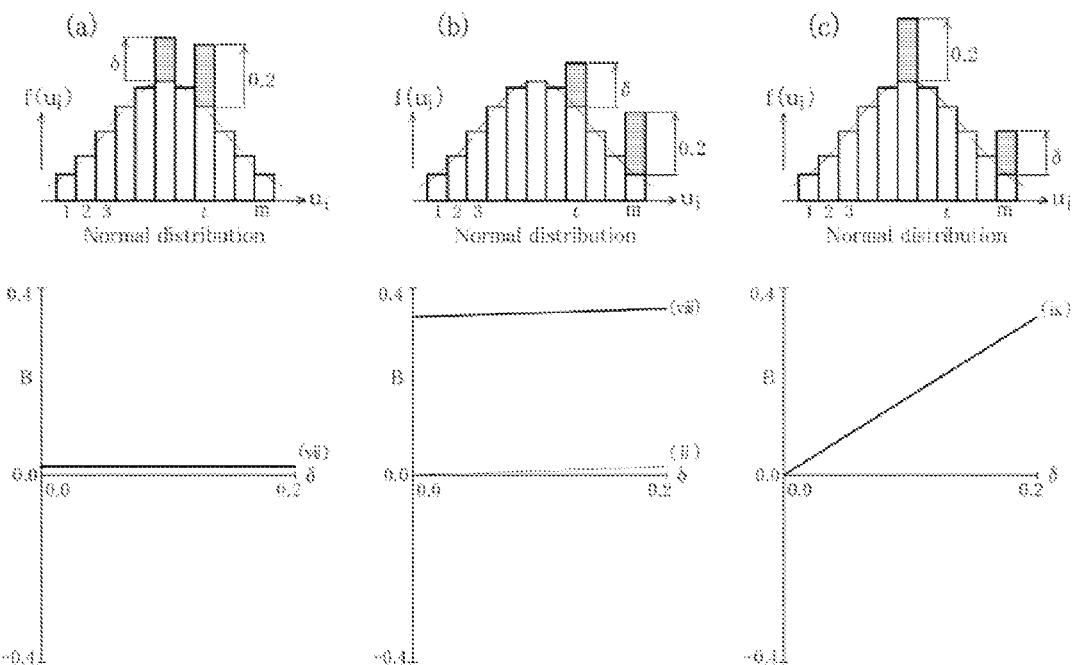
FIG. 18 is a set of graphs showing a change in a skewness when only one bar increases in height by value δ and another bar increases in height by value 0.2 at the same time.

Then, numerical experiments are carried out to study the relationship between skewness B and the increment value δ of bars shown in FIGS. 16 to 18. The upper graphs (a) to (c) of FIGS. 16 to 18 shows the bar graphs each having m bars whose height is the same as function value f(ui) of the normal distribution. While in this embodiment the number m is an odd number, the same discussion holds in case of m being an even number. On bar graphs of FIGS. 16(*a*) to 16(*c*), only a single bar increases in height by value δ in the center, an intermediate position, and an end of the normal distribution. In FIGS. 17(*a*) to 17(*c*), two bars of each graph increase in height by the same value δ. Also, in FIGS. 18(*a*) to 18(*c*), only one bar increases in height by value δ and another bar increases in height by value 0.2 at the same time.

Next, the skewness B is calculated using equation 19 for the bar graphs whose shapes are changed as described above. The obtained relationship between values. B and δ is shown by graphs (i) to (ix) in the lower side of graphs (a) to (c) of FIGS. 16 to 18. Note that m=11.

From graphs (i), (ii) and (iii) shown in FIGS. 16(*a*) to 16(*c*), it is discovered that B=0.0 if δ=0.0. Also, the value of B changes approximately linearly when value of δ increases. In FIGS. 17(*a*) to 17(*c*), graphs (i)+(ii), (ii)+(iii), and (i)+(iii) are the results obtained by addition of graphs (i), (ii) and (iii). From these graphs, it is discovered that graphs (iv), (v) and (vi) are approximated to respective graphs (i)+(ii), (ii)+(iii), and (i)+(iii). Also, from FIGS. 18(*a*) to 18(*c*), it is discovered that the gradients of graphs (vii), (viii) and (ix) are equal to those of graphs (i), (ii) and (iii) respectively, and that the intercepts on the vertical axis are equal to the change amounts of skewness B if δ=0.2 on graphs (ii), (iii) and (i) respectively.

From the above description, it is discovered that we can plot approximate graphs (iv) to (ix) using graphs (i), (ii) and (iii) if we plot graphs (i), (ii) and (iii) using equation 19 in advance. In other words, if the rate of change gi (i=1, 2, . . . , m) of skewness B is calculated in advance based on the gradients of graphs (i), (ii) and (iii), we can determine the product of gi multiplied by δi for each bar even when multiple bars change in height by different values δi. Also, we can calculate an approximate value of skewness B by summing gi·δi for all i. This property holds for all values of m and for any variance $\sigma^2$ of the normal distribution.

Figure 19:
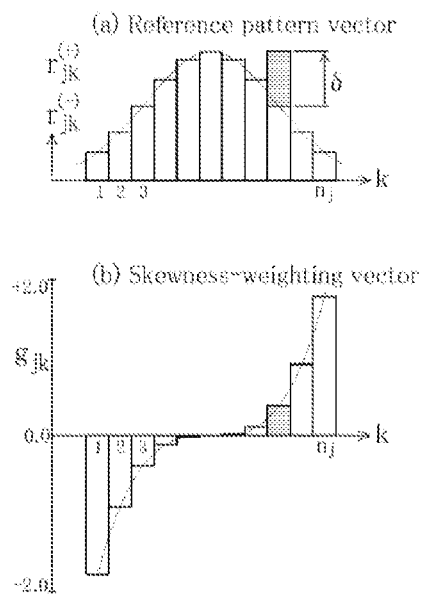
FIG. 19 is a set of graphs showing shapes of a reference pattern vector and a skewness-weighting vector.

In equation 12, we created positive and negative reference pattern vectors $rj^{(+)}$ and $rj^{(-)}$ having function values $r^{(+)}jk$ and $r^{(-)}jk$ of the normal distribution as components for each movement position j. FIG. 19(*a*) expresses equation 12 in terms of shape, and generalizes the bar graphs shown in the upper side of FIGS. 16(*a*) to 16(*c*). Note that FIG. 19(*a*) has nj bars. FIG. 19(*a*) shows a normal distribution and a single instance of δ (where a change of δ occurs at the k-th position, k=1, 2, . . . , nj). Then, we can calculate the rate of change in the skewness B (gjk, k=1, 2, . . . , nj) by using equation 19 and the following equation 20.

$$g_{jk} = B/\delta \quad \{\text{Equation 20}\}$$

$(k=1, 2, 3, \ldots, n_j)$ $(j=1, 2, 3, \ldots, m)$

The gj(1+nj)/2, gj1 and gjnj correspond to the gradients of respective graphs shown in the lower side of FIGS. 16(*a*) to 16(*c*). Next, in FIG. 19(*a*), position k of the bar that has increased by value δ runs from 1 to nj, and equation 20 is calculated. FIG. 19(*b*) shows a bar graph of the calculated value gjk, where δ=0.2. Here, we create a skewness-weighting vector gj having gjk components, and represent it as the following equation 21.

$$g_j = (g_{j1}, g_{j2}, \ldots, g_{jk}, \ldots, g_{jn_j}) \quad \{\text{Equation 21}\}$$

$(j=1, 2, 3, \ldots, m)$

Equation 21 expresses the rate of change in the skewness B using nj vector components. As $rj^{(+)}$ and $rj^{(-)}$ are equivalent vectors in the initial state, the skewness-weighting vector calculated from $rj^{(+)}$ and the skewness-weighting vector calculated from $rj^{(-)}$ are equal to each other. Thus, symbols (+) and (−) are omitted in equation 21. Also, the curve shown in FIG. 19(*b*) is the envelope curve of the gjk bar graph that has been calculated assuming the value nj is sufficiently large, and it is called "Skewness-weighting curve" in this embodiment. As shown in FIGS. 19(*a*) and 19(*b*), the normal curve corresponds to the skewness-weighting curve, and the positive and negative reference pattern vectors correspond to the skewness-weighting vector.

In equation 13, a difference in shapes between standard pattern vector s and input pattern vector x has been replaced by the shape changes of positive and negative reference pattern vectors $rj^{(+)}$ and $rj^{(-)}$. Then, skewness of $rj^{(+)}$ and skewness of $rj^{(-)}$, whose shapes have changed according to equation 13, have been calculated using equation 14 . In the above description, we determined the product value gjk·|xi−si| using the rate of change gjk in skewness B and increment |xi−si|, and demonstrated that we can calculate the approximate value of the skewness B by summing gjk·|xi−si| for all i. Thus, approximate values of $B^{(+)}j$ and $B^{(-)}j$ of equation 14 can be calculated using the following equation 22.

When $k = i - j + (1 + n_j)/2$ (where, $1 \le k \le n_j$); $\quad\{\text{Equation 22}\}$ for all $i$ where $x_i > s_i$ $$B_j^{(+)} \approx \sum_{i=1}^{m} g_{jk} \cdot |x_i - s_i|$$

for all $i$ where $x_i < s_i$ $$B_j^{(-)} \approx \sum_{i=1}^{m} g_{jk} \cdot |x_i - s_i|$$

$(j = 1, 2, 3, \ldots, m)$

If value of k does not satisfy $1 \leq k \leq n_j$, we assume $g_{jk}=0$. Next, we consider the signs and replace $|x_i-s_i|$ by $(x_i-s_i)$, and rewrite equation 22 as the following equation 23.

When $k = i - j + (1 + n_j)/2$ (where, $1 \leq k \leq n_j$); {Equation 23} for all $i$ where $x_i > s_i$ $$B_j^{(+)} \approx +\sum_{i=1}^{m} g_{jk} \cdot (x_i - s_i)$$

for all $i$ where $x_i < s_i$ $$B_j^{(-)} \approx -\sum_{i=1}^{m} g_{jk} \cdot (x_i - s_i)$$

$(j = 1, 2, 3, \ldots, m)$

The approximate value of skewness can be calculated by product-sum operation using equation 23, instead of calculating the skewness directly using equation 14.

In equation 15, the difference in shapes between standard and input patterns has been calculated, and it has been defined as "Skewness shape variation Dj". Thus, the approximate value of Dj of equation 15 can be calculated by substituting equation 23 into equation 15 as the following equation 24.

When $k = i - j + (1 + n_j)/2$ (where, $1 \leq k \leq n_j$); {Equation 24}

$$D_j \approx \sum_{i=1}^{m} g_{jk} \cdot (x_i - s_i)$$

$$= \sum_{i=1}^{m} g_{jk} \cdot x_i - \sum_{i=1}^{m} g_{jk} \cdot s_i$$

$(j = 1, 2, 3, \ldots, m)$

From equation 24, it is discovered that the value Dj can be separated into the product-sum operation using the component value gjk of skewness-weighting vector and the component value xi of input pattern vector, and the product-sum operation using the component value gjk and the component value si of standard pattern vector.

We assign sg(j) and xg(j) to the two product-sum operations given by equation 24 respectively, and represent them as the following equation 25.

When $k = i - j + (1 + n_j)/2$ (where, $1 \leq k \leq n_j$); {Equation 25}

$$s_{g(j)} = \sum_{i=1}^{m} g_{jk} \cdot s_i$$

$$x_{g(j)} = \sum_{i=1}^{m} g_{jk} \cdot x_i$$

$(j = 1, 2, 3, \ldots, m)$

Then, we create a vector sg having sg(j) components, and a vector xg having xg(j) components, and represent them as the following equation 26. Equation 26 shows the vectors that are created with normalization of power spectrum using their area values.

$$s_g = (s_{g(1)}, s_{g(2)}, \ldots, s_{g(j)}, \ldots, s_{g(m)})$$

$$x_g = (x_{g(1)}, x_{g(2)}, \ldots, x_{g(j)}, \ldots, x_{g(m)}) \quad \text{\{Equation 26\}}$$

From equations 24 and 25, the approximate value of Dj can be represented as the following equation 27.

$$D_j \approx x_{g(j)} - s_{g(j)} \quad \text{\{Equation 27\}}$$

$(j=1, 2, 3, \ldots, m)$

From equation 27, it is discovered that the value Dj can be obtained by subtracting the component value sg(j) of vector sg from the component value xg(j) of vector xg.

In equation 16, we have calculated the difference in shapes between standard and input patterns and we have defined it as the "skewness geometric distance d". Thus, the approximate value of equation 16 can be calculated by substituting equation 27 into equation 16 as the following equation 28. Note that $\tilde{d}$ is an approximate value of the skewness geometric distance d.

$$d \approx \sqrt{\sum_{j=1}^{m} (x_{g(j)} - s_{g(j)})^2} = \tilde{d} \quad \text{\{Equation 28\}}$$

As described above, the value $\tilde{d}$ can be calculated by using equations 3, 21, 25, and 28 sequentially. From equations 25 and 28, we can find that the value $\tilde{d}$ can be separated into the product-sum operation using the standard pattern vector and the product-sum operation using the input pattern vector.

EXPERIMENT EXAMPLE 5

Figure 20:
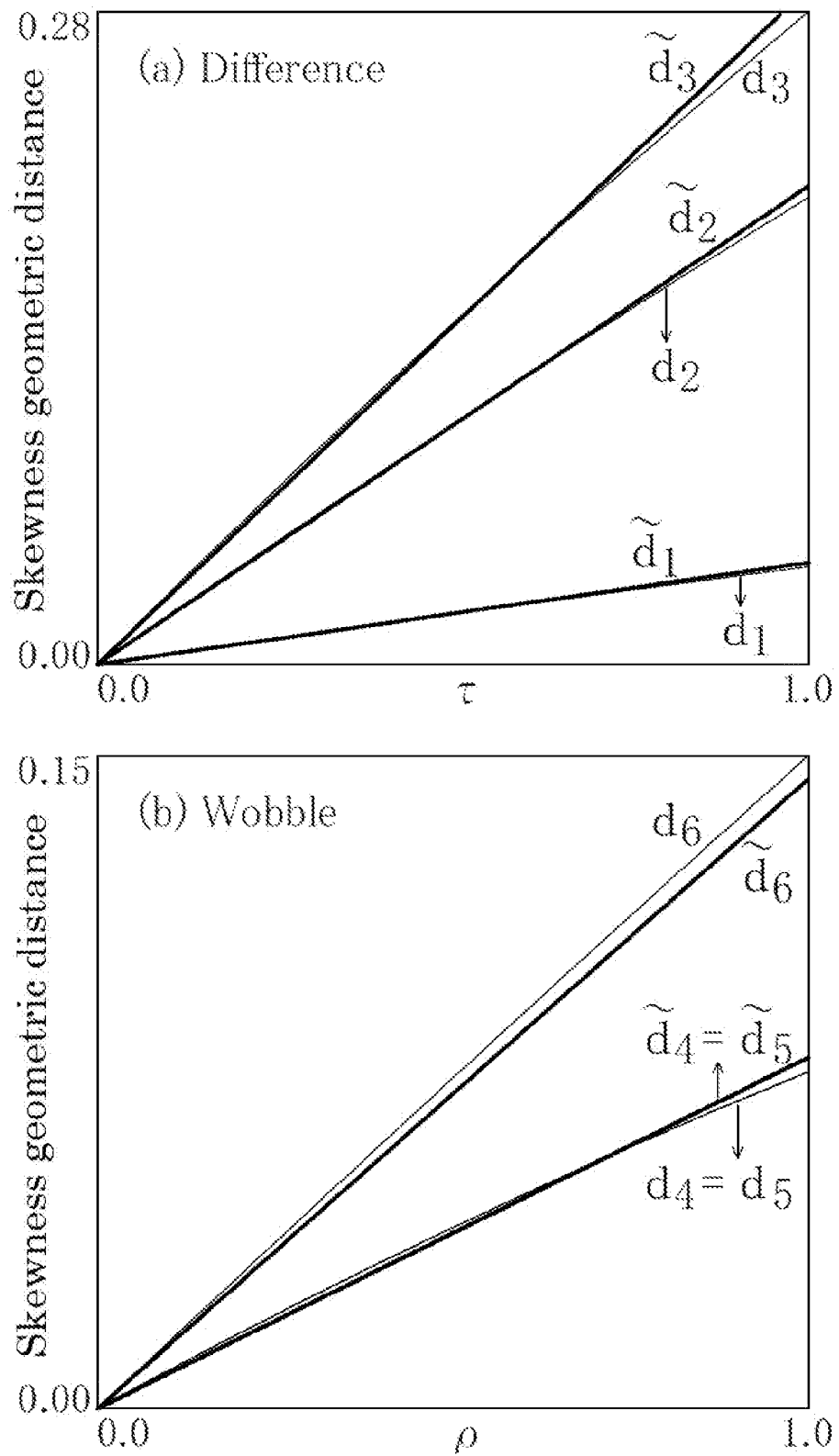
FIG. 20(*a*) is a graph showing an experimental result of skewness geometric distance in Experiment Example 5 with respect to the standard and input patterns shown in FIG. 7(*a*).

To confirm the approximation accuracy of $\tilde{d}$ shown in equation 28, we performed numerical experiments to calculate the skewness geometric distances d1 to d6 by the Experiment Example 1 and the approximate values $\tilde{d}1$ to $\tilde{d}6$ by equation 28 with respect to the standard and input patterns shown in FIGS. 7(a) and 7(b). Note that we used the same nj and σj values as the Experiment Example 1. FIGS. 20(a) and 20(b) show the results of experiments. Note that the graphs of d1 to d6 shown in FIGS. 20(a) and 20(b) are the same as the graphs of d1 to d6 shown in FIGS. 8(a) and 8(b). From FIGS. 20(a) and 20(b), we can find that values d1 to d6 and values $\tilde{d}1$ to $\tilde{d}6$ are almost identical.

Next, we assign sog(j) to the product-sum operation using the component value gjk of skewness-weighting vector and the component value soi of original standard pattern vector given by equation 2, and assign xog(j) to the product-sum operation using the component value gjk and the component value xoi of original input pattern vector, and represent them as the following equation 29. Equation 29 is obtained by replacing si and xi by soi and xoi respectively in equation 25.

When $k = i - j + (1 + n_j)/2$ (where, $1 \le k \le n_j$); {Equation 29}

$$s_{og(j)} = \sum_{i=1}^{m} g_{jk} \cdot s_{oi}$$

$$x_{og(j)} = \sum_{i=1}^{m} g_{jk} \cdot x_{oi}$$

$(j = 1, 2, 3, \ldots, m)$

Then, we create a skewness-weighted standard pattern vector sog having sog(j) components, and a skewness-weighted input pattern vector xog having xog(j) components, and represent them as the following equation 30. Equation 30 shows the vectors that are created without normalization of the power spectrum.

$s_{og} = (s_{og(1)}, s_{og(2)}, \ldots, s_{og(j)}, \ldots, s_{og(m)})$ $x_{og} = (x_{og(1)}, x_{og(2)}, \ldots, x_{og(j)}, \ldots, x_{og(m)})$ {Equation 30}

Also, we assign s'g (j) to the product-sum operation using gj k and s'i given by equation 5, and assign x'g(j) to the product-sum operation using gjk and x'i, and represent them as the following equation 31. Equation 31 is obtained by replacing si and xi by s'i and x'i respectively in equation 25.

When $k = i - j + (1 + n_j)/2$ (where, $1 \le k \le n_j$); {Equation 31}

$$s'_{g(j)} = \sum_{i=1}^{m} g_{jk} \cdot s'_i$$

$$x'_{g(j)} = \sum_{i=1}^{m} g_{jk} \cdot x'_i$$

$(j = 1, 2, 3, \ldots, m)$

Then, we create a vector s'g having s'g(j) components, and a vector x'g having x'g(j) components, and represent them as the following equation 32. Equation 32 shows the vectors that are created with normalization of power spectrum using their maximum values.

$s'_g = (s'_{g(1)}, s'_{g(2)}, \ldots, s'_{g(j)}, \ldots, s'_{g(m)})$ $x'_g = (x'_{g(1)}, x'_{g(2)}, \ldots, x'_{g(j)}, \ldots, x'_{g(m)})$ {Equation 32}

Equation 4 is substituted into equation 25, and the following equation 33 is obtained using equation 29.

When $k = i - j + (1 + n_j)/2$ (where, $1 \le k \le n_j$); {Equation 33}

$$s_{g(j)} = \sum_{i=1}^{m} g_{jk} \cdot (s_{oi}/c_s)$$

$$= s_{og(j)}/c_s$$

$$x_{g(j)} = \sum_{i=1}^{m} g_{jk} \cdot (x_{oi}/c_x)$$

$$= x_{og(j)}/c_x$$

$(j = 1, 2, 3, \ldots, m)$

Similarly, equation 6 is substituted into equation 31, and the following equation 34 is obtained using equation 29.

$s'_{g(j)} = s_{og(j)}/c'_s$ $x'_{g(j)} = x_{og(j)}/c'_x$ {Equation 34}

$(j=1, 2, 3, \ldots, m)$

Figure 21:
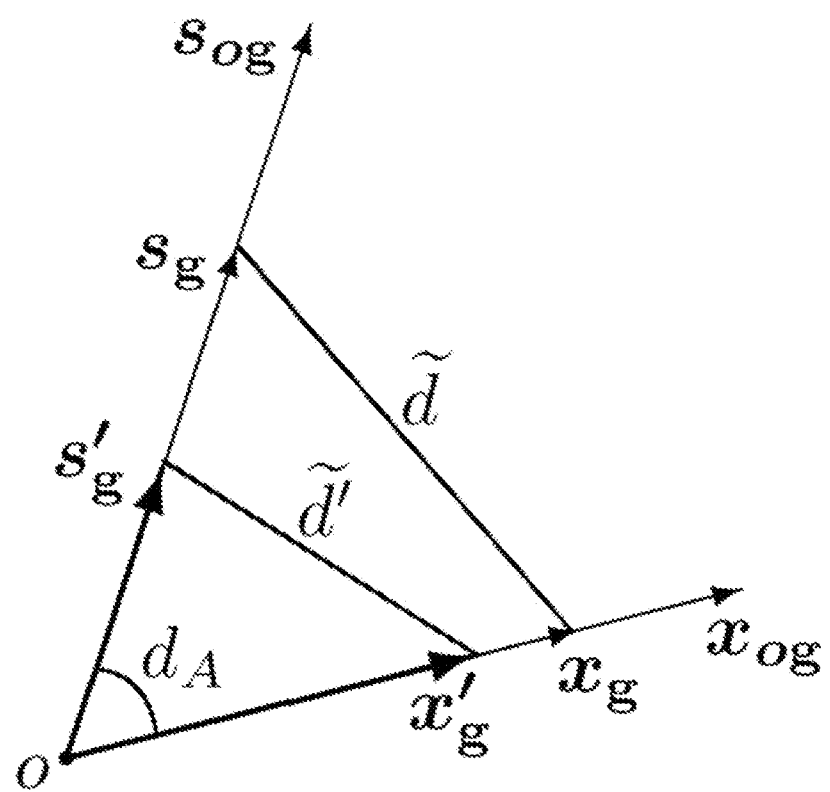
FIG. 21 is a schematic diagram of the m-dimensional pattern space.

FIG. 21 is a schematic diagram of the m-dimensional pattern space, and it shows six vectors, those are sog and xog given by equation 30, sg and xg given by equation 26, and s'g and x'g given by equation 32. Note that all vectors begin at origin o. From equation 33, we can understand that sg(j) and sog(j) are proportional to each other with proportionality constant 1/cs, and that xg(j) and xog(j) are proportional to each other with proportionality constant 1/cx. Also, from equation 34, we can understand that s'g(j) and sog(j) are proportional to each other with proportionality constant 1/c's, and that x'g(j) and xog(j) are proportional to each other with proportionality constant 1/c'x. Therefore, as shown in FIG. 21, vectors s'g, sg and sog have the same direction. Also, vectors x'g, xg and xog have the same direction.

From equation 28, it is clear that the approximate value d˜ of the skewness geometric distance d can be calculated as the Euclidean distance between vector sg and vector xg. Thus, in FIG. 21, we denote the distance between end points of sg and xg by value d˜. Also, if we use equation 5 instead of equation 3 to denote the standard and input pattern vectors, value d˜' can be calculated as the Euclidean distance between s'g and x'g. Thus, in FIG. 21, we denote the distance between end points of s'g and x'g by value d˜'. From FIG. 21, it is clear that values d˜ and d˜' take different values depending on the normalizing method used. To improve on this, we can calculate an angle dA between sog and xog shown in FIG. 21 by the following equation 35 and we define it as the new "skewness geometric distance dA". The skewness geometric distance dA is not affected by the normalizing method used.

$$\cos(d_A) = \frac{\sum_{j=1}^{m} s_{og(j)} \cdot x_{og(j)}}{\sqrt{\sum_{j=1}^{m} (s_{og(j)})^2} \sqrt{\sum_{j=1}^{m} (x_{og(j)})^2}}$$ {Equation 35}

{Unifying Skewness-Weighting Vectors}

Figure 22:
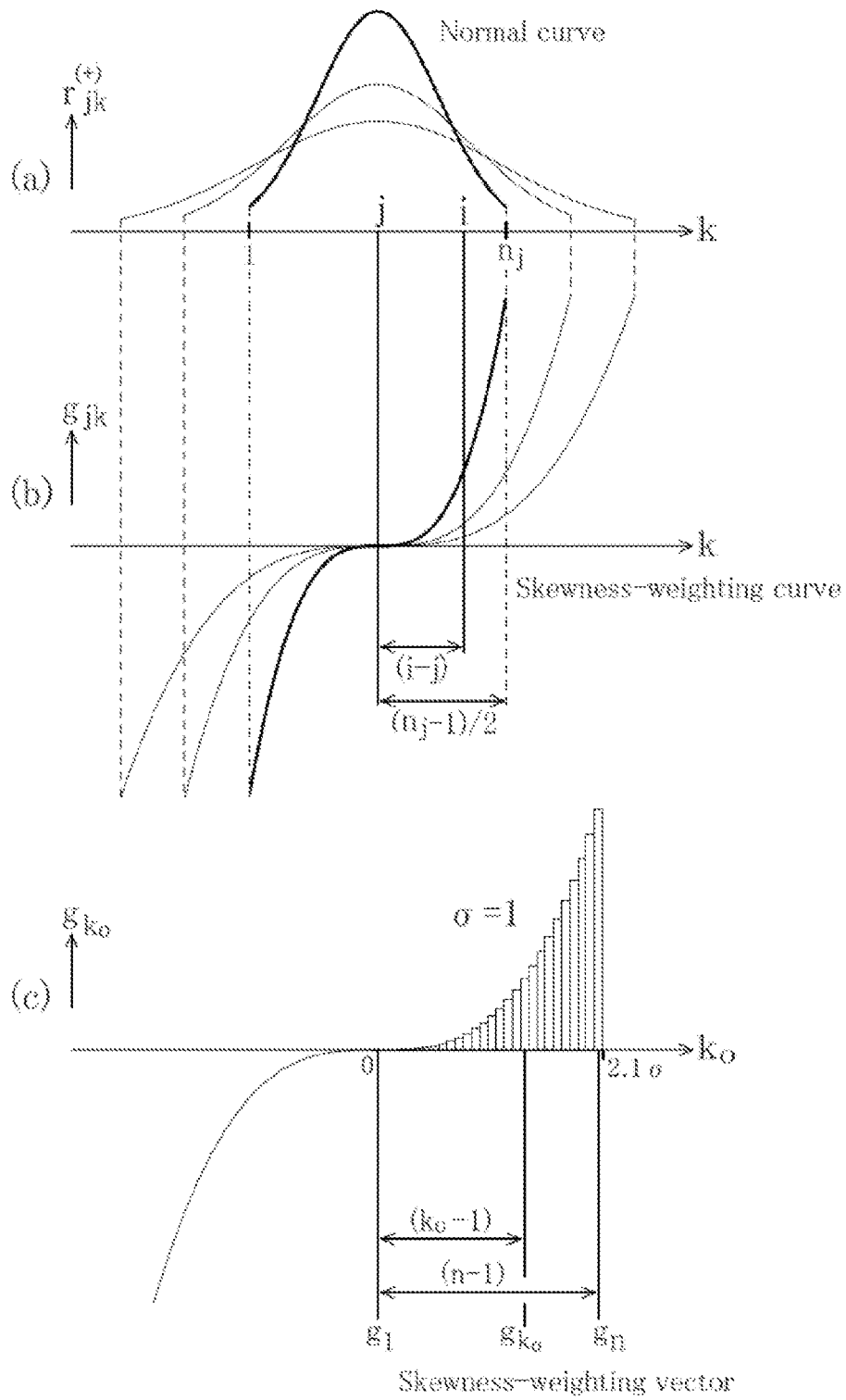
FIG. 22 is a set of graphs showing a method for sharing a skewness-weighting vector.

Next, we explain the method for unifying the skewness-weighting vectors of the present invention. In equation 12, we have created the m pieces of positive and negative reference pattern vectors (normal curves). FIG. 22(a) gives an example of three normal curves among these curves. Note that the center axis of the normal curve is drawn in component position j. In equation 21, we have created the m skewness-weighting vectors (skewness-weighting curves) from equation 12 as shown in FIGS. 19(a) and 19(b). The skewness-weighting curves created from the respective normal curves in FIG. 22(a) are shown in FIG. 22(b). This embodiment uses a fixed bar width of each graph for both standard and input patterns even when the variance value of the normal distribution has changed. In which case, as shown in FIG. 22(b), the maximum and minimum values of those skewness-weighting curves are the same, and those skewness-weighting curves match when expanded or compressed in the direction of the horizontal axis. Thus, we consider reducing the computational memory overhead by unifying m vectors into a single skewness-weighting vector. FIG. 22(c) shows the skewness-weighting curve that has been created using the range of −2.1σ to +2.1σ of the normal curve of variance $\sigma^2=1$. FIG. 22(c) also shows a bar graph having the same height as the function value of skewness-weighting curve. Here, the right half of the skewness-weighting curve is used to create a bar graph for reducing the computational memory overhead. And we create a skewness-weighting vector g having gk0(k0=1, 2, . . . , n) components whose values are the same as the height of the bar graph, and represent it as the following equation 36. However, we assume that value n is sufficiently large when compared with the number of components nj of equation 21. Then, the width of each bar shown in FIG. 22(c) is sufficiently small. Also, if n≪k0, we insert an appropriate number of values gk0=0. Equation 36 is the skewness-weighting vector that represents equation 21, and equation 36 consists of both n components expressing the shape of skewness-weighting curve and an appropriate number of component values 0.

$$g=(g_1, g_2, \ldots, g_{k_0}, \ldots, g_n, 0, \ldots, 0) \quad \{\text{Equation 36}\}$$

As shown by the thick-line skewness-weighting curve of FIG. 22(b), the difference between component numbers i and j is (i−j) for the skewness-weighting vector gj given by equation 21. The difference between the component number at the center and the component number at the rightmost end position is (nj−1)/2. On the other hand, as shown in FIG. 22(c), the difference between component numbers k0 and 1 is (k0−1) and the difference between component numbers n and 1 is (n−1) for the skewness-weighting vector g given by equation 36. As described above, each skewness-weighting curve of FIG. 22(b) can be obtained by expanding or compressing the skewness-weighting curve of FIG. 22(c) in the direction of the horizontal axis. Therefore, if the component number i of FIGS. 22(a) and 22(b) corresponds to k0 of FIG. 22(c), the ratio of (i−j) to (nj−1)/2 is equal to the ratio of (k0−1) to (n−1), and hence 2(i−j)/(nj−1)=(k0−1)/(n−1) is satisfied. If we consider that the skewness-weighting curve has symmetry with respect to the origin (an odd function), we can calculate value k0 using equation k0=1+2|i−j|·(n−1)/(nj−1). Note that k0 is rounded to the closest integer value. If value n is sufficiently large (that is, the width of each bar shown in FIG. 22(c) is sufficiently small), we can reduce the rounding error. In this way, the values sog(j) and xog(j) can be calculated by using the following equation 37 instead of equation 29. Note that Sign (i−j) means a sign of (i−j) in equation 37. That is, if (i−j)>0 then Sign(i−j)=1. If (i−j)=0 then Sign(i−j)=0. If (i−j)<0 then Sign(i−j)=−1. Also, the component number k of equation 29 corresponds to k0 of FIG. 22(c) or equation 37.

$$\text{When } k_0 = 1 + \frac{2(n-1)}{(n_j-1)} \cdot |i-j|;$$

$$s_{og(j)} = \sum_{i=1}^{m} \text{Sign}(i-j) \cdot g_{k_0} \cdot s_{oi}$$

$$x_{og(j)} = \sum_{i=1}^{m} \text{Sign}(i-j) \cdot g_{k_0} \cdot x_{oi}$$

$$(j = 1, 2, 3, \ldots, m) \quad \{\text{Equation 37}\}$$

Using equation 37, we can calculate both sog(j) and xog(j) by simply creating a single g instead of creating gj for each movement position j of the normal distribution. In this manner, the memory usage by g is fixed to the value n in equation 36. While in equation 21, the memory usage by gj increased in proportion to the square of the value m (rigidly speaking, in proportion to the value nj×m). As described above, we can reduce the computational memory overhead by unifying skewness-weighting vectors into a single one.

Figure 23:
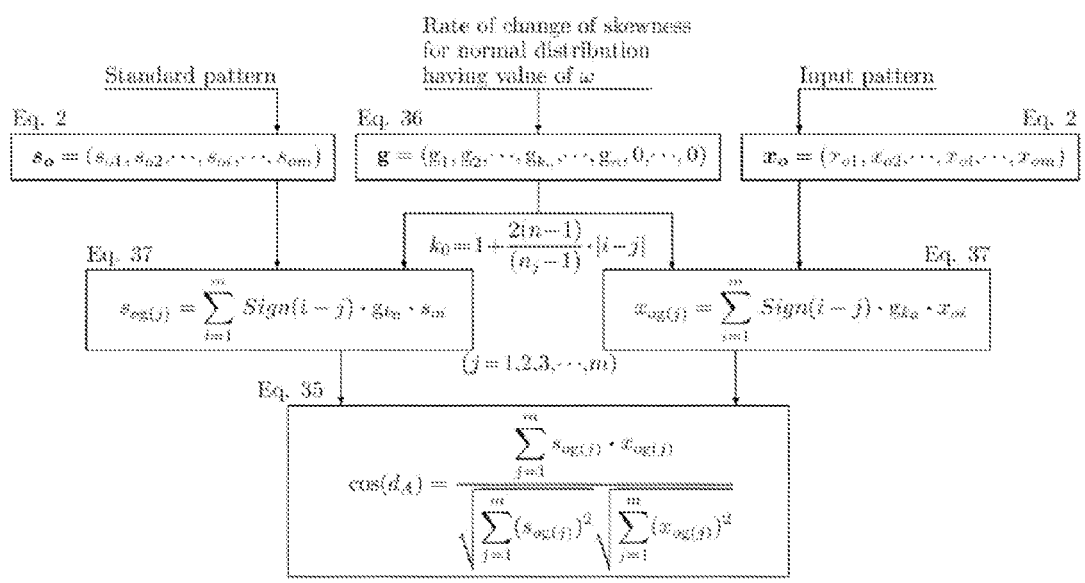
FIG. 23 is a block diagram showing a flowchart for calculating a skewness geometric distance.

FIG. 23 shows a calculation flowchart for a skewness geometric distance. Note that equation numbers are included in the figure. From FIG. 23, we can find that the skewness geometric distance dA is obtained as an angle between: a skewness-weighted standard pattern vector sog calculated by product-sum operation using the original standard pattern vector so and the skewness-weighting vector g having a rate of change in the skewness for a normal distribution having a value ω as a component; and a skewness-weighted input pattern vector xog calculated by product-sum operation using the same skewness-weighting vector g and the original input pattern vector xo. Note that the meaning of "ω" shown in FIG. 23 will be described later with reference to FIG. 34.

Figure 24:
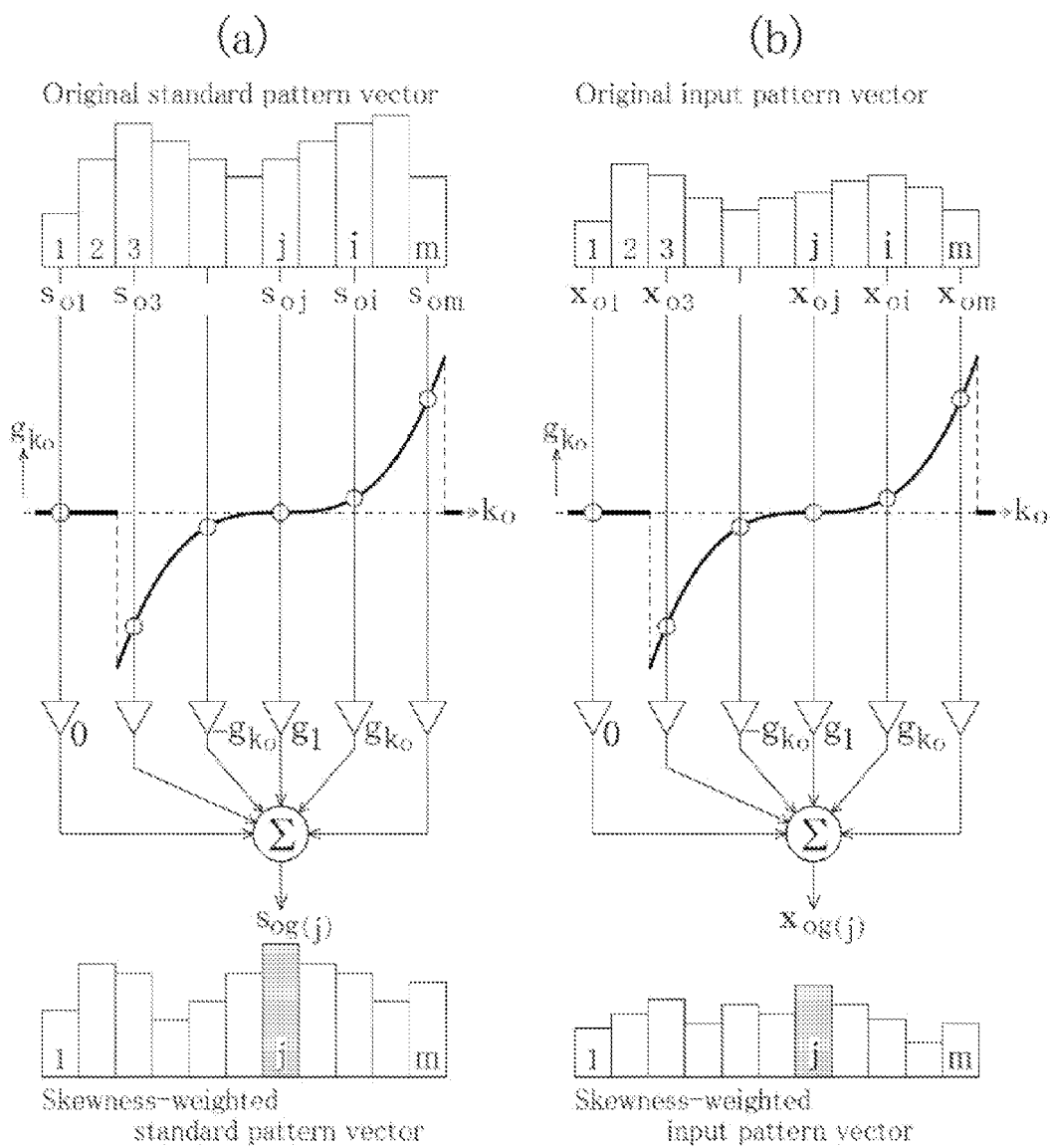
FIG. 24 is a schematic diagram showing a method for creating a skewness-weighted standard pattern vector and a skewness-weighted input pattern vector by using product-sum operation.

Moreover, FIGS. 24(a) and 24(b) show the flow of product-sum operations given by equation 37. Note that the curve in the figure is the skewness-weighting curve shown in FIG. 22(c), and symbol ∇ (inverse triangle) is a multiplier and symbol Σ (summation codes) is an adder. In FIG. 24(a), by using multiplier ∇, we calculate the product Sign (i−j)·gk0·soi using the component value Sign (i−j)·gk0 of skewness-weighting vector and the component value soi of original standard pattern vector. By using adder Σ, we calculate the product-sum by addition of the product Sign (i−j)·gk0·soi for i (i=1, 2, . . . , m), and use it as the component value sog(j) of skewness-weighted standard pattern vector. Similarly, in FIG. 24(b), we calculate the skewness-weighted input pattern vector by the product-sum operation using the skewness-weighting vector and the original input pattern vector. From FIGS. 24(a) and 24(b), it is discovered that the values sog(j) and xog(j) are calculated from soi and xoi, respectively, by the weighting of the skewness-weighting curve.

Figure 25:
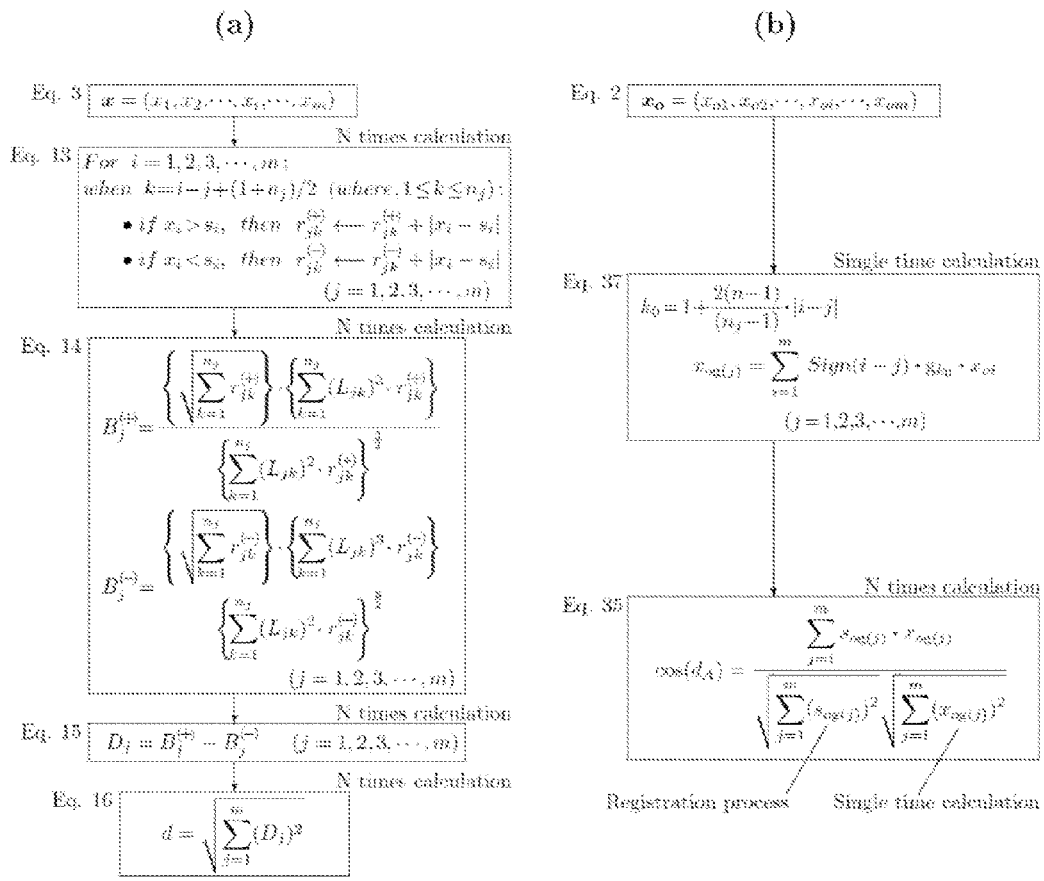
FIG. 25(*a*) is a block diagram showing a flowchart for directly calculating a skewness geometric distance during the input pattern recognition process.

In general, the calculation of pattern recognition is separated into a standard pattern registration process and an input pattern recognition process. FIGS. 25(a) and 25(b) show a comparison between calculation amounts of the direct calculation algorithm of skewness and the approximate calculation algorithm of skewness during the input pattern recognition process. Note that the numbers in the figure are the equation numbers. FIG. 25(a) shows the direct calculation algorithm of skewness during the input pattern recognition process. From FIG. 25(a), if we calculate the skewness geometric distances d between N standard patterns and a single input pattern, we need to calculate equations 3, 13, 14, 15 and 16 sequentially for each combination of standard and input patterns. On the other hand, FIG. 25(b) shows the approximate calculation algorithm of skewness during the input pattern recognition process. From FIG. 25(b), if we calculate the skewness geometric distances dA between N standard patterns and a single input pattern, we can obtain N values of dA by performing a single time calculation of xog(j) and an N times of cosine similarity calculation. From FIGS. 25(a) and 25(b), it is discovered that we can reduce the processing overhead by using the approximate calculation algorithm of skewness instead of the direct calculation algorithm of skewness during the input pattern recognition process.

EXPERIMENT EXAMPLE 6

Figure 26:
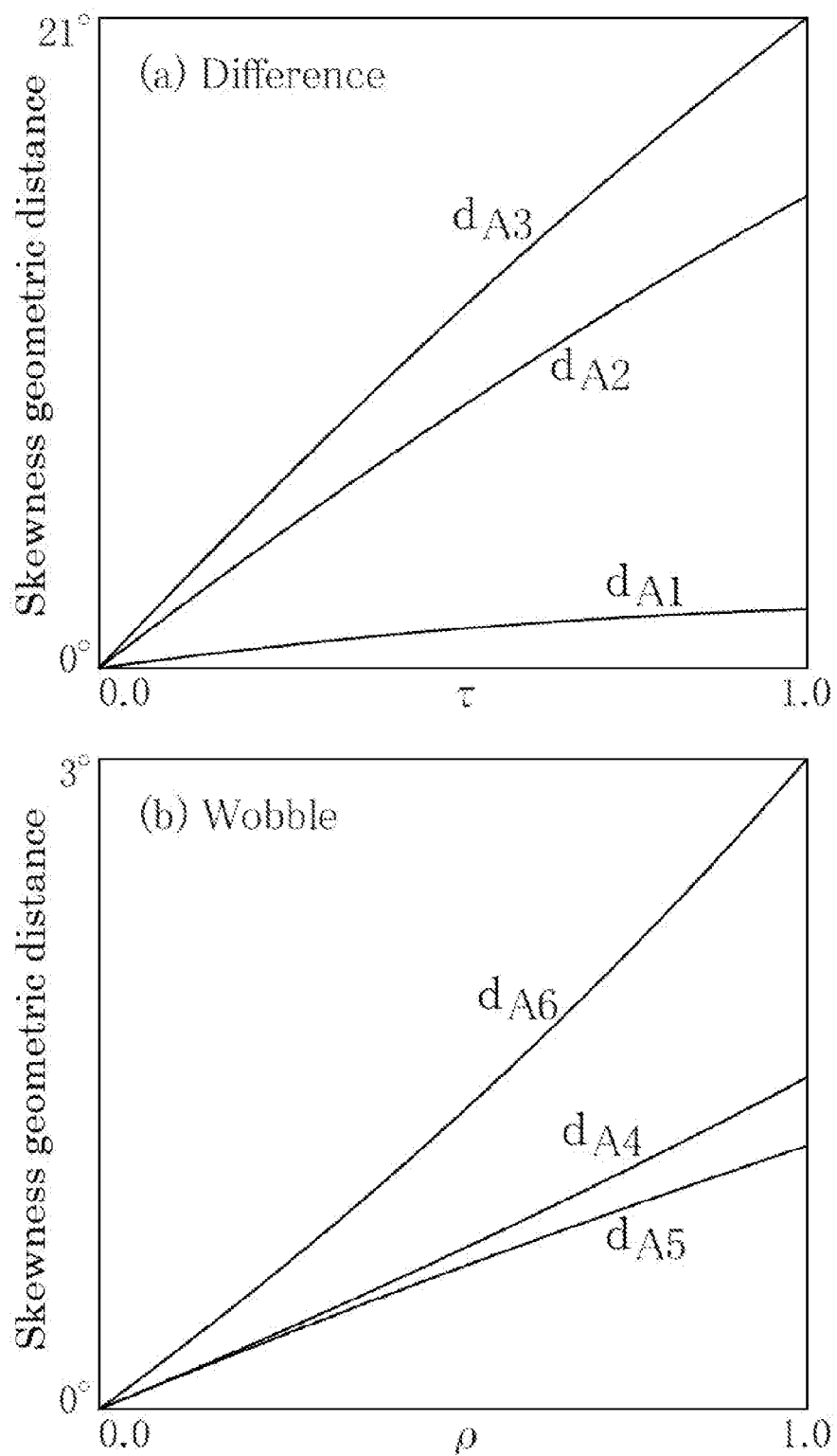
FIG. 26(*a*) is a graph showing an experimental result of skewness geometric distance in Experiment Example 6 with respect to the standard and input patterns shown in FIG. 7(*a*).

Next, we performed numerical experiments to calculate the skewness geometric distances dA of the standard and input patterns shown in FIGS. 7(a) and 7(b) by using processing procedures shown in FIG. 23. Note that we used the same nj and σj values as the Experiment Example 1. Also, note that we read d1 to d6 in FIGS. 7(a) and 7(b) as dA1 to dA6 respectively. FIGS. 26(a) and 26(b) show the results of experiments. From the figures, we can find that dA5<dA4 in FIG. 26(b) although d¯4=d¯5 in FIG. 20(b). Here, m=11 for the standard and input patterns shown in FIGS. 7(a) and 7(b). From the experiments, we found that the larger value was switched between dA4 and dA5 when value m increased. Also, the two lines became close to position dA5 shown in FIG. 26(b). However, the difference between dA4 and dA5 is small because we use m≤256 in the general spectrum analysis.

{Comparison Between Present Invention and Prior Art}

In the present invention, as shown in FIG. 19, a reference pattern vector whose component values are normally distributed is created, and a skewness-weighting vector (equation 36) having a value of a change rate of a skewness of the above reference pattern vector as a component is created. Next, as shown in FIG. 23, a skewness-weighted standard pattern vector (equation 30) is created, using equation 37, by product-sum operation using the component value of skewness-weighting vector (equation 36) and the component value of the original standard pattern vector (equation 2). Similarly, a skewness-weighted input pattern vector (equation 30) is created, using equation 37, by product-sum operation using the component value of the same skewness-weighting vector (equation 36) and the component value of the original input pattern vector (equation 2). Then, an angle between the skewness-weighted standard pattern vector (equation 30) and the skewness-weighted input pattern vector (equation 30) is calculated using equation 35 as a skewness geometric distance.

Figure 27:
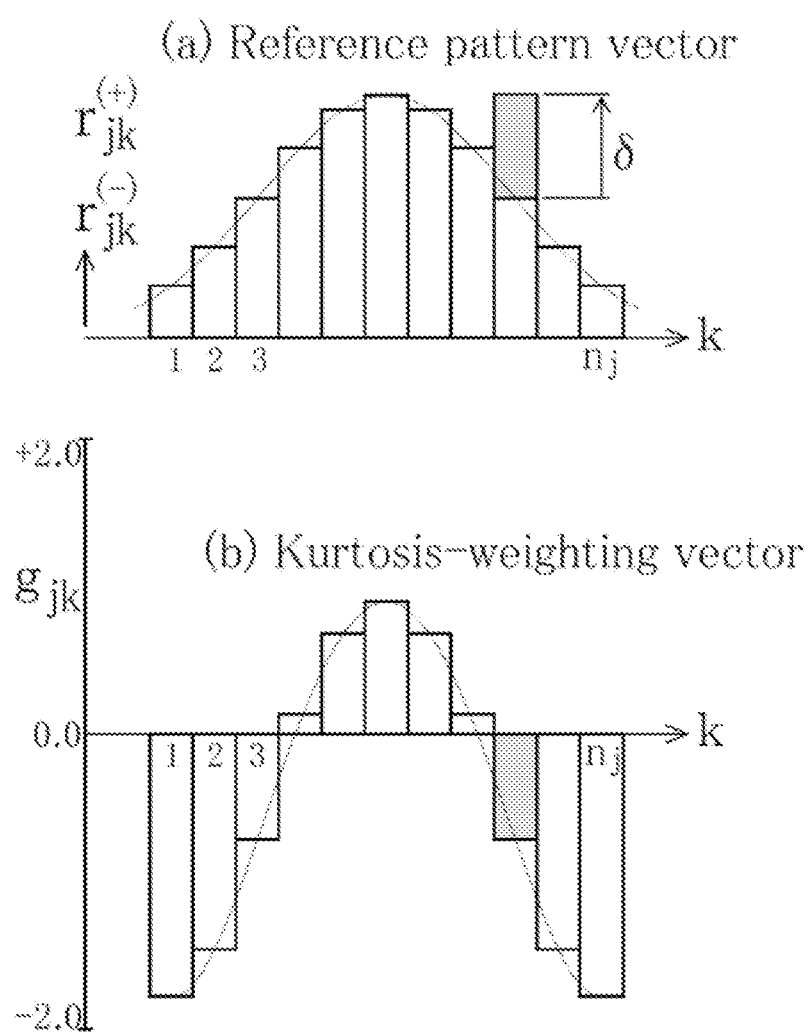
FIG. 27 is a set of graphs showing shapes of a reference pattern vector and a kurtosis-weighting vector.

On the other hand, in the methods of the prior arts, as shown in FIG. 27, a reference pattern vector whose component values are normally distributed is created, and a kurtosis-weighting vector having a value of a change rate of a kurtosis of the above reference pattern vector as a component is created. Next, a kurtosis-weighted standard pattern vector is created by product-sum operation using the component values of kurtosis-weighting vector and the component values of the original standard pattern vector. Similarly, a kurtosis-weighted input pattern vector is created by product-sum operation using the component values of the same kurtosis-weighting vector and the component values of the original input pattern vector. Then, an angle between the kurtosis-weighted standard pattern vector and the kurtosis-weighted input pattern vector is calculated as a kurtosis geometric distance.

As described above, we can understand that, although the skewness-weighting vector and the kurtosis-weighting vector have different component values, these two vectors can be expressed in the same form. Thus, in this embodiment, the skewness-weighting vector and the kurtosis-weighting vector are expressed by use of the same equation (equation 21 and equation 36). Moreover, the skewness-weighted standard and input pattern vectors and the kurtosis-weighted standard and input pattern vectors are calculated respectively by: product-sum operation using the component values of skewness-weighting vector and the component values of the original standard and input pattern vectors; and product-sum operation using the component values of kurtosis-weighting vector and the component values of the original standard and input pattern vectors. We can understand that these four equations can be expressed in the same form. Thus, in this embodiment, the equations for calculating the skewness-weighted standard and input pattern vectors and the kurtosis-weighted standard and input pattern vectors are expressed using the same equation (equation 29). Further, although the skewness-weighted standard and input pattern vectors and the kurtosis-weighted standard and input pattern vectors have different component values, we can understand that these four vectors can be expressed in the same form. Thus, in this embodiment, the skewness-weighted standard and input pattern vectors and the kurtosis-weighted standard and input pattern vectors are expressed using the same equation (equation 30). The skewness geometric distance and the kurtosis geometric distance are calculated from the angle between the skewness-weighted standard and input pattern vectors and the angle between the kurtosis-weighted standard and input pattern vectors. We can understand that these two equations can be expressed in the same form. Thus, in this embodiment, the equations for calculating the skewness geometric distance and the kurtosis geometric distance are expressed using the same equation (equation 16 and equation 35).

{Unifying Kurtosis-Weighting Vectors}

Figure 28:
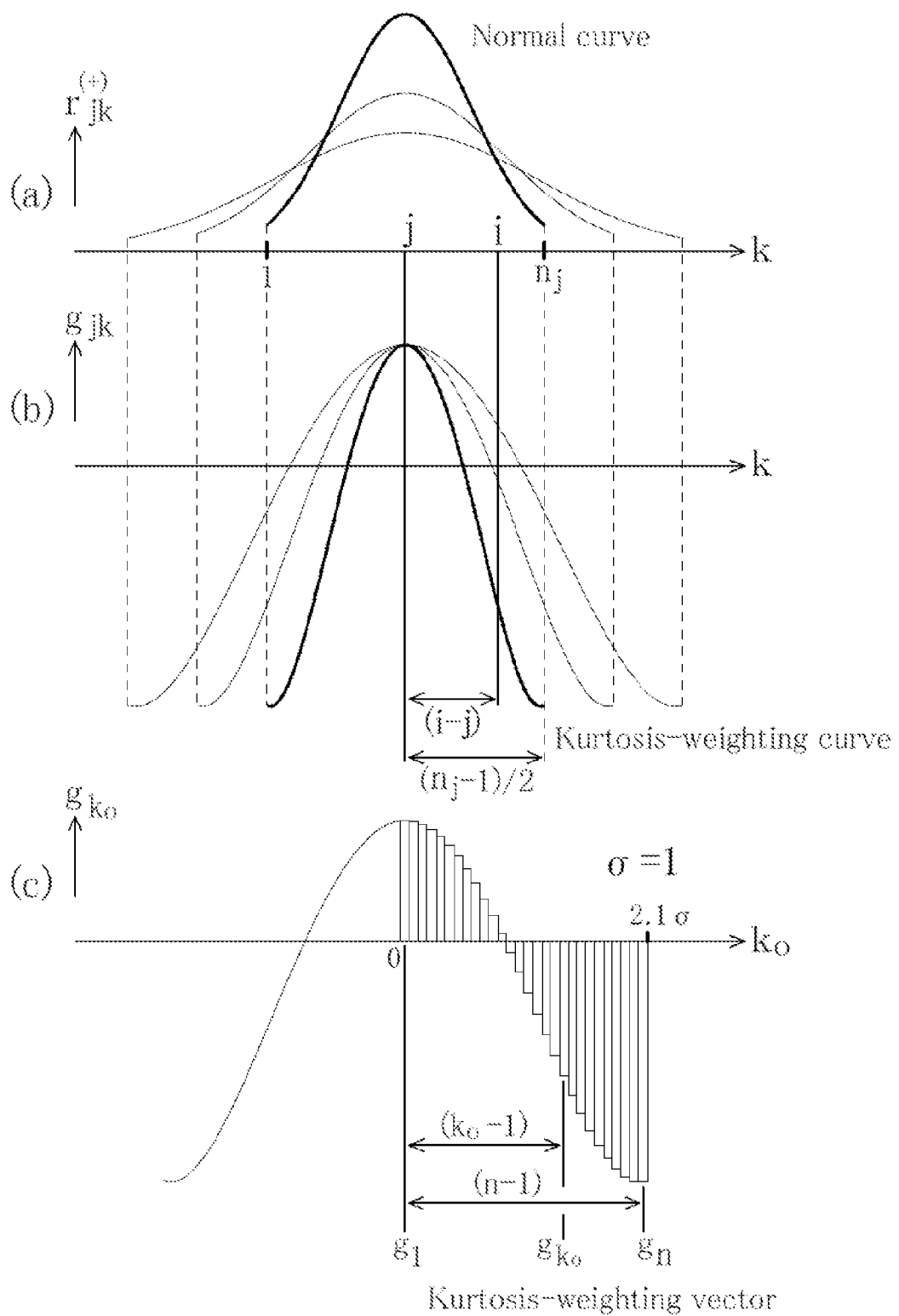
FIG. 28 is a set of graphs showing a method for sharing a kurtosis-weighting vector.

Next, we explain the method for unifying the kurtosis-weighting vectors of the prior arts. In equation 12, we have created the m pieces of positive and negative reference pattern vectors (normal curves). FIG. 28(a) gives an example of three normal curves among these curves. Note that the center axis of the normal curve is drawn in component position j. In equation 21, we have created the m kurtosis-weighting vectors (kurtosis-weighting curves) from equation 12 as shown in FIGS. 27(a) and 27(b). The kurtosis-weighting curves created from the respective normal curves in FIG. 28(a) are shown in FIG. 28(b). The prior arts use a fixed bar width of each graph for both standard and input patterns even when the variance value of the normal distribution has changed. In which case, as shown in FIG. 28(b), the maximum and minimum values of those kurtosis-weighting curves are the same, and those kurtosis-weighting curves match when expanded or compressed in the direction of the horizontal axis. Thus, we consider reducing the computational memory overhead by sharing m vectors into a single kurtosis-weighting vector. FIG. 28(c) shows the kurtosis-weighting curve that has been created using the range of −2.1σ to +2.1σ of the normal curve of variance σ²=1. FIG. 28(c) also shows a bar graph having the same height as the function value of kurtosis-weighting curve. Here, the right half of the kurtosis-weighting curve is used to create a bar graph for reducing the computational overhead. And we create a kurtosis-weighting vector g having gk0 (k0 =1, 2, . . . , n) components whose values are the same as the height of the bar graph, and represent it as equation 36. However, we assume that value n is sufficiently large when compared with the number of components nj of equation 21. Then, the width of each bar shown in FIG. 28(c) is sufficiently small. Also, if n<k0, we insert an appropriate number of values gk0=0. Equation 36 is the kurtosis-weighting vector that represents equation 21, and equation 36 consists of both n components expressing the shape of kurtosis-weighting curve and an appropriate number of component values 0.

As shown by the thick-line kurtosis-weighting curve of FIG. 28(b), the difference between component numbers i and j is (i−j) for the kurtosis-weighting vector gj given by equation 21. The difference between the component number at the center and the component number at the rightmost end position is (nj−1)/2. On the other hand, as shown in FIG. 28(c), the difference between component numbers k0 and 1 is (k0−1) and the difference between component numbers n and 1 is (n−1) for the kurtosis-weighting vector g given by equation 36. As described above, each kurtosis-weighting curve of FIG. 28(b) can be obtained by expanding or compressing the kurtosis-weighting curve of FIG. 28(c) in the direction of the horizontal axis. Therefore, if the component number i of FIGS. 28(a) and 28(b) corresponds to k0 of FIG. 28(c), the ratio of (i−j) to (nj−1)/2 is equal to the ratio of (k0−1) to (n−1), and hence 2(i−j)/(nj−1)=(k0−1)/(n−1) is satisfied. If we consider that the kurtosis-weighting curve is symmetrical about the center axis (an even function), we can calculate value k0 using equation k0=1+2|i−j|·(n−1)/(nj−1). Note that k0 is rounded to the closest integer value. If value n is sufficiently large (that is, the width of each bar shown in FIG. 28(c) is sufficiently small), we can reduce the rounding error. In this way, the values sog (j) and xog(j) can be calculated by using the following equation 38 instead of equation 29. Note that the component number k of equation 29 corresponds to k0 of FIG. 28(c) or equation 38.

$$\text{When } k_0 = 1 + \frac{2(n-1)}{(n_j-1)} \cdot |i - j|;$$

$$s_{og(j)} = \sum_{i=1}^{m} g_{k_0} \cdot s_{oi}$$

$$x_{og(j)} = \sum_{i=1}^{m} g_{k_0} \cdot x_{oi}$$

$$(j = 1, 2, 3, \ldots, m)$$

{Equation 38}

Using equation 38, we can calculate both sog (j) and xog(j) by simply creating a single g instead of creating gj for each movement position j of the normal distribution. In this manner, the memory usage by g is fixed to the value n in equation 36. While in equation 21, the memory usage by gj increased in proportion to the square of the value m (rigidly speaking, in proportion to the value nj×m). As described above, we can reduce the computational memory overhead by unifying kurtosis-weighting vectors into a single one.

Figure 29:
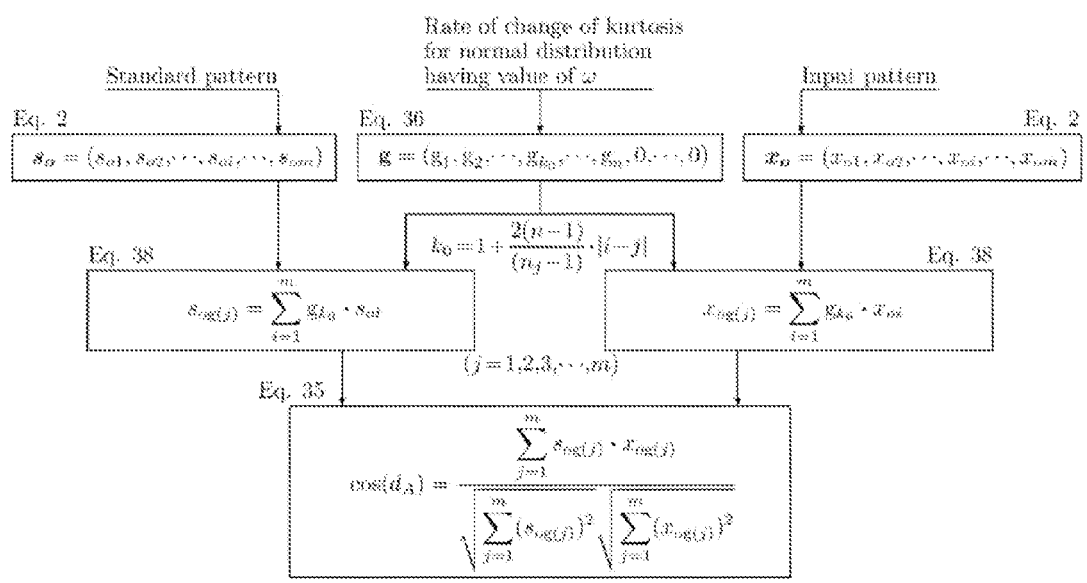
FIG. 29 is a block diagram showing a flowchart for calculating a kurtosis geometric distance.

FIG. 29 shows a calculation flowchart for a kurtosis geometric distance. Note that equation numbers are included in the figure. From FIG. 29, we can find that the kurtosis geometric distance dA is obtained as an angle between: a kurtosis-weighted standard pattern vector sog calculated by product-sum operation using the original standard pattern vector so and the kurtosis-weighting vector g having a rate of change in the kurtosis for a normal distribution having a value ω as a component; and a kurtosis-weighted input pattern vector xog calculated by product-sum operation using the same kurtosis-weighting vector g and the original input pattern vector xo. Note that the meaning of "ω" shown in FIG. 29 will be described later with reference to FIG. 40.

Figure 30:
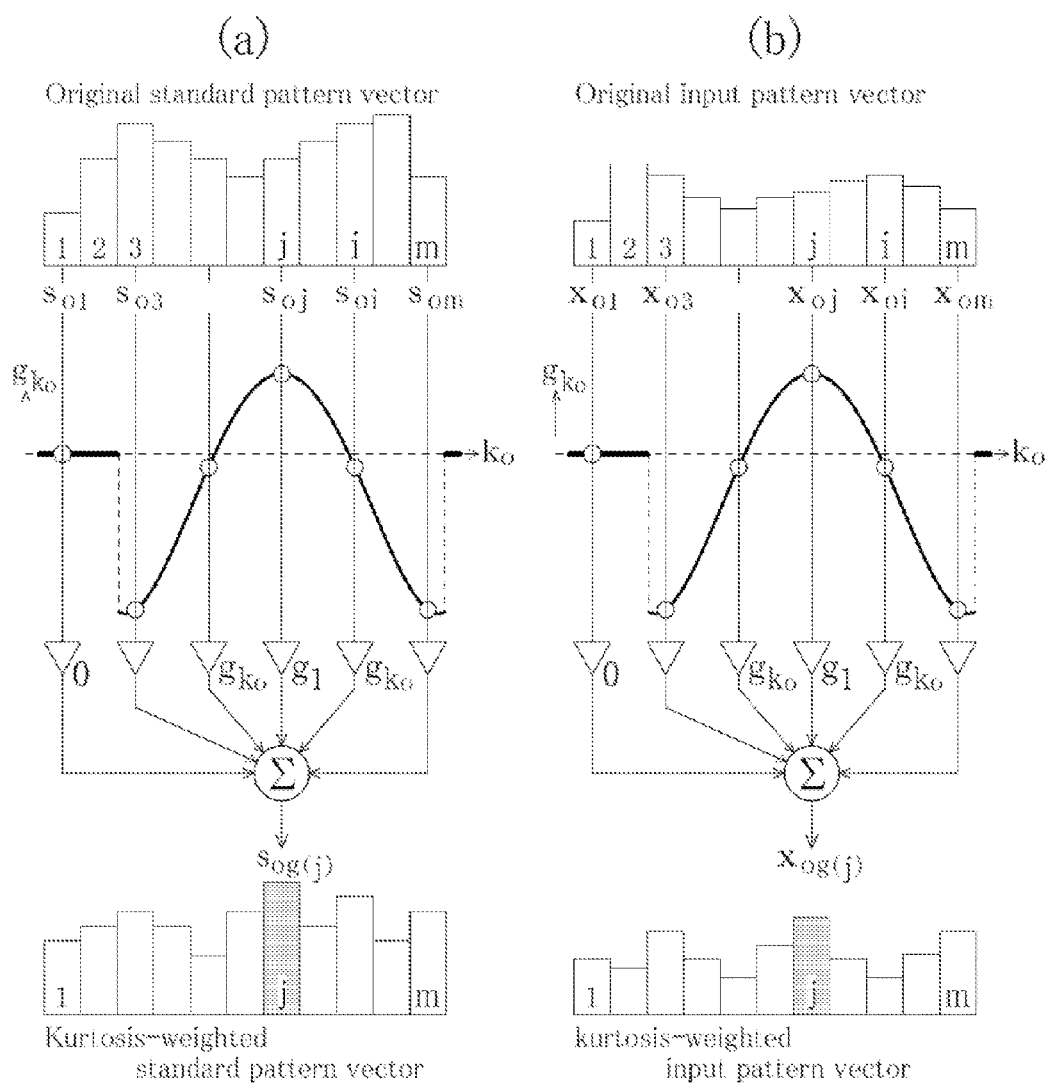
FIG. 30 is a schematic diagram showing a method for creating a kurtosis-weighted standard pattern vector and a kurtosis-weighted input pattern vector by using product-sum operation.

Moreover, FIGS. 30(a) and 30(b) show the flow of product-sum operations given by equation 38. Note that the curve in the figure is the kurtosis-weighting curve shown in FIG. 28(c), and symbol ∇ (inverse triangle) is a multiplier and symbol Σ (summation codes) is an adder. In FIG. 30(a), by using multiplier ∇, we calculate the product gk0·soi using the component value gk0 of kurtosis-weighting vector and the component value soi of original standard pattern vector. By using adder Σ, we calculate the product-sum by addition of the product gk0·soi for i (i=1, 2, . . . , m), and use it as the component value sog(j) of kurtosis-weighted standard pattern vector. Similarly, in FIG. 30(b), we calculate the kurtosis-weighted input pattern vector by the product-sum operation using the kurtosis-weighting vector and the original input pattern vector. From FIGS. 30(a) and 30(b), it is discovered that the values sog(j) and xog(j) are calculated from soi and xoi, respectively, by the weighting of the kurtosis-weighting curve.

Figure 31:
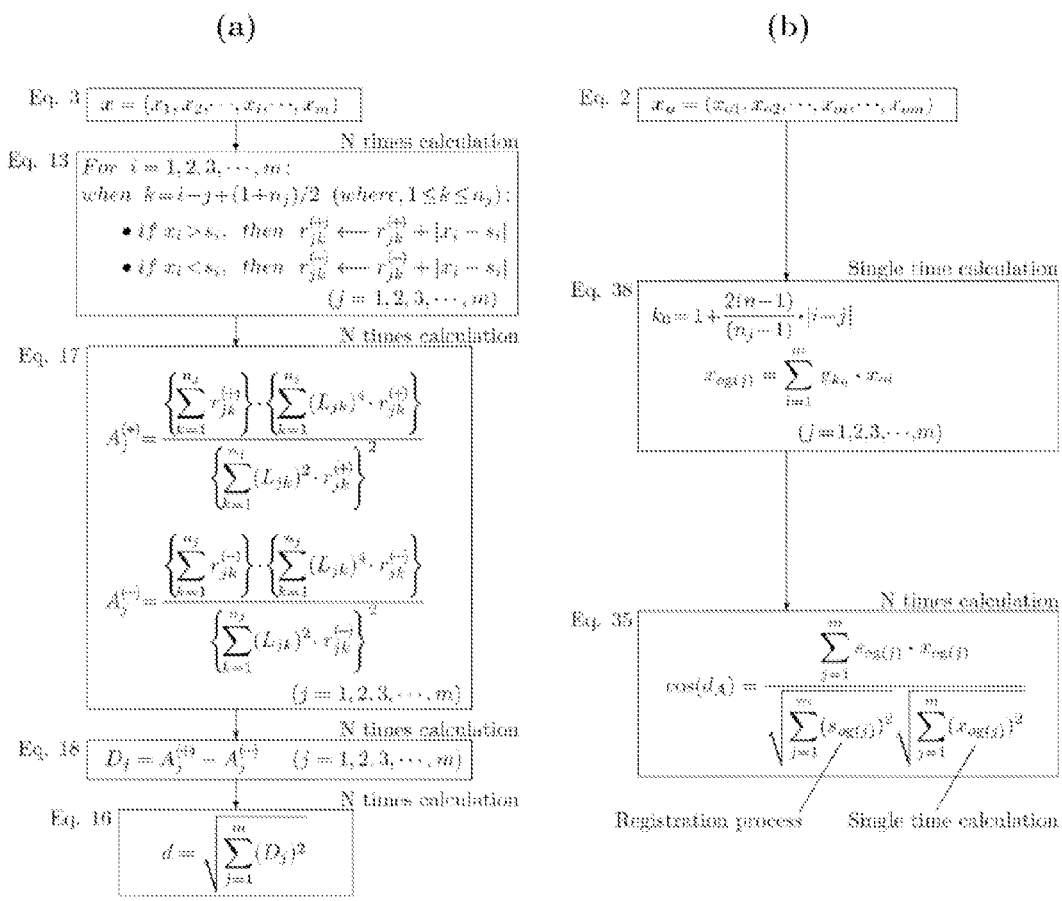
FIG. 31(*a*) is a block diagram showing a flowchart for directly calculating a kurtosis geometric distance during the input pattern recognition process.

In general, the calculation of pattern recognition is separated into a standard pattern registration process and an input pattern recognition process. FIGS. 31(a) and 31(b) show a comparison between calculation amounts of the direct calculation algorithm of kurtosis and the approximate calculation algorithm of kurtosis during the input pattern recognition process. Note that the numbers in the figure are the equation numbers. FIG. 31(a) shows the direct calculation algorithm of kurtosis during the input pattern recognition process. From FIG. 31(a), if we calculate the kurtosis geometric distances d between N standard patterns and a single input pattern, we need to calculate equations 3, 13, 17, 18 and 16 sequentially for each combination of standard and input patterns. On the other hand, FIG. 31(b) shows the approximate calculation algorithm of kurtosis during the input pattern recognition process. From FIG. 31(b), if we calculate the kurtosis geometric distances dA between N standard patterns and a single input pattern, we can obtain N values of dA by performing a single time calculation of xog(j) and an N times of cosine similarity calculation. From FIGS. 31(a) and 31(b), it is discovered that we can reduce the processing overhead by using the approximate calculation algorithm of kurtosis instead of the direct calculation algorithm of kurtosis during the input pattern recognition process.

EXPERIMENT EXAMPLE 7

Figure 32:
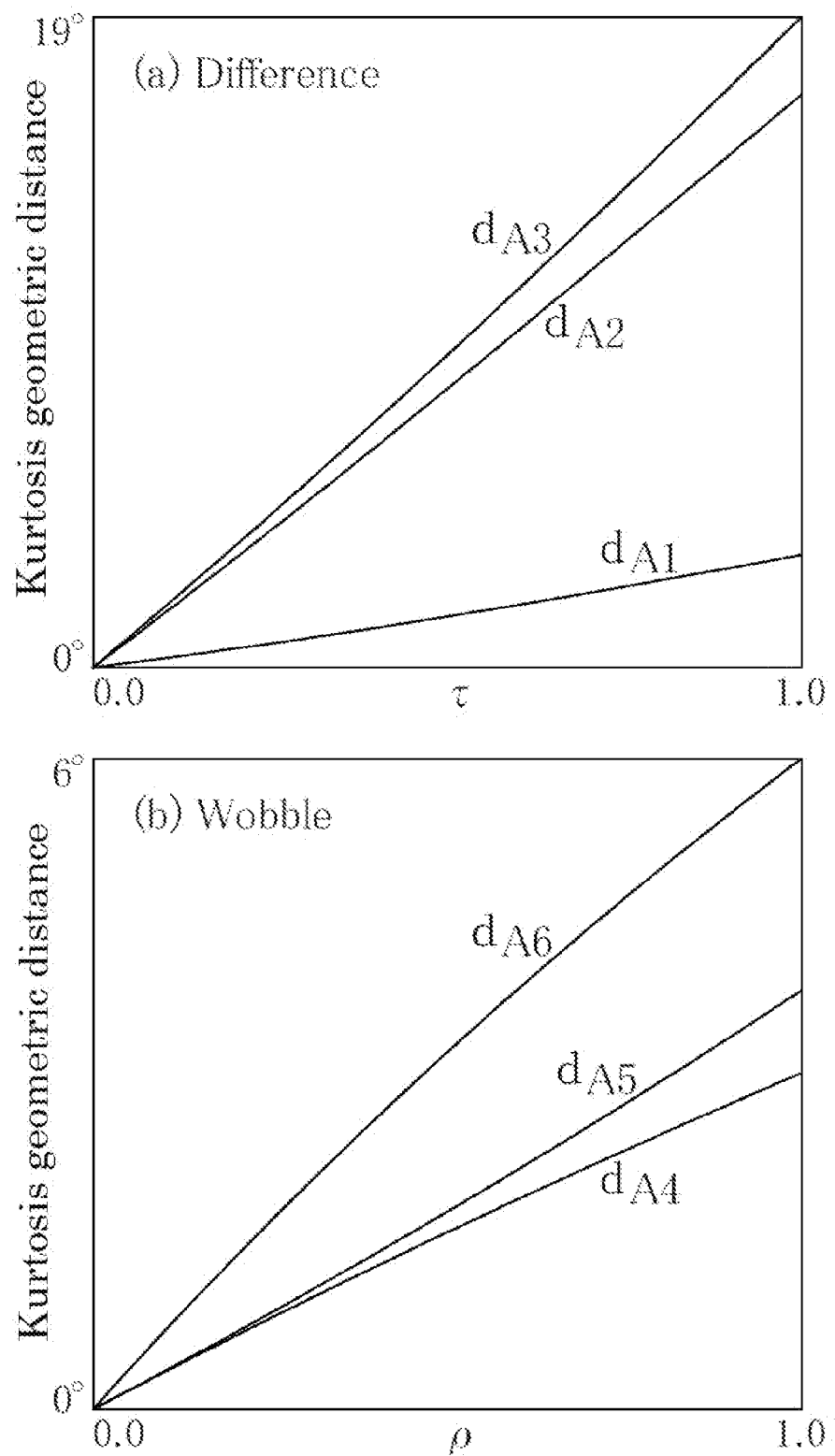
FIG. 32(*a*) is a graph showing an experimental result of kurtosis geometric distance in Experiment Example 7 with respect to the standard and input patterns shown in FIG. 7(*a*).

Next, we performed numerical experiments to calculate the kurtosis geometric distances dA of the standard and input patterns shown in FIGS. 7(a) and 7(b) by using processing procedures shown in FIG. 29. Note that we used the same nj and σ values as the Experiment Example 1. Also, note that we read d1 to d6 in FIGS. 7(a) and 7(b) as dA1 to dA6 respectively. FIGS. 32(a) and 32(b) show the results of experiments. From the figures, we can find that dA5>dA4 in FIG. 32(b). Here, m=11 for the standard and input patterns shown in FIGS. 7(a) and 7(b). From the experiments, we found that the larger value was switched between dA4 and dA5 when value m increased. Also, the two lines became close to position dA4 shown in FIG. 32(b). However, the difference between dA4 and dA5 is small because we use m≥256 in the general spectrum analysis.

The skewness geometric distance according to the present invention is calculated with the method using the skewness-weighting vector having a value of a change rate of skewness of the normal distribution as a component. On the other hand, the kurtosis geometric distance according to the prior art is calculated with the method using the kurtosis-weighting vector having a value of a change rate of kurtosis of the normal distribution as a component. From the above result of Experiment Example 7, we can understand that the degree of similarity between the original standard pattern vector and the original input pattern vector can be detected as a distance value, as in the case of the kurtosis geometric distance according to the prior art, even by using the skewness geometric distance according to the present invention.

{Optimizing Variance of Normal Distribution in Present Invention}

In the present invention, the reference pattern vector (equation 12) whose component values are normally distributed is created as shown in FIG. 19(a), and the skewness-weighting vector (equation 21) having a value of a change rate of skewness of the reference pattern vector as a component is created as shown in FIG. 19(b) by using equation 20. Next, as for the skewness geometric distance according to the present invention, the influence of the value of variance of the normal distribution on the similarity detection accuracy will be described. However, here, consideration will be made for the limited case where a difference in shapes between the standard and input patterns is small, as in the case of the description of FIGS. 53 to 55, and a method for replacing a difference in shapes between the standard and input patterns by the shape change in one reference pattern vector.

Figure 33:
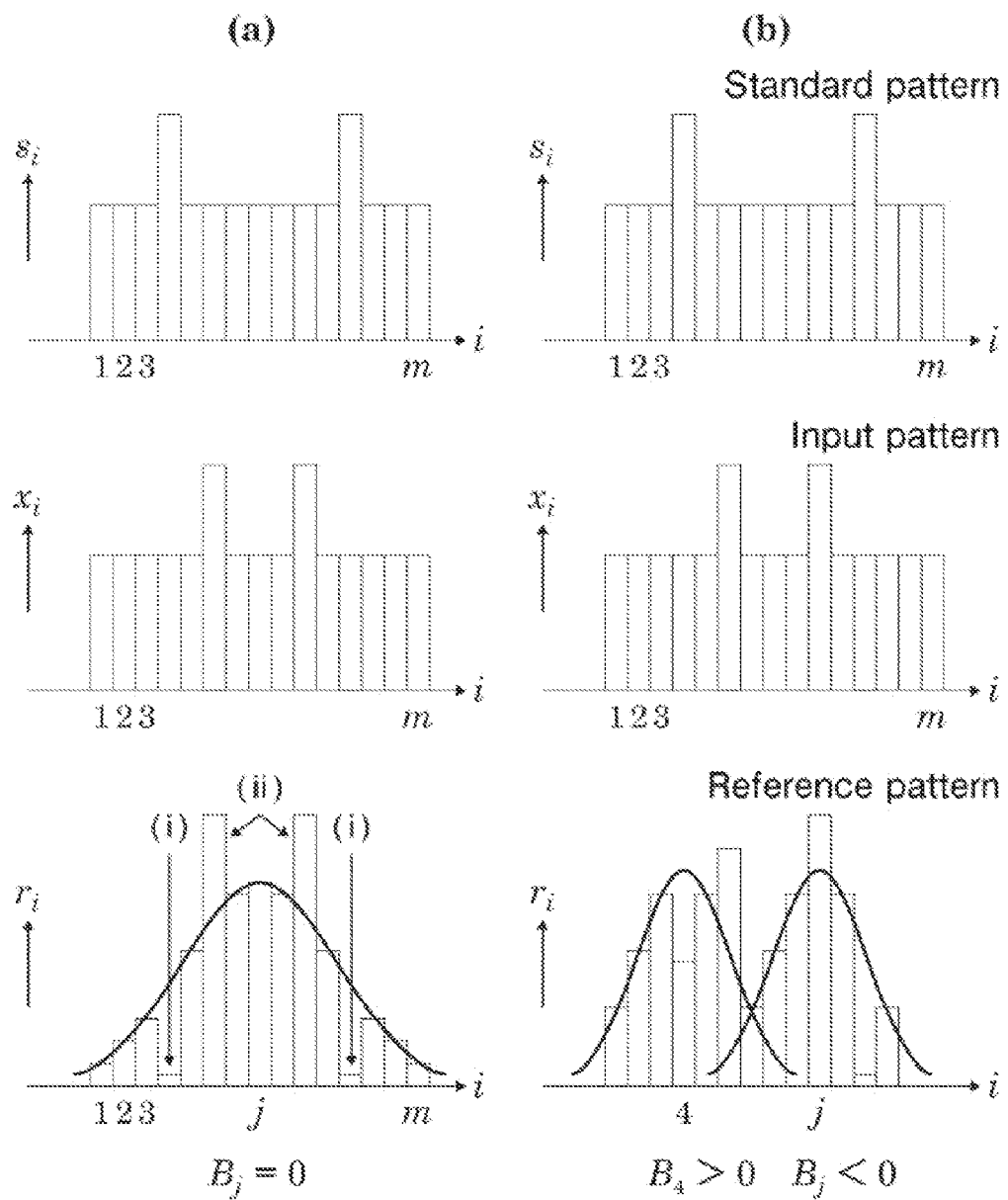
FIG. 33 is a set of graphs showing the influence of a value of variance of a normal distribution on the accuracy of detecting a similarity between skewness geometric distances.

The upper and middle diagrams of FIGS. 33(a) and 33(b) show a typical example exhibiting shapes of the standard and input patterns having two peaks, respectively. Also, the bottom diagrams of FIGS. 33(a) and 33(b) show an example where a difference in shapes between the standard and input patterns is replaced by the shape change in the reference pattern having the normal distribution as its initial shape. Note that the standard patterns shown in FIGS. 33(a) and 33(b) have the same shape, and the input patterns shown in FIGS. 33(a) and 33(b) have the same shape. Also, note that the peaks of the standard and input patterns shown in FIGS. 33(a) and 33(b) are assumed to have the same height, and the area of each standard pattern and each input pattern is equal to 1.

The bottom diagram of FIG. 33(a) shows a typical example of the reference pattern that has been created from the normal distribution having a large variance value. Because the positions of two bars (i) in the figure are symmetrical about the center axis of the normal distribution, the effect of two decreases is cancelled out concerning the skewness Bj. Similarly, the effect of increases of two bars (ii) in the figure is cancelled out. As a result, the skewness becomes Bj=0. Therefore, in this case, we cannot detect the difference between peaks of the standard and input patterns by using the value of the skewness Bj.

The bottom diagram of FIG. 33(b) shows a typical example of the two reference patterns that have been created from the normal distribution having a small variance value. In FIG. 33(b), the skewness becomes B4>0 and Bj<0. Therefore, in this case, we can detect the difference between peaks of the standard and input patterns by using the skewness values B4 and Bj.

Figure 34:
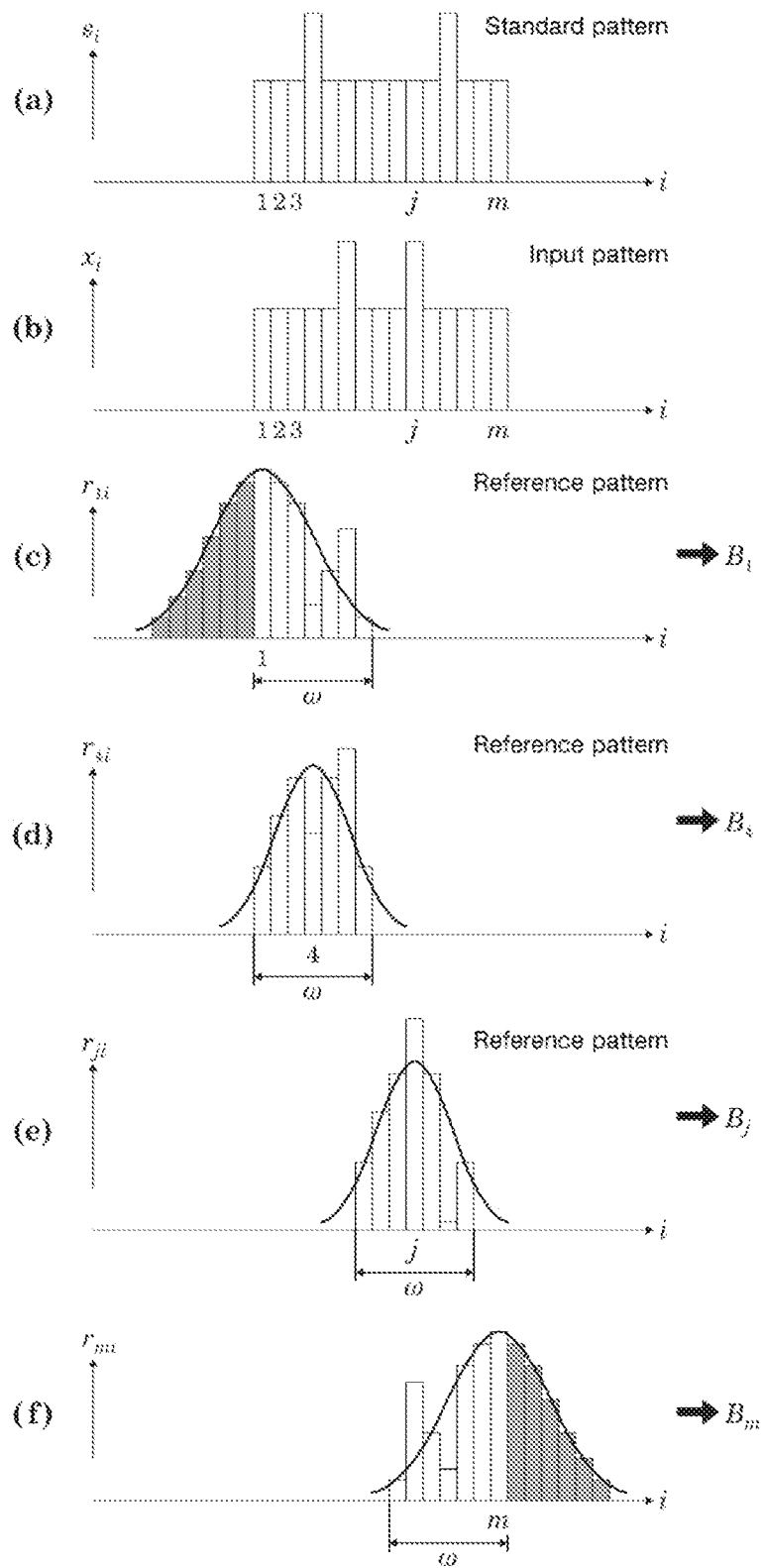
FIG. 34 is a set of graphs showing an example of a shape change in a reference pattern vector when the center axis of a normal distribution is moved.

If we use the normal distribution having the small variance value as shown in the bottom diagram of FIG. 33(b), then we need to use several reference patterns so that they may cover the entire standard and input patterns. Therefore, as shown in FIG. 34, we determine the variable of skewness Bj for each j while moving the center axis of the normal distribution to each component position j (j=1, 2, . . . , m) of the standard and input patterns. We calculate a square root of a sum of a square of each variable of skewness Bj (j=1, 2, . . . , m), and we define it as the "skewness geometric distance d" (Equation 16) between the standard and input patterns. From the typical examples of FIGS. 33(a) and 33(b), it is understood that the accuracy of the similarity detection is changed as the variance value of the normal distribution is changed.

The description has been given of the influence of the value of variance of the normal distribution on the similarity detection accuracy in the calculation of the skewness geometric distance. Next, a method for obtaining an optimum value of variance of the normal distribution will be described.

In hitting a concrete structure using a hammer, generally, a power spectrum changes subtly with each hit even at the same spot of the same structure. Therefore, a method is usually adopted wherein more than one normal standard sound is registered by repeatedly hitting the same spot of a normal structure and more than one abnormal standard sound is registered by repeatedly hitting the same spot of an abnormal structure. Moreover, in voice recognition, a power spectrum changes subtly with each utterance of the same voice. Therefore, a method is usually adopted wherein a number of persons repeatedly produce the same voice and more than one standard sound is registered for each voice. Note that, in the description thus far, the method for calculating the skewness geometric distance value dA between the standard and input sounds has been described. Alternatively, we can replace the input sound by the standard sound and, using the same method, calculate a skewness geometric distance value dA between two standard sounds.

Figure 35:
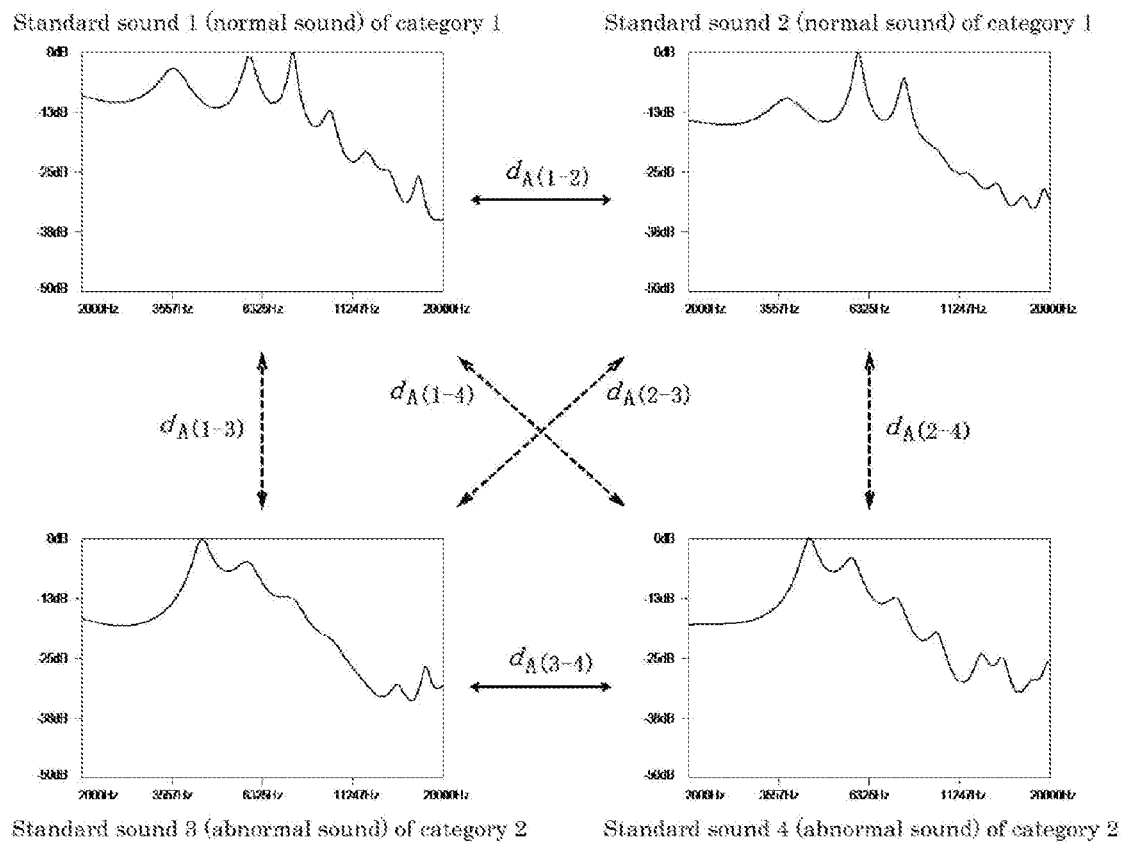
FIG. 35 is a set of graphs showing two examples of a normal sound power spectrum and two examples of an abnormal sound power spectrum.

For example, assuming that a group of normal standard sounds is category 1, the upper diagrams of FIG. 35 show two examples of a power spectrum of a normal sound, which are set as standard sounds 1 and 2 belonging to category 1, respectively. Also, assuming that a group of abnormal standard sounds is category 2, the lower diagrams of FIG. 35 show two examples of a power spectrum of an abnormal sound, which are set as standard sounds 3 and 4 belonging to category 2, respectively. Note that, in FIG. 35, skewness geometric distances between the standard sounds are schematically depicted respectively as dA(1-2), dA(3-4), dA(1-3), dA(1-4), dA(2-3) and dA(2-4). dA(1-2) indicated by the solid arrow denotes the skewness geometric distance between the normal standard sounds 1 and 2 belonging to the same category. dA(3-4) indicated by the solid arrow denotes the skewness geometric distance between the abnormal standard sounds 3 and 4 belonging to the same category. dA(1-3) and dA(1-4) indicated by the dashed arrows denote the skewness geometric distances between the normal standard sound 1 and the abnormal standard sounds 3 and 4 belonging to the different categories. dA(2-3) and dA(2-4) indicated by the dashed arrows denote the skewness geometric distances between the normal standard sound 2 and the abnormal standard sounds 3 and 4 belonging to the different categories.

Here, if the distance between the standard sounds of the same category is shortened, and simultaneously, the distance between the standard sounds of the different categories is elongated, then, as a result, separation property of the standard sounds of the same category and the standard sounds of the different categories is improved, and thus recognition performance when an input sound is given is improved.

Next, a state of separation of the standard sounds of the same category from the standard sounds of the different categories is checked while changing the value of variance of the normal distribution. In this embodiment, we change the value of variance of the normal distribution by changing the value ω shown in FIGS. 34(c) to 34(f). In the reference patterns shown in FIGS. 34(c) to 34(f), the white bars correspond to the component numbers i of the input pattern and, therefore, their values change in response to the "wobble" of the input pattern. However, the gray bars do not correspond to the component numbers i and their values do not change. Here, the number of white bars in the bar graph of each reference pattern is set to the same value ω so that the sensitivity to the "wobble" in the reference patterns may be equated regardless of the position of the normal distribution. In FIGS. 34(c) to 34(f), for an example, each reference pattern includes seven white bars ($\omega$=7). Note that "$\omega$" shown in FIG. 23 corresponds to "$\omega$" shown in FIGS. 34(c) to 34(f).

To be more specific, in order to check changes in the values of the skewness geometric distances dA (1-2), dA (3-4), dA(1-3), dA(1-4), dA(2-3) and dA(2-4) between the standard sounds shown in FIG. 35 while changing the value $\omega$ shown in FIGS. 34(c) to 34(f), a value ($\bar{d}^{-}$−$\bar{d}^{-}$2) of a difference in mean is obtained by subtracting a skewness geometric distance mean $\bar{d}^{-}$2 between the standard sounds of the same category from a skewness geometric distance mean $\bar{d}^{-}$1 between the standard sounds of the different categories, as shown in the following equation 39. Next, we obtain the square root of the sum (($s_1^2/N_1$)+($s_2^2/N_2$)) of a value ($s_1^2/N_1$) obtained by dividing a sample variance $s_1^2$ of the skewness geometric distance between the standard sounds of the different categories by the sample size $N_1$ and a value ($s_2^2/N_2$) obtained by dividing a sample variance $s_2^2$ of the skewness geometric distance between the standard sounds of the same category by the sample size $N_2$. Then, a Welch's test statistic $T(\omega)$ is calculated as a value of an objective function by dividing the above value of the difference in mean by the above square root.

$$N_1 = 4 \qquad \{\text{Equation 39}\}$$

$$N_2 = 2$$

$$\bar{d}_1 = \frac{d_{A(1-3)} + d_{A(1-4)} + d_{A(2-3)} + d_{A(2-4)}}{N_1}$$

$$\bar{d}_2 = \frac{d_{A(1-2)} + d_{A(3-4)}}{N_2}$$

$$s_1^2 = \frac{(d_{A(1-3)} - \bar{d}_1)^2 + (d_{A(1-4)} - \bar{d}_1)^2 + (d_{A(2-3)} - \bar{d}_1)^2 + (d_{A(2-4)} - \bar{d}_1)^2}{N_1 - 1}$$

$$s_2^2 = \frac{(d_{A(1-2)} - \bar{d}_2)^2 + (d_{A(3-4)} - \bar{d}_2)^2}{N_2 - 1}$$

$$T(\omega) = \frac{\bar{d}_1 - \bar{d}_2}{\sqrt{\frac{s_1^2}{N_1} + \frac{s_2^2}{N_2}}}$$

Figure 36:
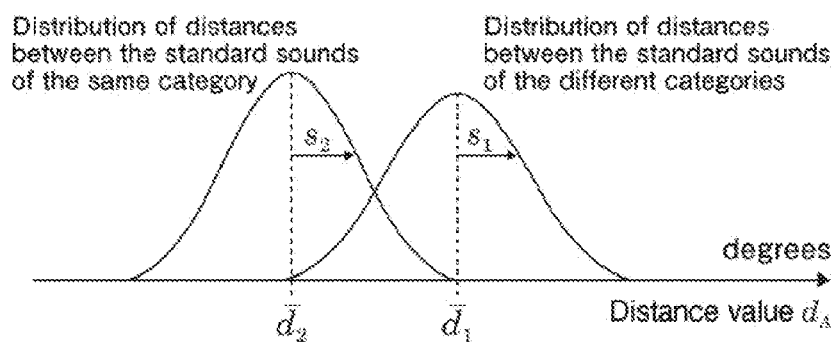
FIG. 36 is a schematic graph showing a frequency distribution of distances between standard sounds of different categories and a frequency distribution of distances between standard sounds of the same category.

FIG. 36 is a schematic diagram showing a frequency distribution cf the distance values between the standard sounds of the different categories and a frequency distribution of the distance values between the standard sounds of the same category, which are drawn by using the respective means $\bar{d}^{-}$1 and $\bar{d}^{-}$2 and the respective sample standard deviations $s_1$ and $s_2$. From FIG. 36, we can find that, when $T(\omega)$ reaches its maximum as the value of the numerator of $T(\omega)$ shown in equation 39 increases and, simultaneously, the value of the denominator decreases, the distance between the standard sounds of the same category is shortened and, simultaneously, the distance between the standard sounds of the different categories is elongated. Therefore, the skewness-weighting curve is optimized, which is created based on the value $\omega$ that maximizes the value of $T(\omega)$. A generalized expression of the above discussion is as follows. Specifically, the problem of obtaining an optimum skewness-weighting curve boils down to the optimization problem of obtaining the value of the variable $\omega$ that maximizes the objective function when $T(\omega)$ is the objective function.

Figure 37:
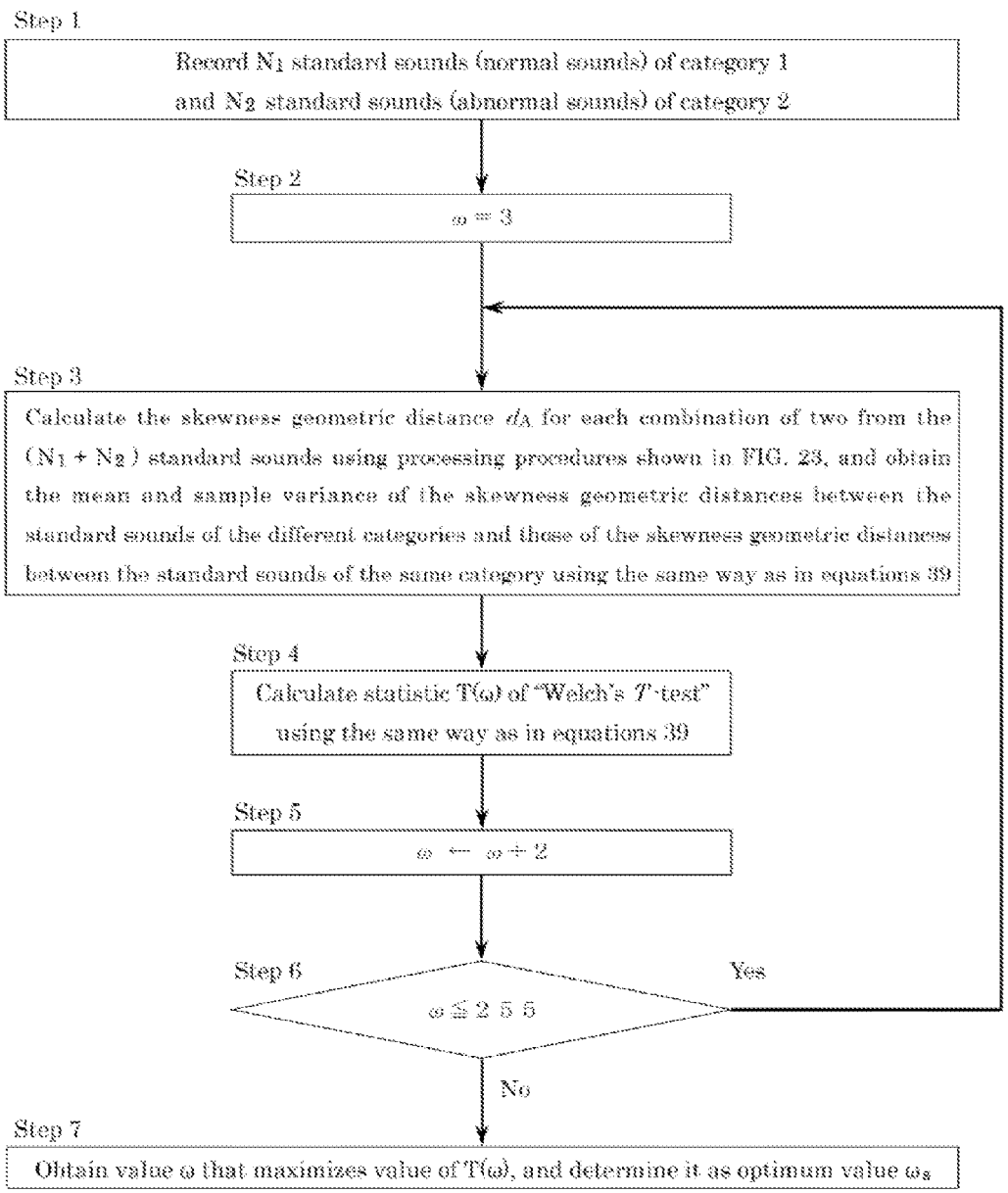
FIG. 37 is a diagram showing processing procedures for obtaining an optimum value ωs.

FIG. 37 shows processing procedures for obtaining an optimum value of $\omega$ by use of N1 standard sounds (normal sounds) belonging to category 1 and N2 standard sounds (abnormal sounds) belonging to category 2. Note that N1≥2 and N2≥2. Also, the number of bars m shown in FIG. 3 is set to 257, and power spectra of the standard sounds are created. In FIG. 37, an optimum value is obtained by running the value $\omega$ from 3 to 255.

In Step 1 of FIG. 37, (N1+N2) power spectra are created by recording the N1 standard sounds (normal sounds) of category 1 and the N2 standard sounds (abnormal sounds) of category 2.

In Step 2, $\omega$=3 is set as an initial value.

In Step 3, the skewness geometric distance dA for each combination of two from the (N1+N2) standard sounds is calculated using the processing procedures shown in FIG. 23, and the mean and sample variance of the skewness geometric distances between the standard sounds of the different categories and those of the skewness geometric distances between the standard sounds of the same category are obtained using the same way as in equation 39.

In Step 4, Welch's test statistic $T(\omega)$ is calculated using the same way as in equation 39.

In Steps 5 and 6, the processing of Steps 3 and 4 is repeated while increasing the value $\omega$ to 255 with an increment of 2.

In Step 7, the value $\omega$ that maximizes the value of $T(\omega)$ is obtained as an optimum value $\omega$s.

EXPERIMENT EXAMPLE 8

Figure 38:
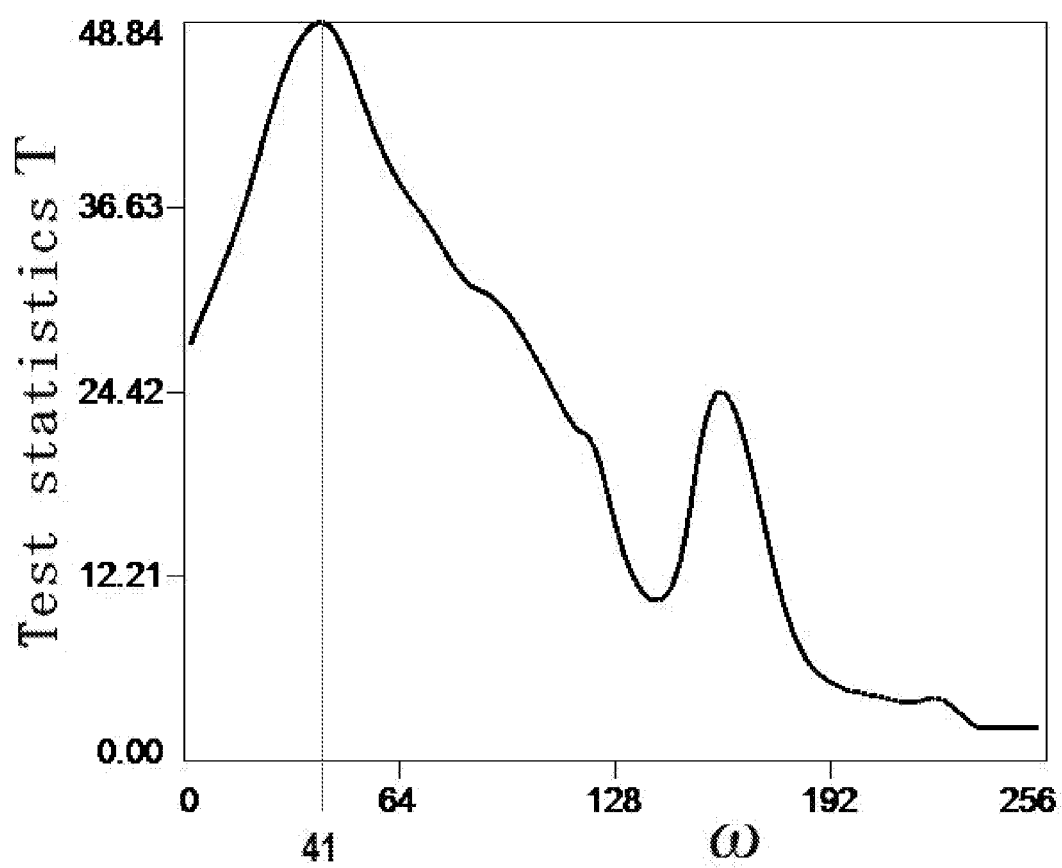
FIG. 38 is a graph showing a calculation result of a test statistic T by Experiment Example 8.

Next, results of experiment for obtaining the optimum value of $\omega$ will be described. Specifically, the experiment was conducted following the processing procedures shown in FIG. 37, in which 10 normal standard sounds (belonging to category 1) were recorded by repeatedly hitting the same spot of a normal concrete structure, 10 abnormal standard sounds (belonging to category 2) were recorded by repeatedly hitting the same spot of an abnormal concrete structure, and then the optimum value of $\omega$ was obtained by using these 20 standard sounds. Here, a power spectrum of the standard sounds was created by setting the number of the bars shown in FIG. 3 to m=257. In the case of this experiment, when considered as in FIG. 35, 10×10=100 values are calculated as the skewness geometric distances dA between the standard sounds of the different categories, and $2 \times {}_{10}C_2 = 2 \times 10 \times 9/2 = 90$ values are calculated as the skewness geometric distances dA between the standard sounds of the same category. Then, using the same way as in equation 39, the mean and sample variance of the skewness geometric distances between the standard sounds of the different categories and those of skewness geometric distances between the standard sounds of the same category were obtained, and Welch's test statistic $T(\omega)$ was calculated. FIG. 38 shows the result of calculating the value of objective function $T(\omega)$ while increasing the value $\omega$ shown in FIGS. 34(c) to 34(f) from 3 to 255 with an increment of 2. From FIG. 38, we can find that the value of $T(\omega)$ reaches its maximum when $\omega$=41. Therefore, the optimum value is set to $\omega$s=41 and the optimum skewness-weighting curve is created using this value.

Note that, instead of Welch's test statistic $T(\omega)$, a recognition rate $R(\omega)$ maybe used as the objective function. In this case, for example, the N1 standard sounds (normal sounds) belonging to category 1 and the N2 standard sounds (abnormal sounds) belonging to category 2 are recorded in advance, and skewness geometric distances dA between one input sound (normal sound) different from those standard sounds and the above (N1+N2) standard sounds are calculated. Then, when the standard sound corresponding to the minimum value among the (N1+N2) skewness geometric distances dA thus obtained belongs to category 1, the input sound is judged to belong to category 1 (to be a normal sound). On the other hand, when the standard sound corresponding to the minimum value belongs to category 2, the input sound is judged to belong to category 2 (to be an abnormal sound). Similarly, skewness geometric distances dA between another input sound (abnormal sound) different from the above and the above (N1+N2) standard sounds are calculated. Then, when the standard sound corresponding to the minimum value among the (N1+N2) skewness geometric distances dA thus obtained belongs to category 1, the input sound is judged to belong to category 1 (to be a normal sound). On the other hand, when the standard sound corresponding to the minimum value belongs to category 2, the input sound is judged to belong to category 2 (to be an abnormal sound). Similarly, the above recognition experiment is conducted using a number of input sounds (normal sounds and abnormal sounds), and the recognition rate R(ω) is calculated using a percentage at which the input sounds (normal sounds and abnormal sounds) are judged correctly. In this case, the value of the objective function R(ω) is calculated by increasing the value ω from 3 to 255 with an increment of 2. Thus, the value ω that maximizes the value of R(ω) is obtained as the optimum value ωs.

In the present invention, a normal distribution having the optimum value ωs thus obtained is created, a reference pattern vector having component values representing the above normal distribution is created, and a skewness-weighting vector having a value of a change rate of "skewness" of the above reference pattern vector as a component is created. Next, a skewness-weighted standard pattern vector is created by product-sum operation using the component value of the skewness-weighting vector and the component value of the original standard pattern vector. Similarly, a skewness-weighted input pattern vector is created by product-sum operation using the component value of the same skewness-weighting vector and the component value of the original input pattern vector. Then, an angle between the skewness-weighted standard pattern vector and the skewness-weighted input pattern vector is calculated, and the degree of similarity between the original standard pattern vector and the original input pattern vector is detected as a skewness geometric distance value.

{Optimizing Variance of Normal Distribution in Prior Art}

In the prior art (the gazette of Japanese Patent No. 3422787), the reference pattern vector whose component values are normally distributed is created as shown in FIG. 27(*a*), and the kurtosis-weighting vector having a value of a change rate of kurtosis of the above reference pattern vector as a component is created as shown in FIG. 27(*b*). Next, a kurtosis-weighted standard pattern vector is created by product-sum operation using the component value of kurtosis-weighting vector and the component value of the original standard pattern vector. Similarly, a kurtosis-weighted input pattern vector is created by product-sum operation using the component value of the same kurtosis-weighting vector and the component value of the original input pattern vector. Then, an angle between the kurtosis-weighted standard pattern vector and the kurtosis-weighted input pattern vector is calculated, and the degree of similarity between the original standard pattern vector and the original input pattern vector can be detected as a kurtosis geometric distance value.

Next, as for the kurtosis geometric distance according to the prior art (the gazette of Japanese Patent No. 3422787), the influence of the value of variance of the normal distribution on the similarity detection accuracy will be described. However, here, consideration will be made for the limited case where a difference in shapes between the standard and input patterns is small, as in the case of the description of FIGS. 53 to 55, and a method for replacing the difference in shapes between the standard and input patterns by the shape change in one reference pattern vector.

Figure 39:
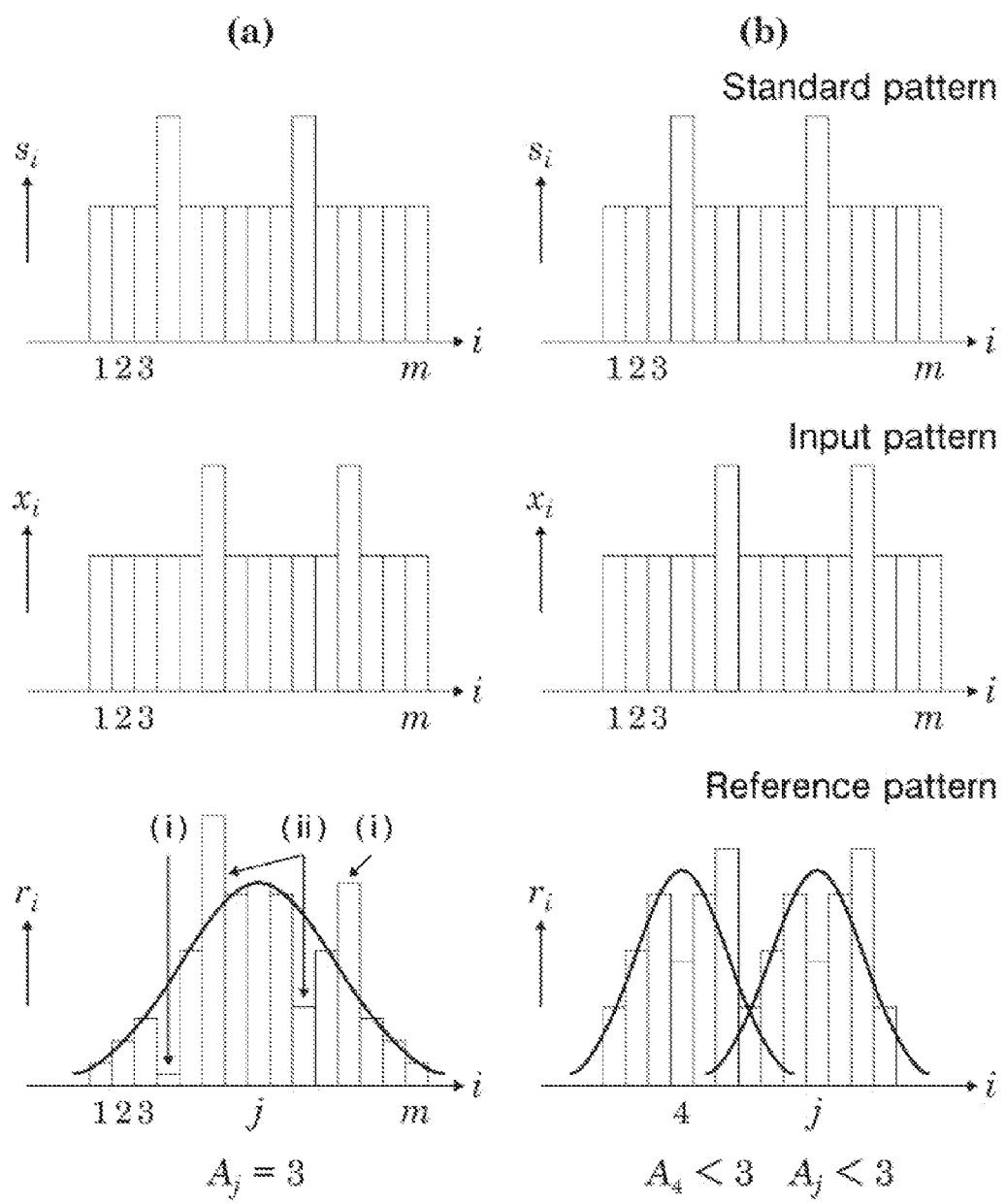
FIG. 39 is a set of graphs showing the influence of a value of variance of a normal distribution on the accuracy of detecting a similarity between kurtosis geometric distances.

The upper and middle diagrams of FIGS. 39(*a*) and 39(*b*) show a typical example exhibiting shapes of the standard and input patterns having two peaks, respectively. Also, the bottom diagrams of FIGS. 39(*a*) and 39(*b*) show an example where a difference in shapes between the standard and input patterns is replaced by the shape change in the reference pattern having the normal distribution as its initial shape. Note that the standard patterns shown in FIGS. 39(*a*) and 39(*b*) have the same shape, and the input patterns shown in FIGS. 39(*a*) and 39(*b*) have the same shape. Also, note that the peaks of the standard and input patterns shown in FIGS. 39(*a*) and 39(*b*) are assumed to have the same height, and the area of each standard pattern and each input pattern is equal to 1. The positions of the second peaks of the standard and input patterns shown in FIG. 39 are different from those shown in FIG. 33, therefore, the positions of the decreased and increased component values of the reference patterns shown in FIG. 39 are different from those shown in FIG. 33.

The bottom diagram of FIG. 39(*a*) shows a typical example of the reference pattern that has been created from a normal distribution having a large variance value. Because the positions of two bars (i) in the figure are symmetrical about the center axis of the normal distribution, the effect of a decrease and an increase is cancelled out concerning the kurtosis Aj. Similarly, the effect of a decrease and an increase of two bars (ii) in the figure is cancelled out. As a result, the kurtosis becomes Aj=3. Therefore, in this case, we cannot detect the difference between peaks of the standard and input patterns by using the value of the kurtosis Aj.

The bottom diagram of FIG. 39(*b*) shows a typical example of the two reference patterns that have been created from a normal distribution having a small variance value. In FIG. 39(*b*), the kurtosis becomes A4<3 and Aj<3. Therefore, in this case, we can detect the difference between peaks of the standard and input patterns by using the kurtosis values A4 and Aj.

Figure 40:
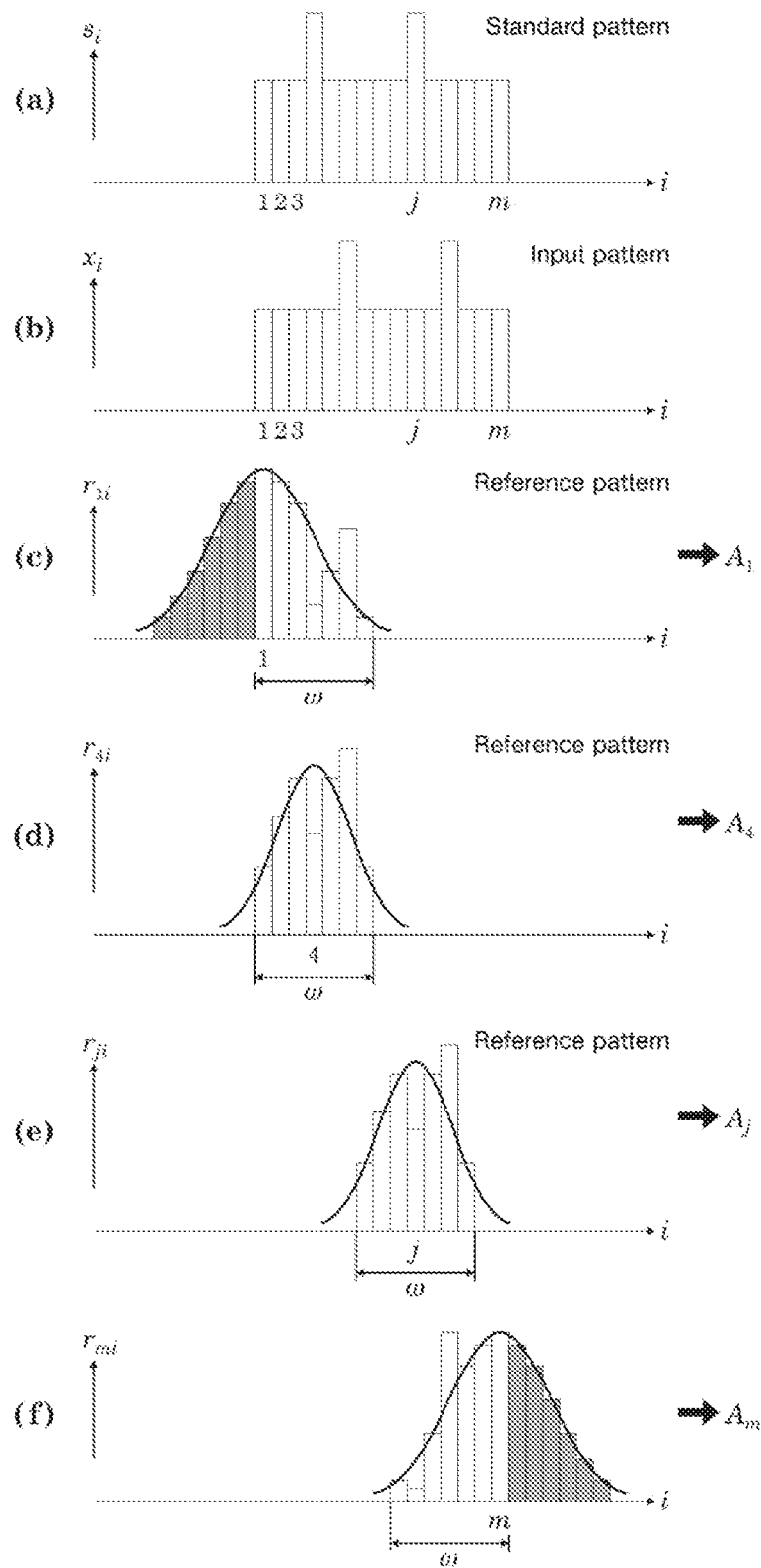
FIG. 40 is a set of graphs showing an example of a shape change in a reference pattern vector when the center axis of a normal distribution is moved.

If we use the normal distribution having the small variance value as shown in the bottom diagram of FIG. 39(*b*), then we need to use several reference patterns so that they may cover the entire standard and input patterns. Therefore, as shown in FIG. 40, we determine the variable of kurtosis Aj for each j while moving the center axis of the normal distribution to each component position j (j=1, 2, . . . , m) of the standard and input patterns. We calculate a square root of a sum of a square of each variable of kurtosis Aj (j=1, 2, . . . , m), and we define it as the "Kurtosis geometric distance d" between the standard and input patterns. From the typical examples of FIGS. 39(*a*) and 39(*b*), it is understood that the accuracy of the similarity detection is changed as the variance value of the normal distribution is changed.

The description has been given of the influence of the value of variance of the normal distribution on the similarity detection accuracy in the calculation of the kurtosis geometric distance. Next, a method for obtaining an optimum value of variance of the normal distribution will be described.

In inspection by hitting a concrete structure using a hammer, generally, a power spectrum changes subtly with each hit even at the same spot of the same structure. Therefore, a method is usually adopted wherein more than one normal standard sound is registered by repeatedly hitting the same spot of a normal structure and more than one abnormal standard sound is registered by repeatedly hitting the same spot of an abnormal structure. Moreover, in voice recognition, a power spectrum changes subtly with each utterance of the same voice. Therefore, a method is usually adopted wherein a number of persons repeatedly produce the same voice and more than one standard sound is registered for each voice. Note that, the prior art (the gazette of Japanese Patent No. 3422787) discloses the method for calculating the kurtosis geometric distance value dA between the standard and input sounds. Alternatively, we can replace the input sound by the standard sound and, using the same method, calculate a kurtosis geometric distance value dA between two standard sounds.

For example, assuming that a group of normal standard sounds is category 1, the upper diagrams of FIG. 35 show two examples of a power spectrum of a normal sound, which are set as standard sounds 1 and 2 belonging to category 1, respectively. Also, assuming that a group of abnormal standard sounds is category 2, the lower diagrams of FIG. 35 show two examples of a power spectrum of an abnormal sound, which are set as standard sounds 3 and 4 belonging to category 2, respectively. Note that, in FIG. 35, kurtosis geometric distances between the standard sounds are schematically depicted respectively as dA(1-2), dA(3-4), dA(1-3), dA(1-4), dA(2-3) and dA(2-4). dA(1-2) indicated by the solid arrow denotes the kurtosis geometric distance between the normal standard sounds 1 and 2 belonging to the same category. dA(3-4) indicated by the solid arrow denotes the kurtosis geometric distance between the abnormal standard sounds 3 and 4 belonging to the same category. dA(1-3) and dA(1-4) indicated by the dashed arrows denote the kurtosis geometric distances between the normal standard sound 1 and the abnormal standard sounds 3 and 4 belonging to the different categories. dA(2-3) and dA(2-4) indicated by the dashed arrows denote the kurtosis geometric distances between the normal standard sound 2 and the abnormal standard sounds 3 and 4 belonging to the different categories.

Here, if the distance between the standard sounds of the same category is shortened, and simultaneously, the distance between the standard sounds of the different categories is elongated, then, as a result, separation property of the standard sounds of the same category and the standard sounds of the different categories is improved, and thus recognition performance when an input sound is given is improved.

Next, a state of separation of the standard sounds of the same category from the standard sounds of the different categories is checked while changing the value of variance of the normal distribution. Here, we change the value of variance of the normal distribution by changing the value ω shown in FIGS. 40(c) to 40(f). In the reference patterns shown in FIGS. 40(c) to 40(f), the white bars correspond to the component numbers i of the input pattern and, therefore, their values change in response to the "wobble" of the input pattern. However, the gray bars do not correspond to the component numbers i and their values do not change. Here, the number of white bars in the bar graph of each reference pattern is set to the same value ω so that the sensitivity to the "wobble" in the reference patterns may be equated regardless of the position of the normal distribution. In FIGS. 40(c) to 40(f), for an example, each reference pattern includes seven white bars (ω=7). Note that "ω" shown in FIG. 29 corresponds to "ω" shown in FIGS. 40(c) to 40(f).

To be more specific, in order to check changes in the values of the kurtosis geometric distances dA(1-2), dA(3-4), dA(1-3), dA(1-4), dA(2-3) and dA(2-4) between the standard sounds shown in FIG. 35 while changing the value ω shown in FIGS. 40(c) to 40(f), a value $(d^-1 - d^-2)$ of a difference in mean is obtained by subtracting a kurtosis geometric distance mean $d^-2$ between the standard sounds of the same category from a kurtosis geometric distance mean $d^-1$ between the standard sounds of the different categories, as shown in equation 39. Next, we obtain the square root of the sum $((s_1^2/N_1)+(s_2^2/N_2))$ of a value $(s_1^2/N_1)$ obtained by dividing a sample variance $s_1^2$ of the kurtosis geometric distance between the standard sounds of the different categories by the sample size $N_1$ and a value $(s_2^2/N_2)$ obtained by dividing a sample variance $s_2^2$ of the kurtosis geometric distance between the standard sounds of the same category by the sample size $N_2$. Then, a Welch's test statistic $T(\omega)$ is calculated as a value of an objective function by dividing the above value of the difference in mean by the above square root.

FIG. 36 is a schematic diagram showing a frequency distribution of the distance values between the standard sounds of the different categories and a frequency distribution of the distance values between the standard sounds of the same category, which are drawn by using the respective means $d^-1$ and $d^-2$ and the respective sample standard deviations $s_1$ and $s_2$. From FIG. 36, we can find that, when $T(\omega)$ reaches its maximum as the value of the numerator of $T(\omega)$ shown in equation 39 increases and, simultaneously, the value of the denominator decreases, the distance between the standard sounds of the same category is shortened and, simultaneously, the distance between the standard sounds of the different categories is elongated. Therefore, the kurtosis-weighting curve is optimized, which is created based on the value ω that maximizes the value of $T(\omega)$. A generalized expression of the above discussion is as follows. Specifically, the problem of obtaining an optimum kurtosis-weighting curve boils down to the optimization problem of obtaining the value of the variable ω that maximizes the objective function when $T(\omega)$ is the objective function.

Figure 41:
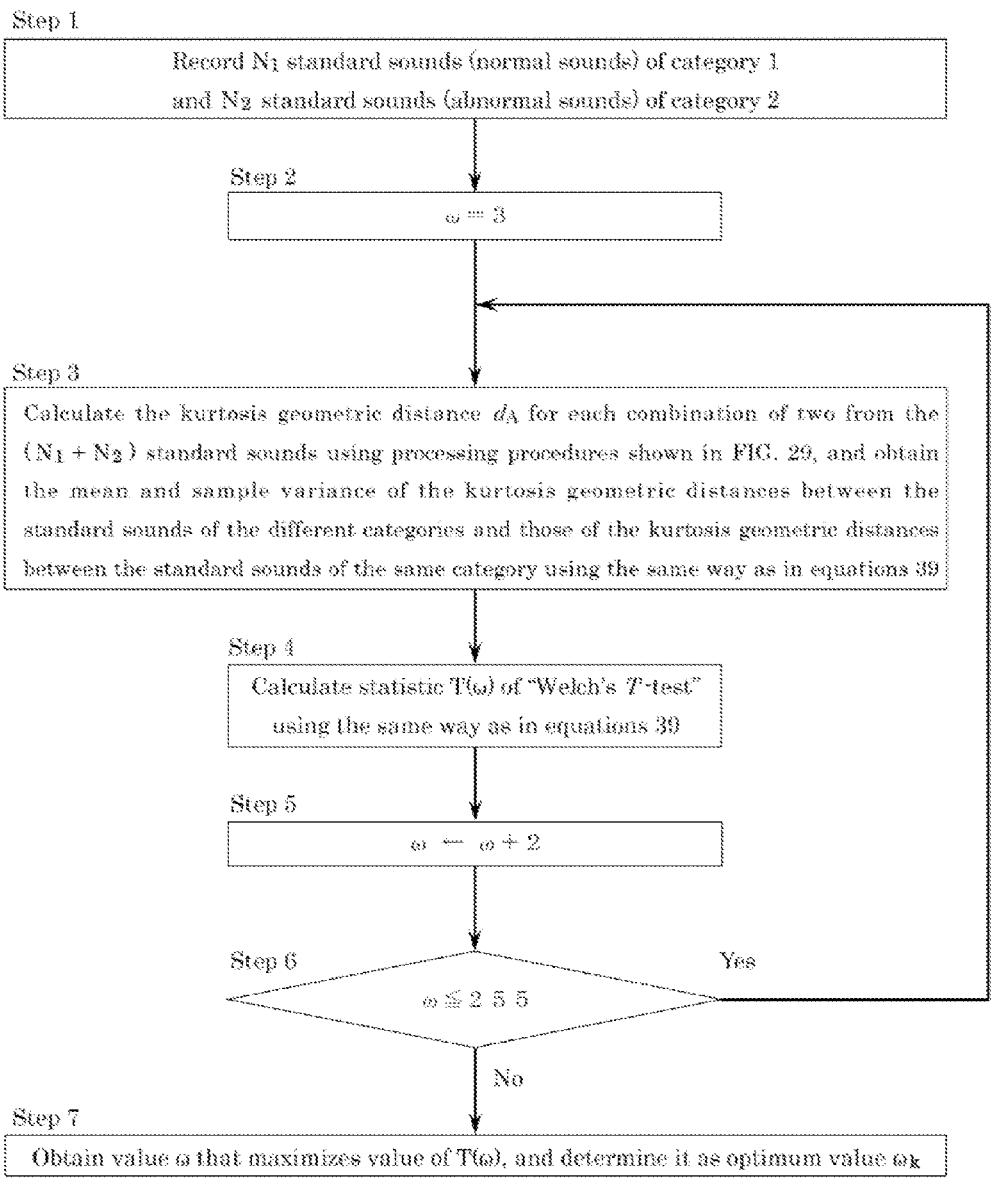
FIG. 41 is a diagram showing processing procedures for obtaining an optimum value ωk.

FIG. 41 shows processing procedures for obtaining an optimum value of ω by use of N1 standard sounds (normal sounds) belonging to category 1 and N2 standard sounds (abnormal sounds) belonging to category 2. Note that N1≥2 and N2≥2. Also, the number of bars m shown in FIG. 3 is set to 257, and power spectra of the standard sounds are created. In FIG. 41, an optimum value is obtained by running the value ω from 3 to 255.

In Step 1 of FIG. 41, (N1+N2) power spectra are created by recording the N1 standard sounds (normal sounds) of category 1 and the N2 standard sounds (abnormal sounds) of category 2.

In Step 2, ω=3 is set as an initial value.

In Step 3, the kurtosis geometric distance dA for each combination of two from the (N1+N2) standard sounds is calculated using the processing procedures shown in FIG. 29, and the mean and sample variance of the kurtosis geometric distances between the standard sounds of the different categories and those of kurtosis geometric distances between the standard sounds of the same category are obtained using the same way as in equation 39.

In Step 4, Welch's test statistic $T(\omega)$ is calculated using the same way as in equation 39.

In Steps 5 and 6, the processing of Steps 3 and 4 is repeated while increasing the value $\omega$ to 255 with an increment of 2.

In Step 7, the value $\omega$ that maximizes the value of $T(\omega)$ is obtained as an optimum value $\omega k$.

Note that the kurtosis-weighting curve is an even function and the skewness-weighting curve is an odd function. Therefore, as for the kurtosis-weighting vector in the prior art (the gazette of Japanese Patent No. 3422787), a kurtosis-weighted standard pattern vector and a kurtosis-weighted input pattern vector are created by using equation 38 instead of equation 37.

EXPERIMENT EXAMPLE 9

Figure 42:
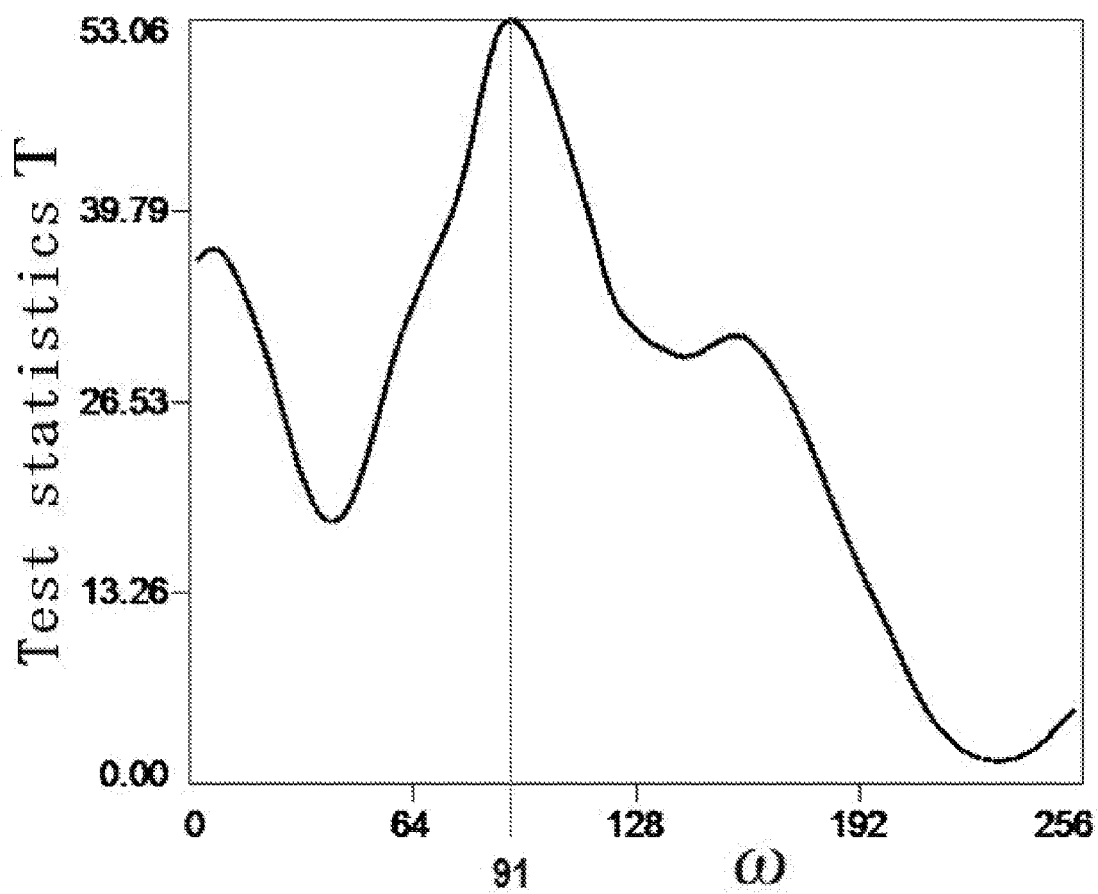
FIG. 42 is a graph showing a calculation result of a test statistic T by Experiment Example 9.

Next, results of experiment for obtaining the optimum value of $\omega$ will be described. Specifically, the experiment was conducted following the processing procedures shown in FIG. 41, in which 10 normal standard sounds (belonging to category 1) were recorded by repeatedly hitting the same spot of a normal concrete structure, 10 abnormal standard sounds (belonging to category 2) were recorded by repeatedly hitting the same spot of an abnormal concrete structure, and then the optimum value of $\omega$ was obtained by using these 20 standard sounds. Here, a power spectrum of the standard sounds was created by setting the number of the bars shown in FIG. 3 to m=257. Note that these 20 standard sounds are identical to the 20 standard sounds used in Experiment Example 8. In the case of this experiment, when considered as in FIG. 35, $10 \times 10 = 100$ values are calculated as the kurtosis geometric distances dA between the standard sounds of the different categories, and $2 \times {}_{10}C_2 = 2 \times 10 \times 9/2 = 90$ values are calculated as the kurtosis geometric distances dA between the standard sounds of the same category. Then, using the same way as in equation 39, the mean and sample variance of the kurtosis geometric distances between the standard sounds of the different categories and those of kurtosis geometric distances between the standard sounds of the same category were obtained, and Welch's test statistic $T(\omega)$ was calculated. FIG. 42 shows the result of calculating the value of objective function $T(\omega)$ while increasing the value co shown in FIGS. 40(c) to 40(f) from 3 to 255 with an increment of 2. From FIG. 42, we can find that the value of $T(\omega)$ reaches its maximum when $\omega = 91$. Therefore, the optimum value is set to $\omega k = 91$ and the optimum kurtosis-weighting curve is created using this value.

Note that, instead of Welch's test statistic $T(\omega)$, a recognition rate $R(\omega)$ maybe used as the objective function. In this case, for example, the N1 standard sounds (normal sounds) belonging to category 1 and the N2 standard sounds (abnormal sounds) belonging to category 2 are recorded in advance, and kurtosis geometric distances dA between one input sound (normal sound) different from those standard sounds and the above (N1+N2) standard sounds are calculated. Then, when the standard sound corresponding to the minimum value among the (N1+N2) kurtosis geometric distances dA thus obtained belongs to category 1, the input sound is judged to belong to category 1 (to be a normal sound). On the other hand, when the standard sound corresponding to the minimum value belongs to category 2, the input sound is judged to belong to category 2 (to be an abnormal sound). Similarly, kurtosis geometric distances dA between another input sound (abnormal sound) different from the above and the above (N1+N2) standard sounds are calculated. Then, when the standard sound corresponding to the minimum value among the (N1+N2) kurtosis geometric distances dA thus obtained belongs to category 1, the input sound is judged to belong to category 1 (to be a normal sound). On the other hand, when the standard sound corresponding to the minimum value belongs to category 2, the input sound is judged to belong to category 2 (to be an abnormal sound). Similarly, the above recognition experiment is conducted using a number of input sounds (normal sounds and abnormal sounds), and the recognition rate $R(\omega)$ is calculated using a percentage at which the input sounds (normal sounds and abnormal sounds) are judged correctly. In this case, the value of the objective function $R(\omega)$ is calculated by increasing the value $\omega$ from 3 to 255 with an increment of 2. Thus, the value $\omega$ that maximizes the value of $R(\omega)$ is obtained as the optimum value $\omega k$.

In the prior art (the gazette of Japanese Patent No. 3422787), a normal distribution having the optimum value $\omega k$ thus obtained is created, a reference pattern vector having component values representing the above normal distribution is created, and a kurtosis-weighting vector having a value of a change rate of "kurtosis" of the above reference pattern vector as a component is created. Next, a kurtosis-weighted standard pattern vector is created by product-sum operation using the component value of the kurtosis-weighting vector and the component value of the original standard pattern vector. Similarly, a kurtosis-weighted input pattern vector is created by product-sum operation using the component value of the same kurtosis-weighting vector and the component value of the original input pattern vector. Then, an angle between the kurtosis-weighted standard pattern vector and the kurtosis-weighted input pattern vector is calculated, and the degree of similarity between the original standard pattern vector and the original input pattern vector is detected as a kurtosis geometric distance value.

{Combining Optimum Skewness-Weighted Standard and Input Pattern Vectors and Optimum Kurtosis-Weighted Standard and Input Pattern Vectors}

Therefore, by use of the method of the present invention, optimum skewness-weighted standard and input pattern vectors (equation 30) are created by product-sum operation using the component value of skewness-weighting vector (equation 36) having the optimum value $\omega s$ and the component value of the original standard and input pattern vectors (equation 2). Similarly, by use of the method of the prior art (the gazette of Japanese Patent No. 3422'87), optimum kurtosis-weighted standard and input pattern vectors (equation 30) can be created by product-sum operation using the component value of the kurtosis-weighting vector (equation 36) having the optimum value $\omega k$ and the component values of the original standard and input pattern vectors (equation 2).

Next, as shown in the first and second equations in the following equation 40, normalized component values sogd (j) and xogd(j) are calculated by dividing the component value sog(j) (j=1, 2, . . . , m) of the skewness-weighted standard-pattern vector sog created using the optimum value us and the component value xog(j) (j=1, 2, . . . , m) of the skewness-weighted input pattern vector xog created using the same optimum value $\omega s$ by the magnitudes of the respective vectors. Similarly, as shown in the third and fourth equations in equation 40, normalized component values sogd (m+j) and xogd (m+j) are calculated by dividing the component value sog(j) (j=1, 2, . . . , m) of the kurtosis-weighted standard pattern vector sog created using the optimum value $\omega k$ and the component value xog(j) (j=1, 2, . . . , m) of the kurtosis-weighted input pattern vector xog created using the same optimum value $\omega k$ by the magnitudes of the respective vectors.

When the skewness-weighted standard pattern vector $s_{og}$ is created using the optimum value $\omega_s$, and the skewness-weighted input pattern vector $x_{og}$ is created using the optimum value $\omega_s$, $s_{ogd(j)}$ and $x_{ogd(j)}$ are determined as follows:

$$s_{ogd(j)} = s_{og(j)}/|s_{og}|$$

$$x_{ogd(j)} = x_{og(j)}/|x_{og}|$$

(j=1, 2, 3, . . . , m)

When the kurtosis-weighted standard pattern vector $s_{og}$ is created using the optimum value $\omega_k$, and the kurtosis-weighted input pattern vector $x_{og}$ is created using the optimum value $\omega_k$, $s_{ogd(m+j)}$ and $x_{ogd(m+j)}$ are determined as follows:

$$s_{ogd(m+j)} = s_{og(j)}/|s_{og}|$$

$$x_{ogd(m+j)} = x_{og(j)}/|x_{og}| \quad \{\text{Equation 40}\}$$

(j=1, 2, 3, . . . , m)

Then, a dual and weighted standard pattern vector sogd having sogd(j) and sogd(m+j) as components and a dual and weighted input pattern vector xogd having xogd(j) and xogd(m+j) as components are created and represented as the following equation 41.

$$s_{ogd} = (s_{ogd(1)}, s_{ogd(2)}, \ldots, s_{ogd(m)}, s_{ogd(m+1)}, \ldots, s_{ogd(m+j)}, \ldots, s_{ogd(m+m)})$$

$$x_{ogd} = (x_{ogd(1)}, x_{ogd(2)}, \ldots, x_{ogd(m)}, x_{ogd(m+1)}, \ldots, x_{ogd(m+j)}, \ldots, x_{ogd(m+m)}) \quad \{\text{Equation 41}\}$$

(j=1, 2, 3, . . . , m)

In equation 41, the first to m-th component values of the dual and weighted standard pattern vector sogd are equal to the first to m-th normalized component values of the skewness-weighted standard pattern vector created using the optimum value ωs, respectively. Also, the (m+1)-th to (m+m)-th component values of the same vector sogd are equal to the first to m-th normalized component values of the kurtosis-weighted standard pattern vector created using the optimum value ωk, respectively. Similarly, the first to m-th component values of the dual and weighted input pattern vector xogd are equal to the first to m-th normalized component values of the skewness-weighted input pattern vector created using the optimum value ωs, respectively. Also, the (m+1)-th to (m+m)-th component values of the same vector xogd are equal to the first to m-th normalized component values of the kurtosis-weighted input pattern vector created using the optimum value ωk, respectively.

Namely, the dual and weighted standard pattern vector is a composite vector created by combining the skewness-weighted standard pattern vector and the kurtosis-weighted standard pattern vector, which are obtained by normalization. Similarly, the dual and weighted input pattern vector is a composite vector created by combining the skewness-weighted input pattern vector and the kurtosis-weighted input pattern vector, which are obtained by normalization. Therefore, the dual and weighted standard/input pattern vectors each have (m+m) pieces of component values.

Figure 43:
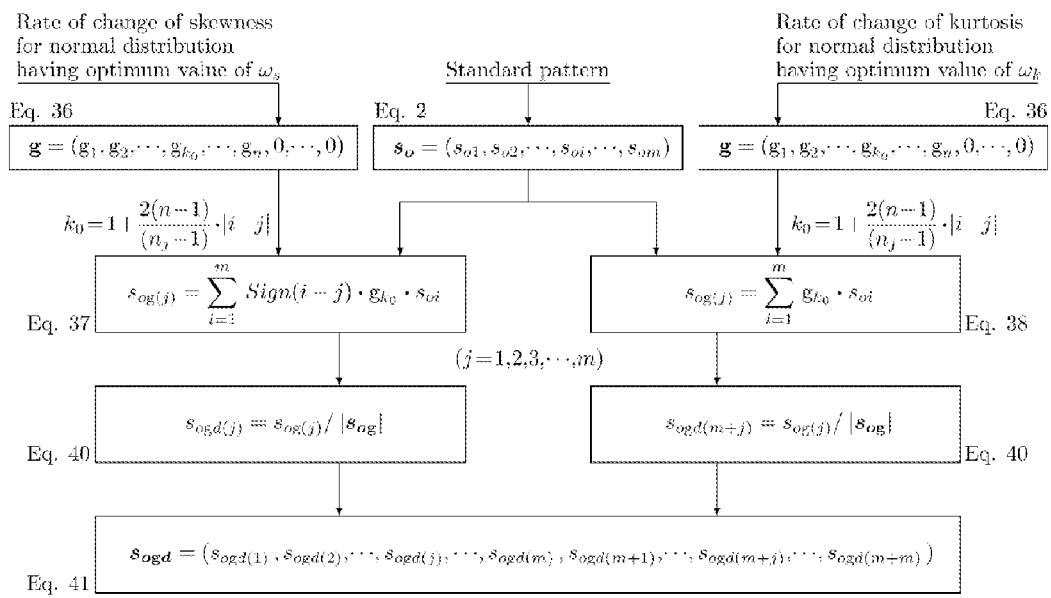
FIG. 43 is a diagram showing a calculation flowchart for creating a dual and weighted standard pattern vector.

FIG. 43 shows a calculation flowchart for creating the dual and weighted standard pattern vector. Note that the numbers in the figure are the equation numbers. From FIG. 43, we can find that the dual and weighted standard pattern vector sogd is created by combining: the skewness-weighted standard pattern vector sog, which is calculated by product-sum operation using the original standard pattern vector so and the skewness-weighting vector g having as a component a value of a change rate of skewness of the normal distribution having the optimum value ωs; and the kurtosis-weighted standard pattern vector sog, which is calculated by product-sum operation using the original standard pattern vector so and the kurtosis-weighting vector g having as a component a value of a change rate of kurtosis of the normal distribution having the optimum value ωk, where the skewness-weighted standard pattern vector sog and the kurtosis-weighted standard pattern vector sog are normalized through division by the magnitudes of the respective vectors.

Figure 44:
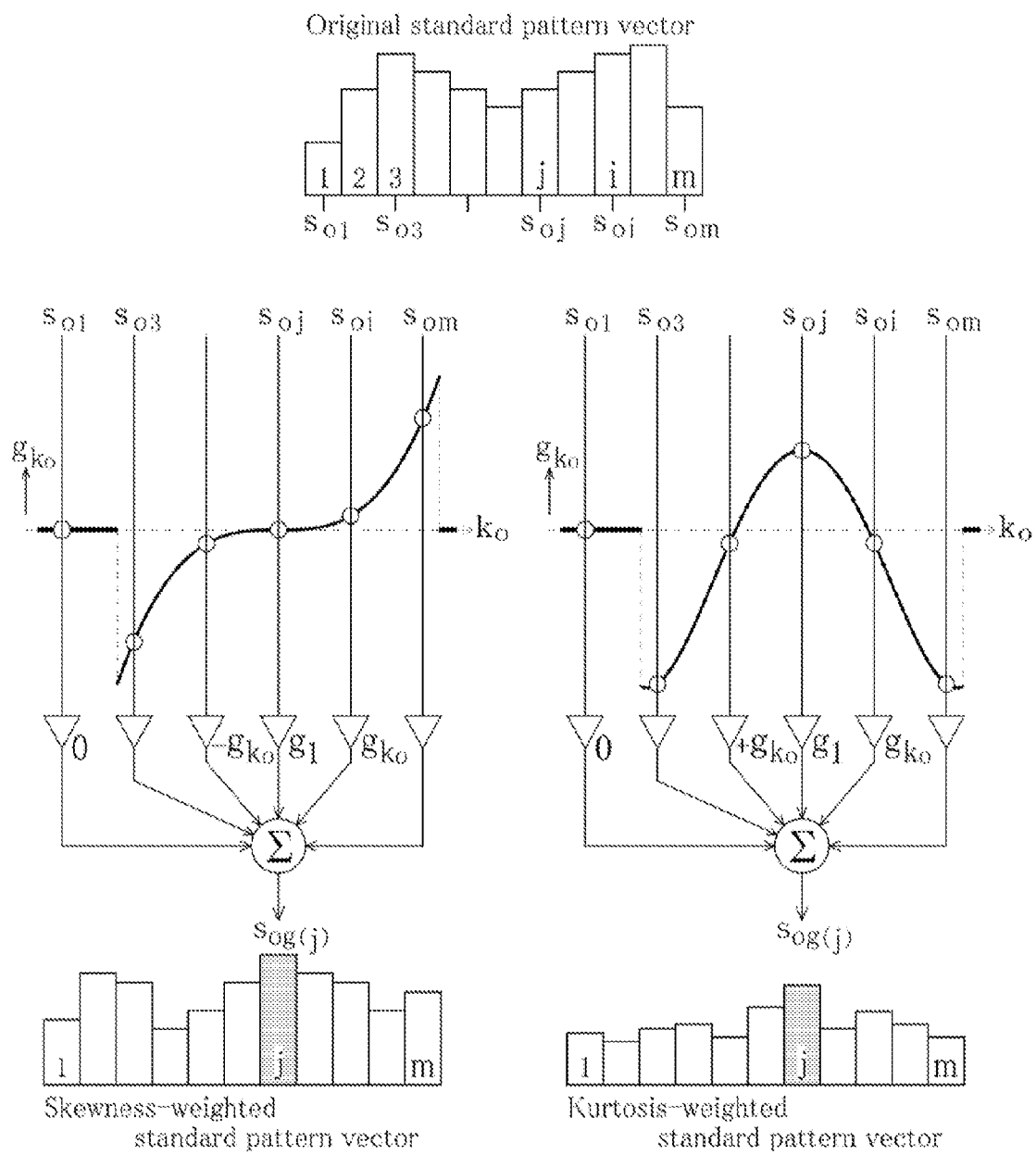
FIG. 44 is a diagram showing a method for creating a skewness-weighted standard pattern vector and a kurtosis-weighted standard pattern vector by product-sum operation.

Moreover, FIG. 44 shows the flow of product-sum operations given by equations 37 and 38. Note that the curve on the left side of the figure is the skewness-weighting curve shown in FIG. 22(c), and the curve on the right side of the figure is the kurtosis-weighting curve shown in FIG. 28(c). Symbol ∇ (inverse triangle) is a multiplier and symbol Σ (summation codes) is an adder. On the left side of FIG. 44, by using multiplier ∇, we calculate the product Sign (i−j)·gk0·soi using the component value Sign (i−j)·gk0 of skewness-weighting vector and the component value soi of original standard pattern vector. By using adder Σ, we calculate the product-sum by addition of the product Sign (i−j)·gk0·soi for i (i=1, 2, . . . , m), and use it as the component value sog (j) of skewness-weighted standard pattern vector. Similarly, on the right side of FIG. 44, we calculate the kurtosis-weighted standard pattern vector by the product-sum operation using the kurtosis-weighting vector and the original standard pattern vector. From FIG. 44, it is discovered that the component value sog (j) of the skewness-weighted standard pattern vector and the component value sog (j) of the kurtosis-weighted standard pattern vector are calculated from soi by weighting using the skewness-weighting curve and the kurtosis-weighting curve.

Figure 45:
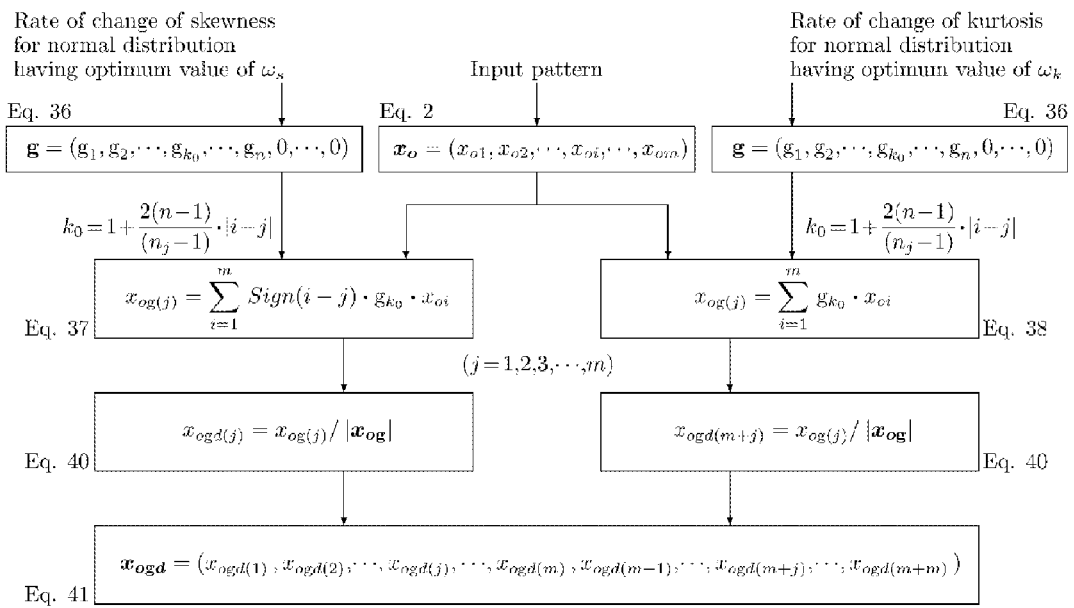
FIG. 45 is a diagram showing a calculation flowchart for creating a dual and weighted input pattern vector.

FIG. 45 shows a calculation flowchart for creating the dual and weighted input pattern vector. Note that the numbers in the figure are the equation numbers. From FIG. 45, we can find that the dual and weighted input pattern vector xogd is created by combining: the skewness-weighted input pattern vector xog, which is calculated by product-sum operation using the original input pattern vector xo and the skewness-weighting vector g having as a component a value of a change rate of skewness oof the normal distribution having the optimum value ωs; and the kurtosis-weighted input pattern vector xog, which is calculated by product-sum operation using the original input pattern vector xo and the kurtosis-weighting vector g having as a component a value of a change rate of kurtosis of the normal distribution having the optimum value ωk, where the skewness-weighted input pattern vector xog and the kurtosis-weighted input pattern vector xog are normalized through division by the magnitudes of the respective vectors.

Figure 46:
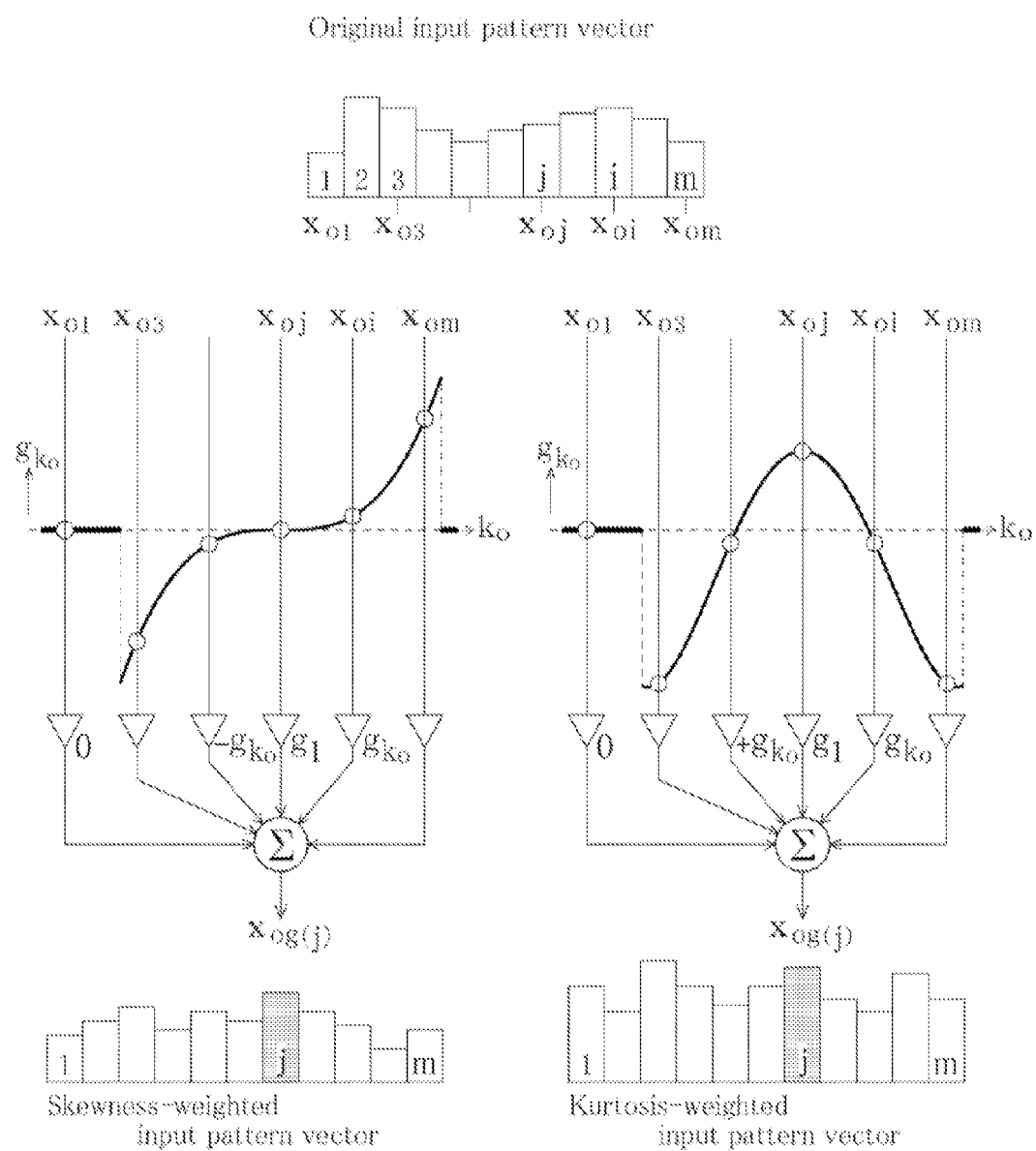
FIG. 46 is a diagram showing a method for creating a skewness-weighted input pattern vector and a kurtosis-weighted input pattern vector by product-sum operation.

Moreover, FIG. 46 shows the flow of product-sum operations given by equations 37 and 38. Note that the curve on the left side of the figure is the skewness-weighting curve shown in FIG. 22(c), and the curve on the right side of the figure is the kurtosis-weighting curve shown in FIG. 28(c). Symbol ∇ (inverse triangle) is a multiplier and symbol Σ (summation codes) is an adder. On the left side of FIG. 46, by using multiplier ∇, we calculate the product Sign(i−j)·gk0·xoi using the component value Sign(i−j)·gk0of skewness-weighting vector and the component value xoi of original input pattern vector. By using adder Σ, we calculate the product-sum by addition of the product Sign(i−j)·gk0·xoi for i (i=1, 2, . . . , m), and use it as the component value xog(j) of skewness-weighted input pattern vector. Similarly, on the right side of FIG. 46, we calculate the kurtosis-weighted input pattern vector by the product-sum operation using the kurtosis-weighting vector and the original input pattern vector. From FIG. 46, it is discovered that the component value xog(j) of the skewness-weighted input pattern vector and the component value xog(j) of the kurtosis-weighted input pattern vector are calculated from xoi by weighting using the skewness-weighting curve and the kurtosis-weighting curve.

{Selecting Component Positions of Standard and Input Patterns that Improve Similarity Detection Accuracy}

In the prior arts, as described above referring to FIGS. 53 to 55 and TABLE 1, with regard to the relative positional relationship between the reference pattern and the standard and input patterns during the moving of the center axis of the reference pattern, the component positions of the standard and input patterns that improve similarity detection accuracy are not distinguished from those that lower the similarity detection accuracy. Next, a method for solving this problem will be described. First, a selecting vector (binary vector) b having 0 or 1 as a component is created and represented as the following equation 42. Note that the number of components of the selecting vector b is equal to the number (m+m) of components of the dual and weighted standard/input pattern vectors shown in equation 41.

$$b = (b_{(1)}, b_{(2)}, \ldots, b_{(j)}, \ldots, b_{(m)}, b_{(m+1)}, \ldots, b_{(m+j)}, \ldots, b_{(m+m)}) \quad \{\text{Equation 42}\}$$

$$(j=1, 2, 3, \ldots, m)$$

Further, as shown in the following equation 43, a value of the product of a component value b(j) having the component number j (j=1, 2, . . . , m+m) of the above selecting vector b and a component value sogd(j) having the same component number j of the above dual and weighted standard pattern vector sogd is calculated as sogb(j). Similarly, a value of the product of the component value b(j) having the component number j (j=1, 2, . . . , m+m) of the above selecting vector b and a component value xogd(j) having the same component number j of the above dual and weighted input pattern vector xogd is calculated as xogb(j).

$$s_{ogb(j)} = b_{(j)} \cdot s_{ogd(j)}$$

$$x_{ogb(j)} = b_{(j)} \cdot x_{ogd(j)} \quad \{\text{Equation 43}\}$$

$$(j=1, 2, 3, \ldots, m, m+1, \ldots, m+m)$$

Then, a dual and selected standard pattern vector sogb having sogb(j) (j=1, 2, . . . , m+m) as a component and a dual and selected input pattern vector xogb having xogb(j) (j=1, 2, . . . , m+m) as a component are created and represented as the following equation 44.

$$s_{ogb} = (s_{ogb(1)}, s_{ogb(2)}, \ldots, s_{ogb(j)}, \ldots, s_{ogb(m)}, s_{ogb(m+1)}, \ldots, s_{ogb(m+j)}, \ldots, s_{ogb(m+m)})$$

$$x_{ogb} = (x_{ogb(1)}, x_{ogb(2)}, \ldots, x_{ogb(j)}, \ldots, x_{ogb(m)}, x_{ogb(m+1)}, \ldots, x_{ogb(m+j)}, \ldots, x_{ogb(m+m)}) \quad \{\text{Equation 44}\}$$

$$(j=1, 2, 3, \ldots, m)$$

Lastly, an angle between the above dual and selected standard pattern vector sogb and the above dual and selected input pattern vector xogb is calculated by the following equation 45 and set as a geometric distance value dA between the original standard pattern vector so and the original input pattern vector xo.

$$\cos(d_A) = \frac{\sum_{j=1}^{m+m} s_{ogb(j)} \cdot x_{ogb(j)}}{\sqrt{\sum_{j=1}^{m+m} (s_{ogb(j)})^2} \sqrt{\sum_{j=1}^{m+m} (x_{ogb(j)})^2}} \quad \{\text{Equation 45}\}$$

Figure 47:
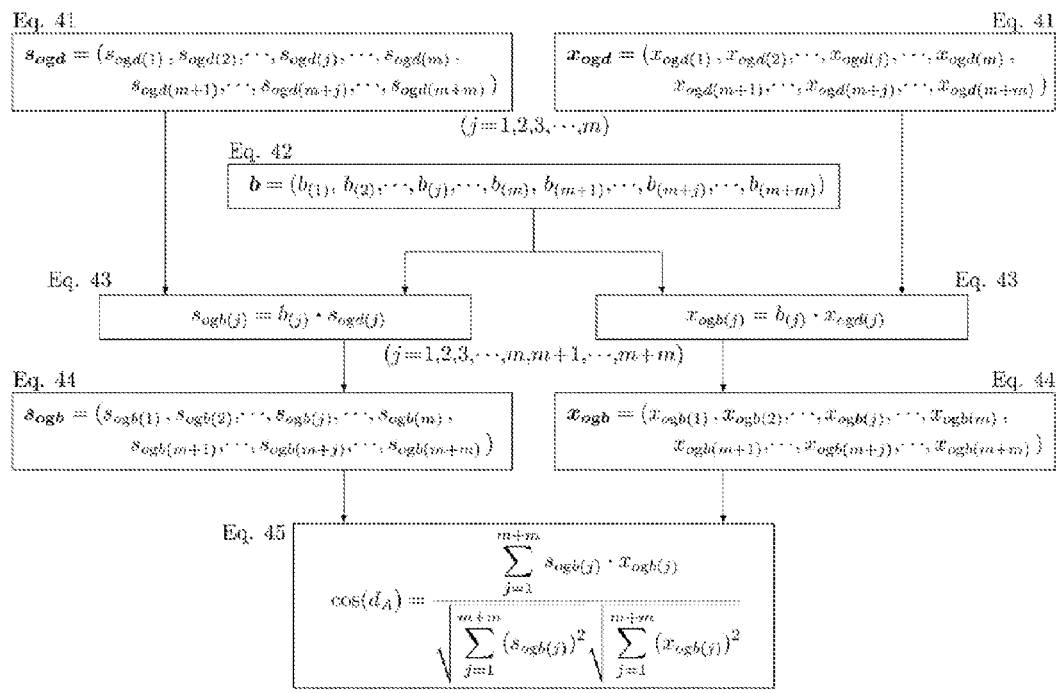
FIG. 47 is a diagram showing a calculation flowchart for a geometric distance dA.

FIG. 47 shows a calculation flowchart for the geometric distance. Note that the numbers in the figure are the equation numbers. From FIG. 47, we can find that the geometric distance dA is obtained as an angle between: the dual and selected standard pattern vector sogb obtained by calculating the product of the selecting vector (binary vector) b having 0 or 1 as a component and the dual and weighted standard pattern vector sogd, the two factors having the same component number; and the dual and selected input pattern vector xogb obtained by calculating the product of the same selecting vector (binary vector) b and the dual and weighted input pattern vector xogd, the two factors having the same component number. In short, the geometric distance value dA between the original standard pattern vector so and the original input pattern vector xo can be calculated through the processing procedures of FIGS. 43, 45 and 47.

FIGS. 54(b) to 54(d) and TABLE 1 show a phenomenon that the value of the kurtosis does not change monotonically as the "difference" between peaks of the standard and input patterns increases, and FIGS. 55(b) to 55(d) and TABLE 1 show a phenomenon that the value of the skewness does not change monotonically as the "difference" between peaks of the standard and input patterns increases. Here, consideration will be made that, in order to distinguish the component positions of the standard and input patterns that improve similarity detection accuracy from those that lower the similarity detection accuracy with regard to the relative positional relationship between the reference pattern and the standard and input patterns during the moving of the center axis of the reference pattern, the component values of the dual and weighted standard/input pattern vectors, which improve the similarity detection accuracy, are selected and those that lower the similarity detection accuracy are excluded. Thus, the component value of the selecting vector shown in equation 42 is set to 1 in the case of selection, and is set to 0 in the case of exclusion. Next, we explain a method for determining the component value of the selecting vector to be 1 or 0.

In inspection by hitting a concrete structure using a hammer, generally, a power spectrum changes subtly with each hit even at the same spot of the same structure. Therefore, a method is usually adopted wherein more than one normal standard sound is registered by repeatedly hitting the same spot of a normal structure and more than one abnormal standard sound is registered by repeatedly hitting the same spot of an abnormal structure. Moreover, in voice recognition, a power spectrum changes subtly with each utterance of the same voice. Therefore, a method is usually adopted wherein a number of persons repeatedly produce the same voice and more than one standard sound is registered for each voice. Note that, in the description thus far, the method for calculating the geometric distance value dA between the standard and input sounds has been described. Alternatively, we can replace the input sound by the standard sound and, using the same method, calculate a geometric distance value dA between two standard sounds.

For example, assuming that a group of normal standard sounds is category 1, the upper diagrams of FIG. 35 show two examples of a power spectrum of a normal sound, which are set as standard sounds 1 and 2 belonging to category 1, respectively. Also, assuming that a group of abnormal standard sounds is category 2, the lower diagrams of FIG. 35 show two examples of a power spectrum of an abnormal sound, which are set as standard sounds 3 and 4 belonging to category 2, respectively. Note that, in FIG. 35, geometric distances between the standard sounds are schematically depicted respectively as dA(1-2), dA(3-4), dA(1-3), dA(1-4), dA(2-3) and dA(2-4). dA(1-2) indicated by the solid arrow denotes the geometric distance between the normal standard sounds 1 and 2 belonging to the same category. dA(3-4) indicated by the solid arrow denotes the geometric distance between the abnormal standard sounds 3 and 4 belonging to the same category. dA(1-3) and dA(1-4) indicated by the dashed arrows denote the geometric distances between the normal standard sound 1 and the abnormal standard sounds 3 and 4 belonging to the different categories. dA(2-3) and dA(2-4) indicated by the dashed arrows denote the geometric distances between the normal standard sound 2 and the abnormal standard sounds 3 and 4 belonging to the different categories.

Here, if the distance between the standard sounds of the same category is shortened, and simultaneously, the distance between the standard sounds of the different categories is elongated, then, as a result, separation property of the standard sound of the same category and the standard sound of the different categories is improved, and thus recognition performance when an input sound is given is improved.

Next, a state of separation of the standard sounds of the same category from the standard sounds of the different categories is checked while changing the component value of the selecting vector to 1 or 0.

To be more specific, in order to check changes in the values of the geometric distances dA(1-2), dA(3-4), dA(1-3), dA(1-4), dA(2-3) and dA(2-4) between the standard sounds shown in FIG. 35 while changing the component value b(j) (j=1, 2, . . . , m+m) of the selecting vector b shown in equation 42 to 1 or 0, a value ($\bar{d}^{-1}-\bar{d}^{-2}$) of a difference in mean is obtained by subtracting a geometric distance mean $\bar{d}^{-2}$ between the standard sounds of the same category from a geometric distance mean $\bar{d}^{-1}$ between the standard sounds of the different categories, as shown in the following equation 46. Next, we obtain the square root of the sum $((s_1^2/N_1)+(s_2^2/N_2))$ of a value $(s_1^2/N_1)$ obtained by dividing a sample variance $s_1^2$ of the geometric distance between the standard sounds of the different categories by the sample size $N_1$ and a value $(s_2^2/N_2)$ obtained by dividing a sample variance $s_2^2$ of the geometric distance between the standard sounds of the same category by the sample size $N_2$. Then, a Welch's test statistic T(b(1), b(2), . . . , b(m+m)) is calculated as a value of an objective function by dividing the above value of the difference in mean by the above square root.

$$T(b_{(1)}, b_{(2)}, \ldots, b_{(j)}, \ldots, b_{(m)}, b_{(m+1)}, \ldots, \\ b_{(m+j)}, \ldots, b_{(m+m)}) = \frac{\bar{d}_1 - \bar{d}_2}{\sqrt{\frac{s_1^2}{N_1} + \frac{s_2^2}{N_2}}} \quad \{\text{Equation 46}\}$$

$(j = 1, 2, 3, \ldots, m)$

FIG. 36 is a schematic diagram showing a frequency distribution of the distance values between the standard sounds of the different categories and a frequency distribution of the distance values between the standard sounds of the same category, which are drawn by using the respective means $\bar{d}^{-1}$ and $\bar{d}^{-2}$ and the respective sample standard deviations $s_1$ and $s_2$. From FIG. 36, we can find that, when T(b(1), b(2), . . . , b(m+m)) reaches its maximum as the value of the numerator of T(b(1), b(2), . . . , b(m+m)) shown in equation 46 increases and, simultaneously, the value of the denominator decreases, the distance between the standard sounds of the same category is shortened and, simultaneously, the distance between the standard sounds of the different categories is elongated. Therefore, the selecting vector is optimized, which is created based on the values b(1), b(2), . . . , b(m+m) that maximize the value of T(b(1), b(2), . . . , b(m+m)). A generalized expression of the above discussion is as follows. Specifically, the problem of obtaining an optimum selecting vector boils down to the optimization problem of obtaining the component value b (j) (j=1, 2, . . . , m+m) of the selecting vector b that maximizes the objective function when T(b(1), b(2), . . . , b(m+m)) is the objective function.

Figure 48:
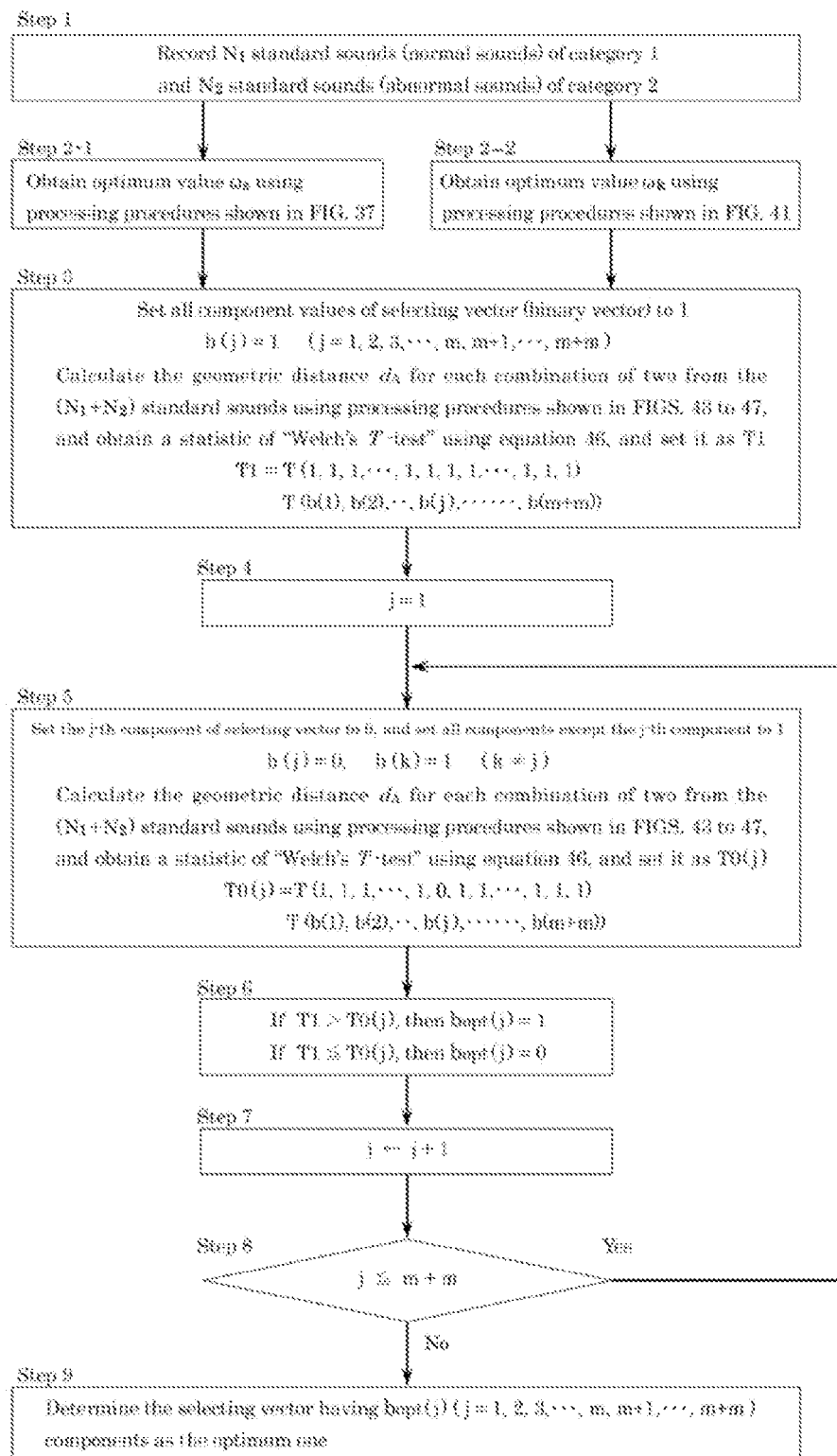
FIG. 48 is a diagram showing a flowchart for obtaining an optimum selecting vector.

Incidentally, in the examples of experiment of this embodiment, the power spectra of the standard sounds are created by setting the number of bars in each bar graph shown in FIG. 3 to m=257. In this case, in order to calculate the value of the objective function T(b(1), b(2), . . . , b(m+m)) while changing the component value b (j) (j=1, 2, . . . , m+m) of the selecting vector b shown in equation 42 to 1 or 0, the objective function T(b(1), b(2), . . . , b(m+m)) needs to be calculated in "2 to the 514-th power" ways, which makes it difficult to perform the calculation considering computation time. On the other hand, as for the optimization problem, there have been proposed numerical solutions such as a steepest descent method and a Newton method in the field of numerical calculation methods. These numerical solutions change a value of a variable in a direction in which the objective function rapidly decreases or increases, and are intended to calculate an optimum value of the variable with a small number of calculations. In this embodiment, by use of such numerical solutions, an optimum component value b (j) (j=1, 2, . . . , m+m) can be efficiently calculated. FIG. 48 shows an example of a method for calculating an optimum value with a small number of calculations.

FIG. 48 shows processing procedures for obtaining an optimum value of b(j) (j=1, 2, . . . , m+m) by use of N1 standard sounds (normal sounds) belonging to category 1 and N2 standard sounds (abnormal sounds) belonging to category 2. Note that N1≤2 and N2≤2. Also, the number m of the bars shown in FIG. 3 is set to 257, and power spectra of the standard sounds are created. In FIG. 48, an optimum value is obtained by running the value j from 1 to m+m.

In Step 1 of FIG. 48, (N1+N2) power spectra are created by recording N1 standard sounds (normal sounds) of category 1 and N2 standard sounds (abnormal sounds) of category 2.

In Step 2-1, an optimum value ωs is obtained through the processing procedures shown in FIG. 37.

In Step 2-2, an optimum value ωk is obtained through the processing procedures shown in FIG. 41. The processing from Step 3 to Step 9 is performed using the optimum values ωs and ωk.

In Step 3, all the component values of the selecting vector are set to 1. Namely, b(j)=1 (j=1, 2, . . . , m+m). Then, the geometric distance dA for each combination of two from the (N1+N2) standard sounds is calculated using the processing procedures shown in FIGS. 43 to 47, and the mean and sample variance of the geometric distances between the standard sounds of the different categories and those of geometric distances between the standard sounds of the same category are obtained using the same way as in equation 39. Then, a Welch's test statistic (equation 46) is calculated as T1. Namely, T1=T(1, 1, 1, . . . , 1, 1, 1, 1, . . . , 1, 1, 1).

In Step 4, j=1 is set as an initial value.

In Step 5, the j-th component of the selecting vector is set to 0, and the components other than the j-th component are set to 1. Namely, b (j)=0 and b(k)=1(k≠j). Then, the geometric distance dA for each combination of two from the (N1+N2) standard sounds is calculated using the processing procedures shown in FIGS. 43 to 47, and the mean and sample variance of the geometric distances between the standard sounds of the different categories and those of geometric distances between the standard sounds of the same category are calculated using the same way as in equation 39. Then, a Welch's test statistic (equation 46) is calculated as T0 (j). Namely, T0(j)=T(1, 1, 1, . . . , 1, 0, 1, 1, . . . , 1, 1, 1).

In Step 6, bopt(j)=1 when T1>T0(j), and bopt(j)=0 when T1≤T0(j).

In Steps 7 and 8, the processing of Steps 5 and 6 is repeated while increasing the value j to m+m with an increment of 1.

In Step 9, a selecting vector having bopt(j) (j=1, 2, . . . , m+m) as a component is set as an optimum selecting vector.

EXAMPLE 10 OF EXPERIMENT

Next, results of experiment for obtaining the optimum value of b(j) (j=1, 2, . . . , m+m) will be described. Specifically, the experiment was conducted following the processing procedures shown in FIG. 48, in which 10 normal standard sounds (belonging to category 1) were recorded by repeatedly hitting the same spot of a normal concrete structure, 10 abnormal standard sounds (belonging to category 2) were recorded by repeatedly hitting the same spot of an abnormal concrete structure, and then the optimum value of b(j) (j=1, 2, . . . , m+m) was obtained by using these 20 standard sounds. Here, a power spectrum of the standard sounds was created by setting the number of the bars shown in FIG. 3 to m=257. Note that these 20 standard sounds are identical to the 20 standard sounds used in Experiment Example 8. Moreover, the geometric distance dA is calculated using the optimum value ωs=41 obtained from FIG. 38 and the optimum value ωk=91 obtained from FIG. 42. In the case of this experiment, when considered as in FIG. 35, 10×10=100 values are calculated as the geometric distances dA between the standard sounds of the different categories, and $2 \times {}_{10}C_2 = 2 \times 10 \times 9/2 = 90$ values are calculated as the geometric distances dA between the standard sounds of the same category. Then, using the same way as in equation 39, the mean and sample variance of the geometric distances between the standard sounds of the different categories and those of geometric distances between the standard sounds of the same category were obtained, and Welch's test statistics T1 and T0 (j) (j=1, 2, . . . , m+m) were calculated by using equation 46. Next, the values of T1 and T0 (j) are compared to obtain a value of bopt(j) (j=1, 2, . . . , m+m). TABLE 3 shows the result of calculating the values of T1, T0 (j) and bopt(j). Namely, TABLE 3 is a table showing an experimental result of the optimum value of the selecting vector in example 10 of experiment. However, due to page space limitations, TABLE 3 shows the result when the value j is increased with an increment of 8 from 8 to 256 and from 257+8 to 257+256. The bottom right (combined result) of TABLE 3 shows that the value of objective function when all the component values of the selecting vector are set to 1 is T1=49.7822, the value of the objective function when all the component value of the selecting vector are set to the optimum value bopt(j) (j=1, 2, . . . , m+m) is 70.8422, and the value of the objective function is increased by 42.3% as a result of optimization.

TABLE 3

| j | T1 | T0(j) | bopt(j) |
|---|---|---|---|
| 8 | 49.7822 | 49.7813 | 1 |
| 16 | 49.7822 | 49.7852 | 0 |
| 24 | 49.7822 | 49.7913 | 0 |
| 32 | 49.7822 | 49.7996 | 0 |
| 40 | 49.7822 | 49.8040 | 0 |
| 48 | 49.7822 | 49.8246 | 0 |
| 56 | 49.7822 | 49.9036 | 0 |
| 64 | 49.7822 | 49.8361 | 0 |
| 72 | 49.7822 | 49.3568 | 1 |
| 80 | 49.7822 | 49.1469 | 1 |
| 88 | 49.7822 | 49.3833 | 1 |
| 96 | 49.7822 | 49.5974 | 1 |
| 104 | 49.7822 | 49.7030 | 1 |
| 112 | 49.7822 | 49.8280 | 0 |
| 120 | 49.7822 | 49.6516 | 1 |
| 128 | 49.7822 | 47.9359 | 1 |
| 136 | 49.7822 | 47.1830 | 1 |
| 144 | 49.7822 | 48.6309 | 1 |
| 152 | 49.7822 | 49.5510 | 1 |
| 160 | 49.7822 | 49.9278 | 0 |
| 168 | 49.7822 | 50.0769 | 0 |
| 176 | 49.7822 | 50.3147 | 0 |
| 184 | 49.7822 | 50.5015 | 0 |
| 192 | 49.7822 | 50.2090 | 0 |
| 200 | 49.7822 | 50.0068 | 0 |
| 208 | 49.7822 | 49.9954 | 0 |
| 216 | 49.7822 | 50.1386 | 0 |
| 224 | 49.7822 | 50.2015 | 0 |
| 232 | 49.7822 | 50.2757 | 0 |
| 240 | 49.7822 | 50.1494 | 0 |
| 248 | 49.7822 | 50.2369 | 0 |
| 256 | 49.7822 | 50.4733 | 0 |
| 257 + 8 | 49.7822 | 49.7725 | 1 |
| 257 + 16 | 49.7822 | 49.7710 | 1 |
| 257 + 24 | 49.7822 | 49.7700 | 1 |
| 257 + 32 | 49.7822 | 49.7707 | 1 |
| 257 + 40 | 49.7822 | 49.7743 | 1 |
| 257 + 48 | 49.7822 | 49.7791 | 1 |
| 257 + 56 | 49.7822 | 49.7827 | 1 |
| 257 + 64 | 49.7822 | 49.7859 | 0 |
| 257 + 72 | 49.7822 | 49.7866 | 0 |
| 257 + 80 | 49.7822 | 49.7830 | 0 |
| 257 + 88 | 49.7822 | 49.7653 | 1 |
| 257 + 96 | 49.7822 | 49.7335 | 1 |
| 257 + 104 | 49.7822 | 49.7195 | 1 |
| 257 + 112 | 49.7822 | 49.7292 | 1 |
| 257 + 120 | 49.7822 | 49.7521 | 1 |
| 257 + 128 | 49.7822 | 49.7714 | 1 |
| 257 + 136 | 49.7822 | 49.7779 | 1 |
| 257 + 144 | 49.7822 | 49.7788 | 1 |
| 257 + 152 | 49.7822 | 49.7787 | 1 |
| 257 + 160 | 49.7822 | 49.7670 | 1 |
| 257 + 168 | 49.7822 | 49.7491 | 1 |
| 257 + 176 | 49.7822 | 49.7453 | 1 |
| 257 + 184 | 49.7822 | 49.7651 | 1 |
| 257 + 192 | 49.7822 | 49.7905 | 0 |
| 257 + 200 | 49.7822 | 49.8017 | 0 |
| 257 + 208 | 49.7822 | 49.7950 | 0 |
| 257 + 216 | 49.7822 | 49.7830 | 0 |
| 257 + 224 | 49.7822 | 49.7762 | 1 |
| 257 + 232 | 49.7822 | 49.7781 | 1 |
| 257 + 240 | 49.7822 | 49.7758 | 1 |
| 257 + 248 | 49.7822 | 49.7767 | 1 |
| 257 + 256 | 49.7822 | 49.7826 | 0 |
| Combined result | 49.7822 | 70.8422 | |

In the above example 10 of experiment, processing is performed to select the component value that improves the similarity detection accuracy and excluding the component value that lowers the similarity detection accuracy in the dual and weighted standard/input pattern vectors, in order to distinguish the component positions of the standard/input patterns that improve the similarity detection accuracy from those that lower the similarity detection accuracy with regard to the relative positional relationship between the reference pattern and the standard/input patterns during the moving of the center axis of the reference pattern. As a result, we can find that the distance between the standard sounds of the same category is shortened, and simultaneously, the distance between the standard sounds of the different categories is elongated, then, as a result, separation property of the standard sounds of the same category and the standard sounds of the different categories is improved, and thus recognition performance when an input sound is given is improved.

Note that, instead of Welch's test statistics T1 and T0 (j) (j=1, 2, . . . , m+m), the recognition rates R1 and R0(j) (j=1, 2, . . . , m+m) may be used as objective functions. In this case, for example, the N1 standard sounds (normal sounds) belonging to category 1 and the N2 standard sounds (abnormal sounds) belonging to category 2 are recorded in advance, and geometric distances dA between one input sound (normal sound) different from those standard sounds and the above (N1+N2) standard sounds are calculated. Then, when the standard sound corresponding to the minimum value among the (N1+N2) geometric distances dA thus obtained belongs to category 1, the input sound is judged to belong to category 1 (to be a normal sound). On the other hand, when the standard sound corresponding to the minimum value belongs to category 2, the input sound is judged to belong to category 2 (to be an abnormal sound). Similarly, geometric distances dA between another input sound (abnormal sound) different from the above and the above (N1+N2) standard sounds are calculated. Then, when the standard sound corresponding to the minimum value among the (N1+N2) geometric distances dA thus obtained belongs to category 1, the input sound is judged to belong to category 1 (to be a normal sound). On the other hand, when the standard sound corresponding to the minimum value belongs to category 2, the input sound is judged to belong to category 2 (to be an abnormal sound). Similarly, the above recognition experiment is conducted using a number of input sounds (normal sounds and abnormal sounds), and the recognition rates R1 and R0(j) are calculated using a percentage at which the input sounds (normal sounds and abnormal sounds) are judged correctly. In this case, the values of the objective functions R1 and R0(j) are calculated by increasing the value j from 1 to m+m with an increment of 1, and the values of R1 and R0(j) are compared to obtain the optimum value bopt(j) (j=1, 2, . . . , m+m).

As described above, in the present invention, the skewness-weighted standard/input pattern vectors and the kurtosis-weighted standard/input pattern vectors are created using the optimized skewness-weighting vector and kurtosis-weighting vector, and the magnitudes of these four vectors are normalized to 1. Next, the skewness-weighted standard pattern vector and the kurtosis-weighted standard pattern vector, which are obtained by normalization, are combined to create a dual and weighted standard pattern vector. Similarly, the skewness-weighted input pattern vector and the kurtosis-weighted input pattern vector, which are obtained by normalization, are combined to create a dual and weighted input pattern vector. Further, dual and selected standard/input pattern vectors are created by selecting the component values that improve the similarity detection accuracy and excluding the component values that lower the similarity detection accuracy (setting the component values to 0) in the above dual and weighted standard pattern vector and dual and weighted input pattern vector . Then, the angle between the dual and selected standard pattern vector and the dual and selected input pattern vector is numerically evaluated as a geometric distance value between the original standard pattern vector and the original input pattern vector.

{Recognizing Unknown Input Sound}

In Japanese vowel recognition in the voice recognition, unknown input voices are recognized to belong to any of the five categories, /a/, /i/, /u/, /e/ and /o/. In this embodiment, such a condition is referred to as "the number of categories is 5". Meanwhile, in inspection by hitting a concrete structure using a hammer, a sound generated by hitting the concrete structure using the hammer changes with the amount and depth of reinforcement bars buried inside the concrete. Therefore, in many cases, the number of categories of a normal sound is 2 or more. Moreover, a sound generated by hitting the concrete structure using the hammer changes with the size and depth of damage such as a cavity inside the concrete. Therefore, in many cases, the number of categories of an abnormal sound is 2 or more. Next, processing procedures for recognizing unknown input sounds by using geometric distances according to the present invention will be described for the case where the number of categories is 2 and the case where the number of categories is 3 or more.

Figure 49:
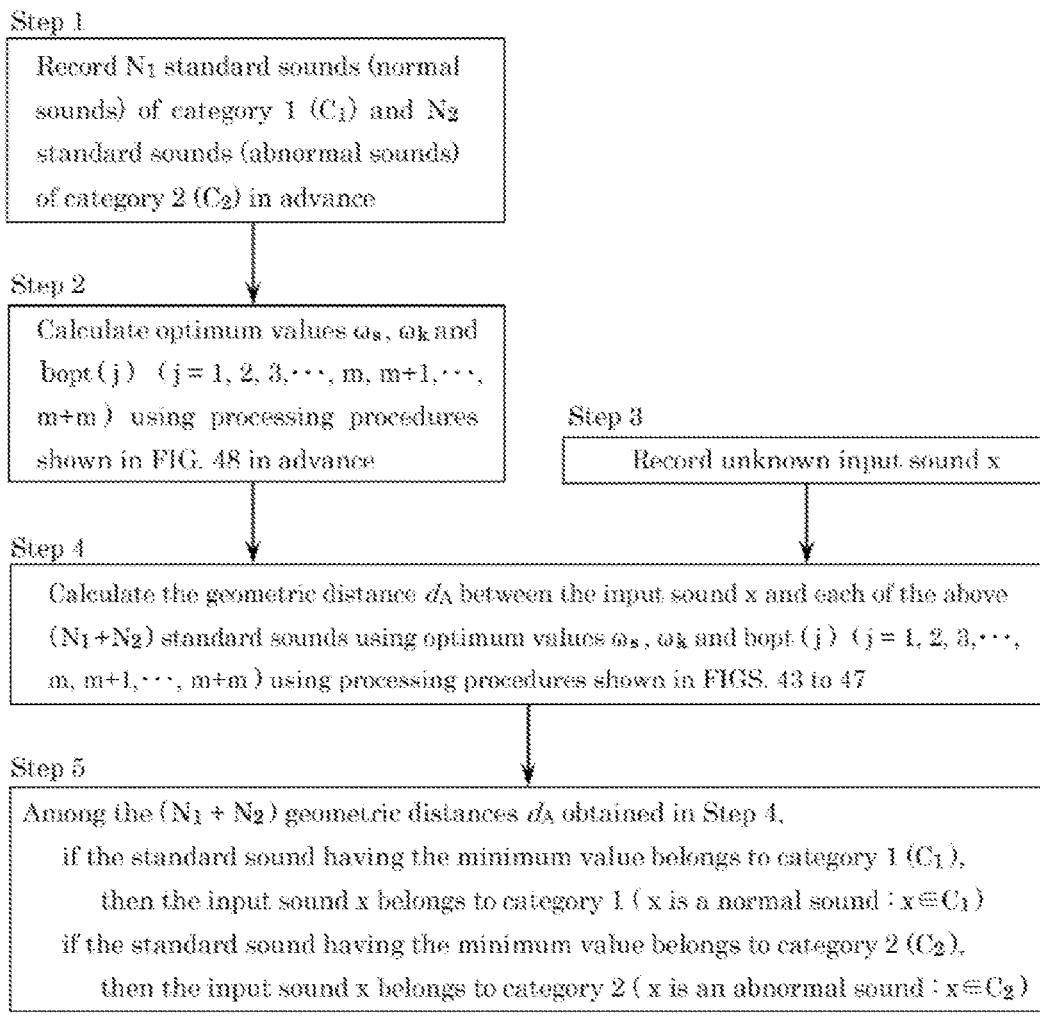
FIG. 49 is a diagram showing processing procedures for recognizing an unknown input sound when the number of categories is 2.

First, the processing procedures for recognizing unknown input sounds will be described for the case where the number of categories is 2. FIG. 49 shows the processing procedures for registering in advance N1 standard sounds (normal sounds) belonging to category 1 and N2 standard sounds (abnormal sounds) belonging to category 2 and, when another unknown input sound is given, recognizing to which one of categories 1 and 2 the input sound belongs. Note that N1≥2 and N2≥2.

In Step 1 of FIG. 49, (N1+N2) power spectra are created in advance by recording N1 standard sounds (normal sounds) of category 1 (C1) and N2 standard sounds (abnormal sounds) of category 2 (C2).

In Step 2, an optimum value ωs, an optimum value ωk and an optimum value bopt(j) (j=1, 2, . . . , m+m) are calculated in advance using the processing procedures shown in FIG. 48.

In Step 3, an unknown input sound x is recorded.

In Step 4, geometric distances dA between the input sound x and each of the above (N1+N2) standard sounds are calculated, using the optimum value ωs, the optimum value ωk and the optimum value bopt(j) (j=1, 2, . . . , m+m) and the processing procedures shown in FIGS. 43 to 47.

In Step 5, when the standard sound corresponding to the minimum value among the (N1+N2) geometric distances dA thus obtained belongs to category 1 (C1), the input sound x is judged to belong to category 1 (to be a normal sound: x∈C1), and, when the standard sound corresponding to the minimum value belongs to category 2 (C2), the input sound x is judged to belong to category 2 (to be an abnormal sound: x∈C2).

Next, the processing procedures for recognizing unknown input sounds will be described for the case where the number of categories is 3 or more. Even when the number of categories is 3 or more, distance values between the standard sounds of the different categories and distance values between the standard sounds of the same category can be defined. Therefore, the curves of the objective functions shown in FIGS. 38 and 42 can be drawn. However, in many cases, the positions of peaks of the curves of the objective functions become unclear as the number of categories increases, making it difficult to determine the optimum value of ω. Therefore, in this embodiment, the processing procedures for recognizing unknown input sounds will be described by applying the processing procedures shown in FIG. 49 to the case where the number of categories is 3 or more.

Figure 50:
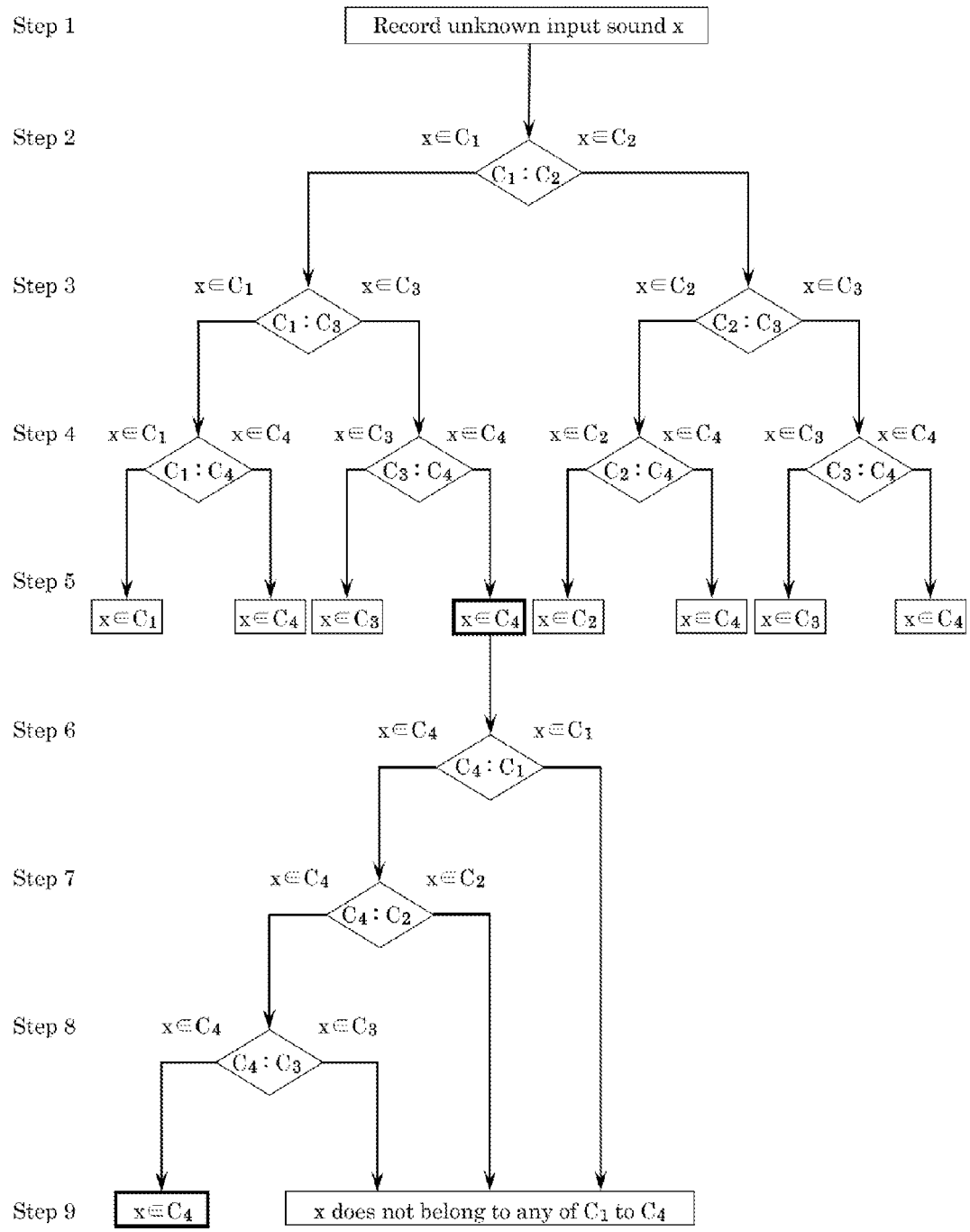
FIG. 50 is a diagram showing processing procedures for recognizing an unknown input sound when the number of categories is 3 or more.

FIG. 50 shows, as an example, processing procedures for registering in advance N1, N2, N3, and N4 standard sounds (normal sounds or abnormal sounds) belonging to categories 1 to 4 (C1 to C4), respectively, and, when another unknown input sound is given, recognizing to which one of categories 1 to 4 the input sound belongs or if the input sound does not belong to any of the categories. Note that N1≥2, N2≥2, N3≥2 and N4≥2. Moreover, in FIG. 50, Steps 1, 2, 4 and 5 shown in FIG. 49 are performed inside the diamond-shaped symbols. For example, in the diamond-shaped symbol (decision symbol) <C1:C3> in Step 3 of FIG. 50, the processing is performed by replacing C2 by C3 and N2 by N3 in Steps 1, 2, 4 and 5 shown in FIG. 49. Namely, the optimum value ωs, the optimum value ωk and the optimum value bopt(j) (j=1, 2, . . . , m+m) are calculated for each diamond-shaped symbol (decision symbol). Therefore, the optimum value ωs, the optimum value ωk and the optimum value bopt(j) (j=1, 2, . . . , m+m) in <C1:C2> are different from those in <C1:C3>. Moreover, the normal sound and the abnormal sound in Steps 1, 2, 4 and 5 shown in FIG. 49 may be normal sound A and normal sound B. Therefore, the processing is performed by replacing the normal sound and the abnormal sound in FIG. 49 by normal sound A, normal sound B, abnormal sound A, abnormal sound B, and the like.

In Step 1 of FIG. 50, an unknown input sound x is recorded.

In <C1:C2> of Step 2, the processing of Steps 1, 2, 4 and 5 shown in FIG. 49 is performed to judge between x∈C1 and x∈C2. The processing moves to <C1:C3> of Step 3 when x∈C1, and moves to <C2:C3> of Step 3 when x∈C2.

In <C1:C3> of Step 3, the processing of Steps 1, 2, 4 and 5 shown in FIG. 49 is performed to judge between x∈C1 and x∈C3. The processing moves to <C1:C4> of Step 4 when x∈C1, and moves to <C3:C4> of Step 4 when x∈C3.

In <C2:C3> of Step 3, the processing of Steps 1, 2, 4 and 5 shown in FIG. 49 is performed to judge between x∈C2 and x∈C3. The processing moves to <C2:C4> of Step 4 when x∈C2, and moves to <C3:C4> of Step 4 when x∈C3.

In Step 4, the same processing as that of Steps 2 and 3 is performed.

Step 5 shows the case where x∈C4 as an example.

In this case, C4 is fixed in Steps 6, 7 and 8, and processing of comparison with C1, C2 and C3 is performed again.

In Step 9, a final decision is made that the input sound x belongs to category 4 (x∈C4) when x∈C4 in all Steps 6, 7 and 8. Otherwise, a final decision is made that the input sound x does not belong to any of C1 to C4.

Next, generalization of the flowchart shown in FIG. 50 will be described. In FIG. 49, for the case where the number of categories is 2, it is determined, when an unknown input sound is given, to which one of the two categories the input sound x belongs. Further, in each of Steps 6 to 8 of FIG. 50, the category to which the input sound x belongs is determined using the processing procedures shown in FIG. 49. Then, when it is that the input sound x belongs to the same category in all of Steps 6 to 8, a final decision is made that the input sound x belongs to that category. Here, FIG. 51 shows combinations of Ci (i=1 to 4) and Cj (j=1 to 4, however, j≠i) when Ci is fixed, for the categories 1 to 4 (C1 to C4). For each of the combinations, it is determined by the processing procedures shown in FIG. 49 to which one of the two categories (Ci and Cj) the input sound x belongs. Here, as an example, consideration will be made that, as a result of fixing C4 and performing the processing shown in FIG. 49 for each of the combinations with C1, C2 and C3, as shown in FIG. 51(d), x∈C4 is determined for all the three combinations. In order to clearly show this, C4 is circled in FIG. 51(d). In this case, when the processing shown in FIG. 49 is performed for each of the combinations C1-C4 shown in FIG. 51(a), C2-C4 shown in FIGS. 51(b) and C3-C4 shown in FIG. 51(c), x∈C4 is determined inevitably for all the combinations. In order to clearly show this, C4 is circled in FIGS. 51(a) to 51(c). Thus, when a final decision is made that x∈C4 in FIG. 51(d), we can understand that no final decision is made that x∈C1, x∈C2 or x∈C3 in FIGS. 51(a) to 51(c). Namely, it is either a final decision is made that the input sound x belongs to one category or a final decision is made that the input sound x does not belong to any of the categories. In other words, no final decision is made that the input sound x belongs to more than one category.

Figure 52:
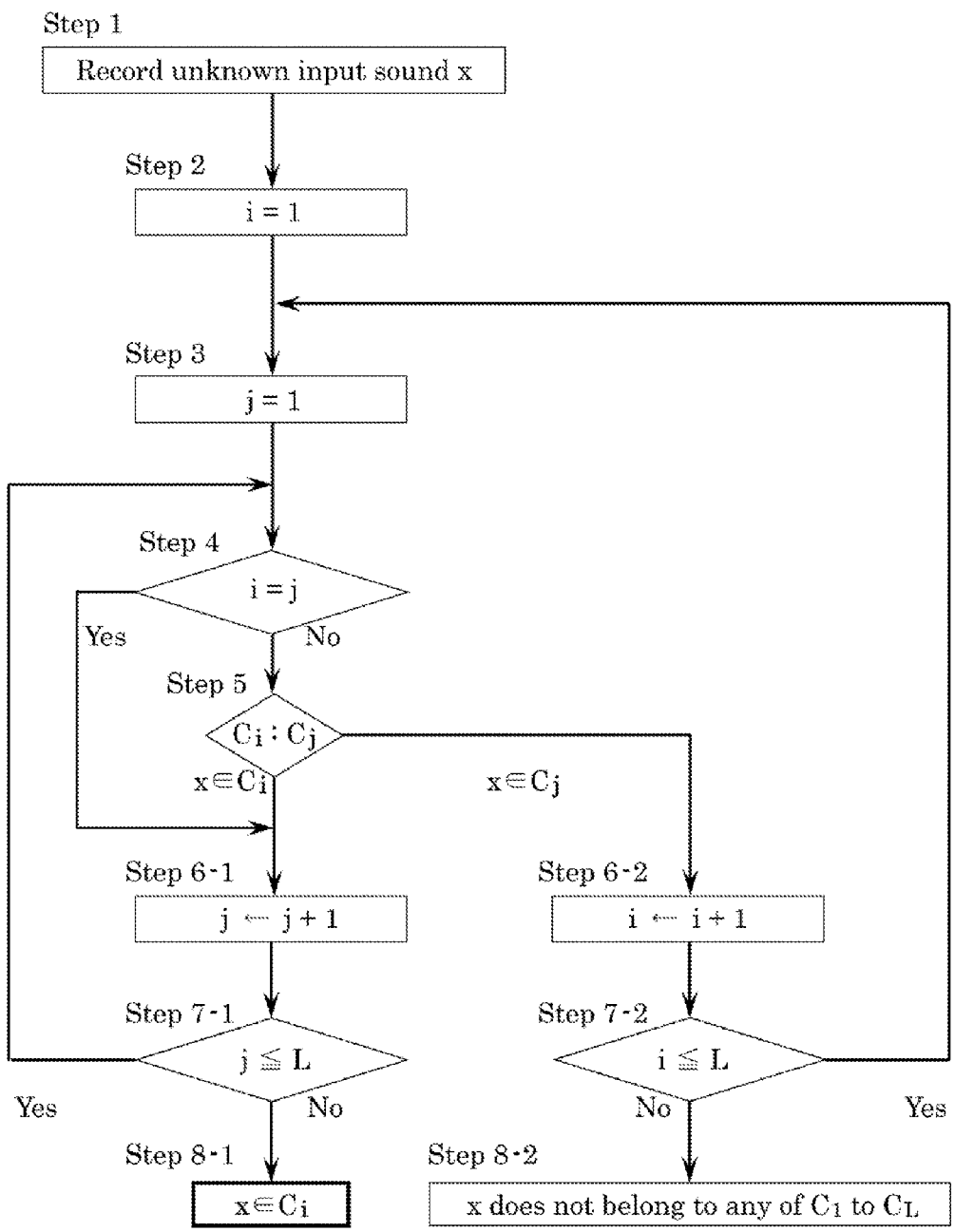
FIG. 52 is a diagram showing generalized processing procedures for recognizing an unknown input sound when the number of categories is L (L≤3).

Based on the above, next, the flowchart shown in FIG. 50 is generalized. FIG. 52 shows processing procedures for registering in advance N1, . . . , NL standard sounds (normal sounds or abnormal sounds) belonging to categories 1 to L (C1 to CL), respectively, and, when another unknown input sound is given, recognizing to which one of categories 1 to L the input sound belongs or if the input sound does not belong to any of the categories. Note that Ni≥2 (i=1 to L).

In Step 5 of FIG. 52, Steps 1, 2, 4 and 5 shown in FIG. 49 are performed inside the diamond-shaped symbols. Therefore, in the diamond-shaped symbol (decision symbol) <Ci:Cj> in Step 5 of FIG. 52, the processing is performed by replacing C1 and C2 by Ci and Cj and N1 and N2 by Ni and Nj in Steps 1, 2, 4 and 5 shown in FIG. 49. Namely, the optimum value ωs, the optimum value ωk and the optimum value bopt(j) (j=1, 2, . . . , m+m) are calculated for each combination of Ci and Cj. Therefore, the optimum value ωs, the optimum value ωk and the optimum value bopt(j) (j=1, 2, . . . , m+m) in <C1:C2> are different from those in <C1:C3>. Moreover, the normal sound and the abnormal sound in Steps 1, 2, 4 and 5 shown in FIG. 49 may be normal sound A and normal sound B. Therefore, the processing is performed by replacing the normal sound and the abnormal sound in FIG. 49 by normal sound A, normal sound B, abnormal sound A, abnormal sound B, and the like.

In Step 1 of FIG. 52, an unknown input sound x is recorded.

In Step 2, i=1 is set as an initial value.

In Step 3, j=1 is set as an initial value.

In Step 4, the processing moves to Step 6-1 when i=j, and moves to Step 5 when i≠j.

In <Ci:Cj> of Step 5, the processing of Steps 1, 2, 4 and 5 shown in FIG. 49 is performed to judge between x∈Ci and x∈Cj. The processing moves to Step 6-1 when x∈Ci is determined, and moves to Step 6-2 when x∈Cj is determined.

In Steps 6-1 and 7-1, the processing of Steps 4 and 5 is repeated while increasing the value j to L with an increment of 1.

In Steps 6-2 and 7-2, the processing of Steps 3 to 5 is repeated while increasing the value i to L with an increment of 1.

In Step 8-1, since x∈Ci is determined for every j (j=1 to L, j≠i) as a result of fixing Ci and comparing with Cj, a final determination is made that the input sound x belongs to category i (x∈Ci).

In Step 8-2, since it is the case other than Step 8-1, a final determination is made that the input sound x does not belong to any of C1 to CL.

From the above, we can find that FIG. 52 is a generalized flowchart with the number of categories set to L (however, L≥3), which is suitable for computer programming.

In Japanese vowel recognition in the voice recognition, unknown input voices are recognized to belong to any of the five categories, /a/, /i/, /u/, /e/ and /o/. In this case, it is previously known that the number of categories is 5. Meanwhile, in inspection by hitting a concrete structure using a hammer, a sound generated by hitting the concrete structure using the hammer changes with the amount and depth of reinforcement bars buried inside the concrete. Therefore, in many cases, the number of categories of a normal sound is 2 or more. Moreover, a sound generated by hitting the concrete structure using the hammer changes with the size and depth of damage such as a cavity inside the concrete. Therefore, in many cases, the number of categories of an abnormal sound is 2 or more. For this reason, in this case, there is no way of knowing beforehand how many categories there are. Next, processing procedures for determining the number of categories when the number of categories cannot be known beforehand will be described.

In the first step, first, several spots having different internal states are selected in a concrete structure, and one category is assigned to each of the selected spots. Therefore, the number of the selected spots is equal to the number of categories. Then, several standard sounds (normal sounds or abnormal sounds) are recorded by repeatedly hitting the same spot and registered as the standard sounds belonging to the respective categories. Next, for any two of the categories, the processing procedures shown in FIG. 48 are performed to obtain the optimum value $\omega s$, the optimum value $\omega k$ and the optimum value bopt(j) (j=1, 2, . . . , m+m) and calculate Welch's test statistic T (equation 46) when these optimum values are used. When the value of T is smaller than an arbitrarily set threshold, the two categories are determined to be the same and combined into one category. On the other hand, when the value of T is not less than the arbitrarily set threshold, the two categories are determined to be different categories. The number of categories is reduced by performing the above processing for all the combinations of the categories assigned to the respective selected spots.

In the second step, an unknown input sound is recognized through the processing procedures shown in FIG. 52 by using the number of categories determined in the first step. When a final determination is made, as a result of the recognition, that "the input sound does not belong to any of the categories determined in the first step", a new category is created and the input sound is set to be the standard sound belonging to the new category. When a final determination is made by continuing the same processing as the above that "the input sound does not belong to any of the existing categories", a new category is created and the input sound is set to be the standard sound belonging to the new category. Therefore, the number of categories is increased by performing the processing in the second step. However, in FIGS. 37, 41, 48 and 49, since conditions of N1≥2 and N2≥2 are satisfied for N1 standard sounds belonging to category 1 and N2 standard sounds belonging to category 2, input sounds are recorded by repeatedly hitting the same spot of the concrete structure. Then, when a final determination is made that "all of (or at least one of) the input sounds do not belong to any of the existing categories", a new category is created and the input sounds are set to be the standard sounds belonging to the new category. Note that the processing in the first step may be performed again at the right time to combine the categories. In this way, the number of categories can be determined by performing the processing in the first and second steps.

Note that, in calculation of the geometric distance dA according to the present invention, we can see from FIG. 43 that the dual and weighted standard pattern vector sogd can be calculated in advance during the process of registering standard patterns. Similarly, we can see from FIG. 47 that the dual and selected standard pattern vector sogb can also be calculated in advance during the process of registering standard patterns. Therefore, in the case of calculating geometric distance values dA between N standard patterns and one input pattern, N values of dA are obtained by performing one time the calculation of the dual and weighted input pattern vector xogd and the dual and selected input pattern vector xogb and N times the calculation of cosine similarity, during the process of recognizing input patterns, as shown in FIGS. 45 and 47. We can see from the above that the amount of calculation for the geometric distance dA is small in the process of recognizing the input patterns. Moreover, as can be understood from FIG. 21, the geometric distance dA according to the present invention is a similarity scale that is not influenced by a method for normalizing a power spectrum.

This is the end of the description of the method for judging abnormality in a concrete structure by using a detected value of a similarity between two original pattern vectors.

Note that, in the above embodiment, the optimum values of the skewness-weighting vector, kurtosis-weighting vector and selecting vector are calculated using Welch's test statistic as the objective function. Instead, other statistics such as a recognition rate may be used as the objective function to calculate the optimum values of the skewness-weighting vector, kurtosis-weighting vector and selecting vector.

Note that, in the above embodiment, the optimum value $\omega s$ and the optimum value $\omega k$ are first obtained, and then the optimum value bopt(j) (j=1, 2, . . . , m+m) is calculated. Instead, only component positions of the standard and input patterns corresponding to the component position where the obtained value of the optimum value bopt(j) (j=1, 2, . . . , m+m) is 1 may be used to obtain the optimum value $\omega s$ and the optimum value $\omega k$ again. In this case, the calculation of the optimum value $\omega s$ and the optimum value $\omega k$ and the calculation of the optimum value bopt (j) (j=1, 2, . . . , m+m) may be repeated until the increase in the value of the objective function saturates.

Note that, in the above embodiment, abnormality is detected by calculating a geometric distance value for a sound or an oscillation generated by hitting a concrete structure using a hammer. Instead, abnormality may be detected by calculating a geometric distance value for a sound or an oscillation generated by hitting an anchor bolt using a hammer.

Moreover, in the above embodiment, abnormality is detected by calculating a geometric distance value between the original standard pattern vector and the original input pattern vector for a sound wave generated by hitting a concrete structure using a hammer. Instead, voice recognition may be performed by calculating a geometric distance value between an original standard pattern vector and an original input pattern vector for a sound wave of a voice produced by a person.

Note that, in the above embodiment, the geometric distance between the original standard pattern vector and the original input pattern vector is calculated by creating bar graphs of the power spectrum of a sound or an oscillation wave. However, in general, a geometric distance between the original standard pattern vector and the original input pattern vector can be calculated for any bar graphs and a similarity between the bar graphs can be detected using the calculated geometric distance value. Moreover, various kinds of processing can be performed, such as analysis of the bar graphs based on the detected value of the similarity.

REFERENCE SIGNS LIST 1 structure
2 microphone
3 band-pass filter
4 A/D converter
5 processor

The invention claimed is:

1. A method for judging abnormality in a structure, comprising the steps of:
detecting an abnormal sound, comprising the steps of:
 (a) creating an original standard pattern vector having a feature quantity of a standard sound as a component and an original input pattern vector having a feature quantity of an input sound as a component;
 (b) creating any reference shape having a variance that varies from one specified component to another of the original pattern vector, creating a reference pattern vector having component values representing the reference shape, and creating a skewness-weighting vector having a rate of change in a skewness of the reference pattern vector as a component;
 (c) obtaining a length between a specified component of the original standard pattern vector and each of components thereof, calculating a component number of the skewness-weighting vector closest to a position away from the center of the skewness-weighting vector by the length, obtaining a product of a component value of the component number of the skewness-weighting vector and a component value of each component of the original standard pattern vector, and calculating a product-sum by summing each product with respect to a component number of the original standard pattern vector;
 (d) obtaining, in the calculation of the product-sum, the product-sum while moving the specified component of the original standard pattern vector to a position of each component, and creating a skewness-weighted standard pattern vector having the product-sum as a component value of the specified component;
 (e) obtaining a length between a specified component of the original input pattern vector and each of components thereof, calculating a component number of the skewness-weighting vector closest to a position away from the center of the skewness-weighting vector by the length, obtaining a product of a component value of the component number of the skewness-weighting vector and a component value of each component of the original input pattern vector, and calculating a product-sum by summing each product with respect to a component number of the original input pattern vector;
 (f) obtaining, in the calculation of the product-sum, the product-sum while moving the specified component of the original input pattern vector to a position of each component, and creating a skewness-weighted input pattern vector having the product-sum as a component value of the specified component;
 (g) setting an angle between the skewness-weighted standard pattern vector and the skewness-weighted input pattern vector as a skewness geometric distance between the original standard pattern vector and the original input pattern vector;
 (h) creating a skewness-weighting vector while changing the variance of the reference shape, obtaining a difference in mean by subtracting a skewness geometric distance mean between standard sounds of a same category from a skewness geometric distance mean between standard sounds of different categories, obtaining square root of a sum of values, one of which is obtained by dividing a sample variance of the skewness geometric distance between the standard sounds of the same category by a sample size thereof, and the other of which is obtained by dividing a sample variance of the skewness geometric distance between the standard sounds of the different categories by a sample size thereof, calculating a Welch's test statistic as an objective function by dividing the difference in mean by the square root, and creating an optimum skewness-weighting vector that maximizes the objective function;
 (i) creating a skewness-weighted standard pattern vector and a skewness-weighted input pattern vector by use of the optimum skewness-weighting vector;
 (j) creating any reference shape having a variance that varies from one specified component to another of the original pattern vector, creating a reference pattern vector having component values representing the reference shape, and creating a kurtosis-weighting vector having a rate of change in a kurtosis off the reference pattern vector as a component;
 (k) obtaining a length between a specified component of the original standard pattern vector and each of the components thereof, calculating a component number of the kurtosis-weighting vector closest to a position away from the center of the kurtosis-weighting vector by the length, obtaining a product of a component value of the component number of the kurtosis-weighting vector and a component value of each component of the original standard pattern vector, and calculating a product-sum by summing each product with respect to a component number of the original standard pattern vector;
 (l) obtaining, in the calculation of the product-sum, the product-sum while moving the specified component of the original standard pattern vector to a position of each component, and creating a kurtosis-weighted standard pattern vector having the product-sum as a component value of the specified component;
 (m) obtaining a length between a specified original input pattern vector and each of the components thereof, calculating a component number of the kurtosis-weighting vector closest to a position away from the center of the kurtosis-weighting vector by the length, obtaining a product of a component value of the component number of the kurtosis-weighting vector and a component value of each component of the original input pattern vector, and calculating a product-sum by summing each product with respect to a component number of the original input pattern vector;

(n) obtaining, in the calculation of the product-sum, the product-sum while moving the specified component of the original input pattern vector to a position of each component, and creating a kurtosis-weighted input pattern vector having the product-sum as a component value of the specified component;

(o) setting an angle between the kurtosis-weighted standard pattern vector and the kurtosis-weighted input pattern vector as a kurtosis geometric distance between the original standard pattern vector and the original input pattern vector;

(p) creating a kurtosis-weighting vector while changing the variance of the reference shape, obtaining a difference in mean by subtracting a kurtosis geometric distance mean between standard sounds of the same category from a kurtosis geometric distance mean between standard sounds of different categories, obtaining a square root of a sum of values, one of which is obtained by dividing a sample variance of the kurtosis geometric distance between the standard sounds of the same category by a sample size thereof, and the other of which is obtained by dividing a sample variance of the kurtosis geometric distance between the standard sounds of the different categories by a sample size thereof, calculating a Welch's test statistic as an objective function by dividing the difference in mean by the square root, and creating an optimum kurtosis-weighting vector that maximizes the objective function;

(q) creating a kurtosis-weighted standard pattern vector and a kurtosis-weighted input pattern vector by use of the optimum kurtosis-weighting vector;

(r) normalizing magnitudes of the skewness-weighted standard pattern vector and the kurtosis-weighted standard pattern vector to 1, and combining the normalized skewness-weighted standard pattern vector and the normalized kurtosis-weighted standard pattern vector to create a dual and weighted standard pattern vector;

(s) normalizing magnitudes of the skewness-weighted input pattern vector and the kurtosis-weighted input pattern vector to 1, and combining the normalized skewness-weighted input pattern vector and the normalized kurtosis-weighted input pattern vector to create a dual and weighted input pattern vector;

(t) creating a selecting vector having the same number of components as those of the dual and weighted standard pattern vector and dual and weighted input pattern vector and having 0 or 1 as a component, obtaining a product of a component value of each component of the dual and weighted standard pattern vector and a component value of the corresponding component of the selecting vector, the components having the same component number, and obtaining a product of a component value of each component of the dual and weighted input pattern vector and a component value of the corresponding component of the selecting vector, the components having the same component number, thereby creating a dual and selected standard pattern vector and a dual and selected input pattern vector having the corresponding products as component values;

(u) setting an angle between the dual and selected standard pattern vector and the dual and selected input pattern vector as a geometric distance between the original standard pattern vector and the original input pattern vector;

(v) obtaining a difference in mean by subtracting a geometric distance mean between standard sounds of the same category from a geometric distance mean between standard sounds of different categories while changing a value of each component of the selecting vector to 0 or 1, obtaining a square root of a sum of values, one of which is obtained by dividing a sample variance of the geometric distance between the standard sounds of the same category by a sample site thereof, and the other of which is obtained by dividing a sample variance of the geometric distance between the standard sounds of the different categories by a sample size thereof, calculating a Welch's test statistic as an objective function by dividing the difference in mean by the square root, and creating an optimum selecting vector that maximizes the objective function;

(w) setting an angle between the dual and selected standard pattern vector and the dual and selected input pattern vector, which are created by use of the optimum selecting vector, as the geometric distance between the original standard pattern vector and the original input pattern vector;

obtaining, by using the detected abnormal sound according to steps (a)-(w), a first geometric distance between an original standard pattern vector having a feature quantity of a normal standard sound as a component and an original input pattern vector having a feature quantity of an unknown input sound as a component and also obtaining a second geometric distance between an original standard pattern vector having a feature quantity of an abnormal standard sound as a component and the original input pattern vector;

comparing the first geometric distance and the second geometric distance; and judging the input sound as normal when the first geometric distance is not more than the second geometric distance and judging the input sound as abnormal when the first geometric distance is greater than the second geometric distance.

2. A method for recognizing a voice, comprising the steps of:

detecting a similarity between oscillation waves, comprising the steps of:

(a) creating an original standard pattern vector having a feature quantity of a standard oscillation wave as a component and an original input pattern vector having a feature quantity of an input oscillation wave as a component;

(b) creating any reference shape having a variance that varies from one specified component to another of the original pattern vector, creating a reference pattern vector having component values representing the reference shape, and creating a skewness-weighting vector having a rate of change in a skewness of the reference pattern vector as a component;

(c) obtaining a length between a specified component of the original standard pattern vector and each of components thereof, calculating a component number of the skewness-weighting vector closest to a position away from the center of the skewness-weighting vector by the length, obtaining a product of a component value of the component number of the skewness-weighting vector and a component value or each component of the original standard pattern vector, and calculating a product-sum by summing each product with respect to a component number of the original standard pattern vector;

(d) obtaining, in the calculation of the product-sum, the product-sum while moving the specified component of the original standard pattern vector to a position of each component, and creating a skewness-weighted standard pattern vector having the product-sum as a component value of the specified component;

(e) obtaining a length between a specified component of the original input pattern vector and each of components thereof, calculating a component number of the skewness-weighting vector closest to a position away from the center of the skewness-weighting vector by the length, obtaining a product of a component value or the component number of the skewness-weighting vector and a component value of each component of the original input pattern vector, and calculating a product-sum by summing each product with respect to a component number of the original input pattern vector;

(f) obtaining, in the calculation or the product-sum, the product-sum while moving the specified component of the original input pattern vector to a position of each component, and creating a skewness-weighted input pattern vector having the product-sum as a component value of the specified component;

(g) setting an angle between the skewness-weighted standard pattern vector and the skewness-weighted input pattern vector as a skewness geometric distance between the original standard pattern vector and the original input pattern vector;

(h) creating a skewness-weighting vector while changing the variance of the reference shape, obtaining a difference in mean by subtracting a skewness geometric distance mean between standard oscillation waves of a same category from a skewness geometric distance mean between standard oscillation waves of different categories, obtaining a square root of a sum of values, one of which is obtained by dividing a sample variance of the skewness geometric distance between the standard oscillation waves of the same category by a sample size thereof, and the other of which is obtained by dividing a sample variance of the skewness geometric distance between the standard oscillation waves of the different categories by a sample size thereof, calculating a Welch's test statistic as an objective function by dividing the difference in mean by the square root, and creating an optimum skewness-weighting vector that maximizes the objective function;

(i) creating a skewness-weighted standard pattern vector and a skewness-weighted input pattern vector by use of the optimum skewness-weighting vector;

(j) creating any reference shape having a variance that varies from one specified component to another of the original pattern vector, creating a reference pattern vector having component values representing the reference shape, and creating a kurtosis-weighting vector having a rate of change in a kurtosis of the reference pattern vector as a component;

(k) obtaining a length between a specified component of the original standard pattern vector and each of the components thereof, calculating a component number of the kurtosis-weighting vector closest to a position away from the center of the kurtosis-weighting vector by the length, obtaining a product of a component Value of the component number of the kurtosis-weighting vector and a component value of each component of the original standard pattern vector, and calculating product-sum by summing each product with respect to a component number of the original standard pattern vector;

(l) obtaining, in the calculation of the product-sum, the product-sum while moving the specified component of the original standard pattern vector to a position of each component, and creating a kurtosis-weighted standard pattern vector having the product-sum as a component value of the specified component;

(m) obtaining a length between a specified component of the original input pattern vector and each of the components thereof, calculating a component number of the kurtosis-weighting vector closest to a position away from the center of the kurtosis weighting vector by the length, obtaining a product of a component value of the component number of the kurtosis-weighting vector and a component value of each component of the original input pattern vector, and calculating a product-sum by summing each product with respect to a component number of the original input pattern vector;

(n) obtaining, in the calculation of the product-sum, the product-sum while moving the specified component of the original input pattern vector to a position of each component, and creating a kurtosis-weighted input pattern vector having the product-sum as a component value of the specified component;

(o) setting an angle between the kurtosis-weighted standard pattern vector and the kurtosis-weighted input pattern vector as a kurtosis geometric distance between the original standard pattern vector and the original input pattern vector;

(p) creating a kurtosis-weighting vector while changing the variance of the reference shape, obtaining a difference in mean by subtracting a kurtosis geometric distance mean between standard oscillation waves of the same category from a kurtosis geometric distance mean between standard oscillation waves of different categories, obtaining a square root of a sum of values, one of which is obtained by dividing a sample variance of the kurtosis geometric distance between the standard oscillation waves of the same category by a sample size thereof, and the other of which is obtained by dividing a sample variance of the kurtosis geometric distance between the standard oscillation waves of the different categories by a sample size thereof, calculating a Welch's test statistic as an objective function by dividing the difference in mean by the square root, and creating an optimum kurtosis-weighting vector that maximizes the objective function;

(q) creating a kurtosis-weighted standard pattern vector and a kurtosis-weighted input pattern vector by use of the optimum kurtosis-weighting vector;

(r) normalizing magnitudes of the skewness-weighted standard pattern vector and the kurtosis-weighted standard pattern vector to 1, and combining the normalized skewness-weighted standard pattern vector and the normalized kurtosis-weighted standard pattern vector to create a dual and weighted standard pattern vector;

(s) normalizing magnitudes of the skewness-weighted input pattern vector and the kurtosis-weighted input pattern vector to 1, and combining the normalized skewness-weighted input pattern Vector and the normalized kurtosis-weighted input pattern vector to create a dual and weighted input pattern vector;

(t) creating a selecting vector having the same number of components as those of the dual and weighted standard pattern vector and dual and weighted input pattern vector and having 0 or 1 as a component, obtaining a product of a component value of each component of the dual and weighted standard pattern vector and a component value of the corresponding component of the selecting vector, the components having the same component number, and obtaining a product of a component value of each component of the dual and weighted input pattern vector and a component value of the corresponding component of the selecting vector, the components having the same component number, thereby creating a dual and selected standard pattern vector and a dual and selected input pattern vector having the corresponding products as component values;

(u) setting an angle between the dual and selected standard pattern vector and the dual and selected input pattern vector as a geometric distance between the original standard pattern vector and the original input pattern vector;

(v) obtaining a difference in mean by subtracting a geometric distance mean between standard sounds of the same category from a geometric distance mean between standard sounds of different categories while changing a value of each component of the selecting vector to 0 or 1, obtaining a square root of a sum of values, one of which is obtained by dividing a sample variance of the geometric distance between the standard sounds of the same category by a sample size thereof, and the other of which is obtained by dividing a sample variance of the geometric distance between the standard sounds of the different categories by a sample size thereof, calculating a Welch's test statistic as an objective function by dividing the difference in mean by the square root, and creating an optimum selecting vector that maximizes the objective function;

(w) setting an angle between the dual and selected standard pattern vector and the dual and selected input pattern vector, which are created by use of the optimum selecting vector, as the geometric distance between the original standard pattern vector and the original input pattern vector;

obtaining, by using the detected similarity between oscillation waves according to steps (a)-(w), a first geometric distance between an original standard pattern vector having a feature quantity of a standard voice of category 1 as a component and an original input pattern vector having a feature quantity of an unknown input voice as a component and also obtaining a second geometric distance between an original standard pattern vector having a feature quantity of a standard voice of category 2 as a component and the original input pattern vector;

comparing the first geometric distance and the second geometric distance; and judging that the input voice belongs to category 1 when the first geometric distance is not more than the second geometric distance and judging that the input voice belongs to category 2 when the first geometric distance is greater than the second geometric distance.

* * * * *